United States Patent
Israni et al.

(10) Patent No.: US 6,308,177 B1
(45) Date of Patent: Oct. 23, 2001

(54) SYSTEM AND METHOD FOR USE AND STORAGE OF GEOGRAPHIC DATA ON PHYSICAL MEDIA

(76) Inventors: Vijaya S. Israni, 4431 Bayside Cir., Hoffman Estates, IL (US) 60195; Richard A. Ashby, P.O. Box 351, Hebron, IL (US) 60034; Gregory M. Nyczak, 1036 Oakwood Dr., Westmont, IL (US) 60559; Nicholas E. Smith, 209 Pleasant St., Oak Park, IL (US) 60302

( * ) Notice: Subject to any disclaimer, the term of this patent is extended or adjusted under 35 U.S.C. 154(b) by 0 days.

(21) Appl. No.: 09/362,947

(22) Filed: Jul. 28, 1999

Related U.S. Application Data

(62) Division of application No. 08/740,295, filed on Oct. 25, 1996, now Pat. No. 5,968,109.

(51) Int. Cl.[7] .................................................. G06F 17/30
(52) U.S. Cl. ........................ 707/100; 701/207; 701/208; 340/990
(58) Field of Search .......................... 707/100; 701/207, 701/208; 340/990

(56) References Cited

U.S. PATENT DOCUMENTS 4,086,632   4/1978  Lions .................................. 701/210

(List continued on next page.)

FOREIGN PATENT DOCUMENTS 0 306 075 A1   3/1989  (EP) .

(List continued on next page.)

OTHER PUBLICATIONS

Matsuyama et al., "A File Organization for Geographic Information Systems Based on Spatial Proximity" Computer Vision, Graphics and Image Processing 26:303–318 (1984).

(List continued on next page.)

*Primary Examiner*—Thomas Black
*Assistant Examiner*—William Trinh

(57) ABSTRACT

An improved method and system for storage of geographic data on physical storage media. The geographic data are stored in a manner that facilitates and enhances use and access of the data by various navigation application functions in navigation systems that use the data. The geographic data includes a parcelization that separates the geographic data into parcels having less than or equal to a maximum parcel size but having at least a desired fill percentage. The parcelization method also provides for a division arrangement that facilitates addressing and identification of the parcels. According to a further aspect, the geographic data includes special nodal entities that are used to collapse complex intersections, such as roundabouts, cloverleaves, and divided highways, into simpler data representations. The special nodal entities are associated with road segment data entities and used in a route calculation program in place of regular node entities. Further, the geographic data include a normalized attribute array that includes reoccurring combinations of certain selected attributes of the geographic data. Indices to the array are included in place of data corresponding to the selected attributes. When a navigation application program requests data, an entry in the normalized attribute table pointed to by an index in the data is used to return the requested data in the particular combination of attributes from the normalized attribute array. The geographic data is compiled by a method that facilitates access to the data on a physical medium. According to the compilation method, data files to be stored on the medium are organized into parcels. The data records within the data files are identified by the parcel in which they are located. An arrangement of all the data files on the medium is determined and a parcel identification related to the medium is assigned to each parcel. Cross references between data records are updated to include the assigned parcel identifications and the parcels are stored on the medium.

20 Claims, 16 Drawing Sheets

Microfiche Appendix Included
(20 Microfiche, 1867 Pages)

U.S. PATENT DOCUMENTS

| | | | |
|---|---|---|---|
| 4,630,209 | 12/1986 | Saito et al. ............................ | 701/201 |
| 4,888,698 * | 12/1989 | Driessen et al. ..................... | 701/200 |
| 4,937,572 | 6/1990 | Yamada et al. ...................... | 340/995 |
| 4,970,652 | 11/1990 | Nagashima ........................... | 701/208 |
| 4,972,319 | 11/1990 | DeLorme ............................. | 340/990 |
| 5,029,125 | 7/1991 | Sciupac ................................ | 707/205 |
| 5,036,471 | 7/1991 | Tamura et al. ....................... | 340/209 |
| 5,150,295 | 9/1992 | Mattingly ............................. | 702/5 |
| 5,168,452 | 12/1992 | Yamada et al. ...................... | 701/208 |
| 5,170,353 | 12/1992 | Verstraete ............................ | 702/5 |
| 5,285,391 | 2/1994 | Smith, Jr. et al. ................... | 701/202 |
| 5,295,261 | 3/1994 | Simonetti ............................. | 701/202 |
| 5,359,527 | 10/1994 | Takanabe ............................. | 701/200 |
| 5,367,671 | 11/1994 | Feigenbaum et al. ................ | 707/1 |
| 5,406,493 | 4/1995 | Goto et al. ........................... | 707/2 |
| 5,412,573 | 5/1995 | Barnea et al. ....................... | 701/209 |
| 5,592,665 | 1/1997 | Lahaije ................................. | 701/208 |
| 5,617,319 | 4/1997 | Arakawa .............................. | 701/207 |
| 5,694,534 | 12/1997 | White, Jr. et al. ................... | 345/440 |
| 5,754,846 * | 5/1998 | Janse et al. ........................... | 707/100 |
| 5,815,161 | 9/1998 | Janse et al. ........................... | 345/440 |
| 5,832,406 | 11/1998 | Emmerick et al. ................... | 701/202 |

FOREIGN PATENT DOCUMENTS

| | | |
|---|---|---|
| 0 559 975 A1 | 9/1993 | (EP) . |
| 0 646 882 A1 | 4/1995 | (EP) . |
| 0 702 208 A2 | 3/1996 | (EP) . |
| WO 97/00425 | 1/1997 | (WO) . |

OTHER PUBLICATIONS

Frosh, Randy, "A Method of Accessing Large Spatial Databases", Nov. 26–30, 1989, GIS/LIS '89 Conference, Orlando, FL.

Samet, Hanan, "Strategies for Optimizing the Use of Redundancy in Spatial Databases", Chapter 2.4, *The Design and Analysis of Spatial Data Structure*, ISGN 0–201–50255–0. No Date.

Bentley, Jon L., "Multidimensional Binary Search Trees in Data Applications", IEEE Transactions of Software Engineering, vol. E–5, No. 4, Jul. 1979, pp. 333–340.

Ohnishi et al., "Map Database Generation System for In–Vehicle Navigation System", 1994 Vehicle Navigation & Information Systems Conference Proceedings. Published Aug. 31, 1994.

H. Classen et al., "GDF, A Proposed Standard for Digital Road Maps to be used in Car Navigation Systems", Proceedings of the vehicle Navigation and Information Systems Conference. (VNIS Sep. 11–13, 1989) Toronto, Canada, pp. 324–330.

* cited by examiner

LOWEST RANKED SEGMENTS EARMARKED TO BE DROPPED

LOWEST RANKED SEGMENTS HAVE BEEN DROPPED

AFTER AGGREGATION

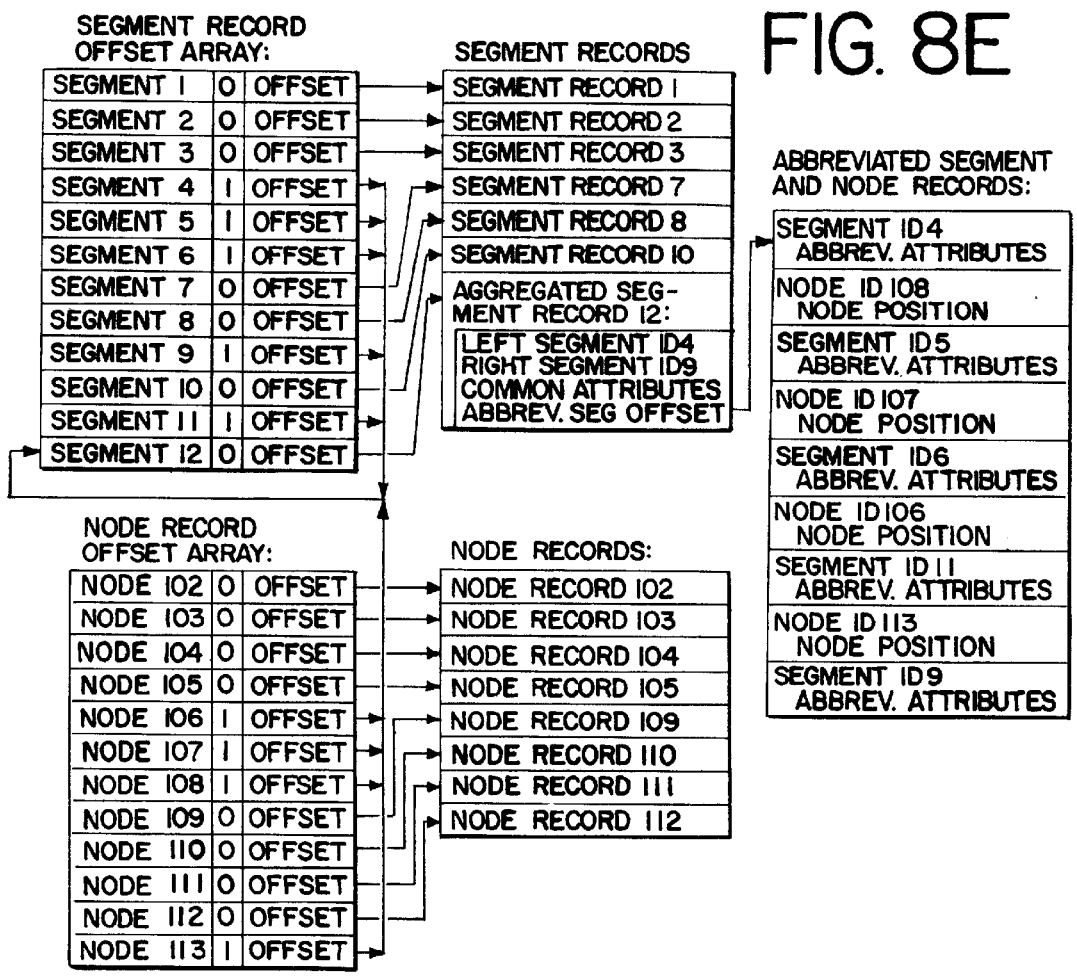
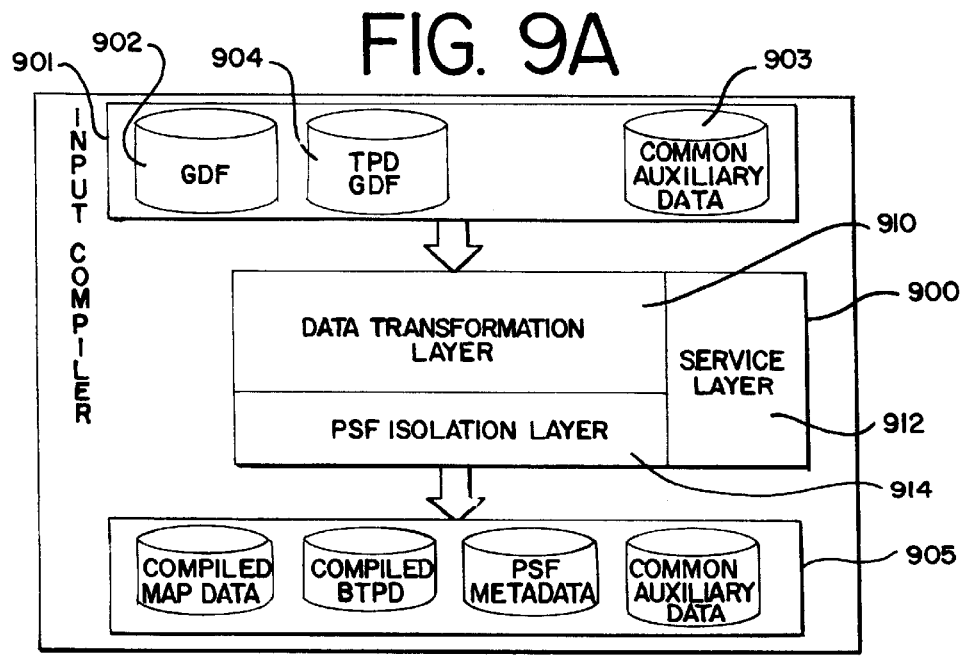

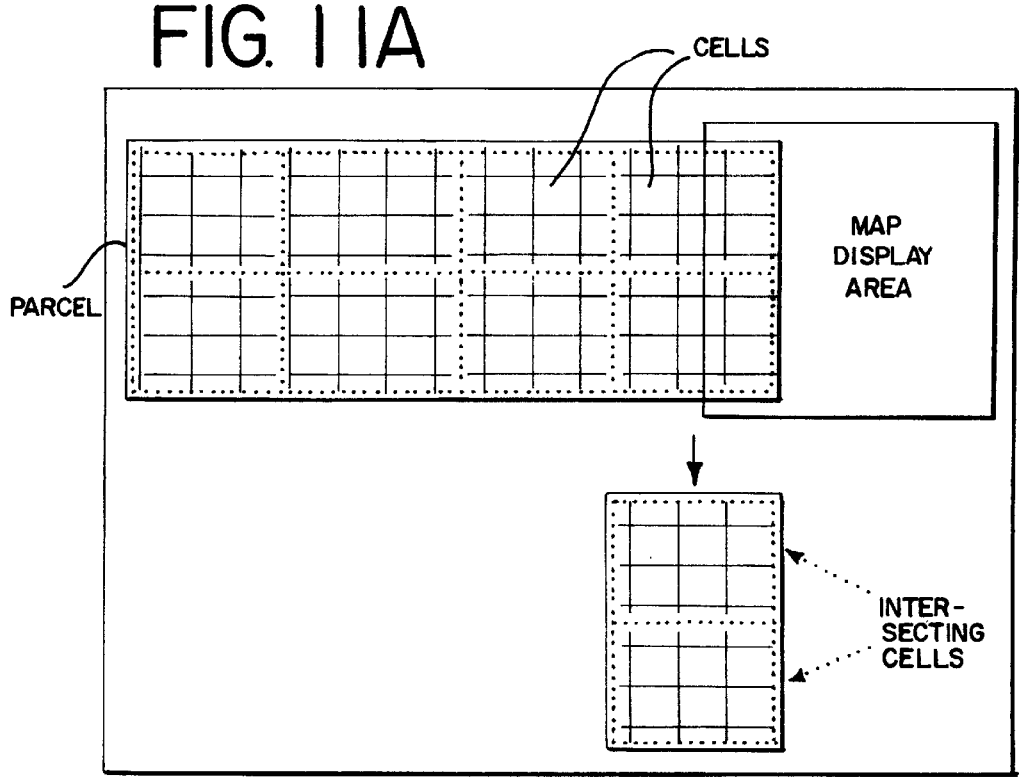

SYSTEM AND METHOD FOR USE AND STORAGE OF GEOGRAPHIC DATA ON PHYSICAL MEDIA

REFERENCE TO RELATED APPLICATIONS

The present application is a divisional of Ser. No. 08/740,295, now U.S. Pat. No. 5,968,109, filed Oct. 25, 1996, and is related to the copending application entitled "INTERFACE LAYER FOR NAVIGATION SYSTEM", U.S. Pat. No. 5,047,280, filed on Oct. 25, 1996, assigned to the assignee of the present application, and the entire disclosure of which is incorporated herein by reference.

REFERENCE TO MICROFICHE APPENDIX

Included with and forming part of this specification are a microfiche appendix, Appendix A, including 20 sheets of 1867 total frames, and a second michrofiche appendix, Appendix B, including 1 sheet of 43 total frames.

REFERENCE TO PRINTED APPENDIX

Included with and forming part of this specification is a printed appendix, Appendix B.

REFERENCE TO COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to a system and method for storage of geographic information on physical media, and more particularly, the present invention relates to a system and method for providing geographic data on a physical storage medium for use in a computer-based navigation system.

Computer-based navigation systems for use on land have become available in a variety of forms and provide for a variety of useful features. One exemplary type of navigation system uses (1) a detailed data set (or map) of a geographic area or region, (2) a navigation application program, (3) appropriate computer hardware, such as a microprocessor and memory, and, optionally, (4) a positioning system. The detailed geographic data set portion of the navigation system is in the form of one or more detailed, organized data files or databases. The detailed geographic data set may include information about the positions of roads and intersections in or related to a specific geographic regional area, and may also include information about attributes, such as one-way streets and turn restrictions, as well as about street addresses, alternative routes, hotels, restaurants, museums, stadiums, offices, automobile dealerships, auto repair shops, etc.

The positioning system may employ any of several well-known technologies to determine or approximate one's physical location in a geographic regional area. For example, the positioning system may employ a GPS-type system (global positioning system), a "dead reckoning"-type system, or combinations of these, or other systems, all of which are well-known in the art.

The navigation application program portion of the navigation system is a software program that uses the detailed geographic data set and the positioning system (when employed). The navigation application program may provide the user with a graphical display (e.g. a "map") of his specific location in the geographic area. In addition, the navigation application program may also provide the user with specific directions to locations in the geographic area from wherever he is located.

Some navigation systems combine the navigation application program, geographic data set, and optionally, the positioning system into a single unit. Such single unit systems can be installed in vehicles or carried by persons. Alternatively, navigation application programs and geographic datasets may be provided as software products that are sold or licensed to users to load in their own personal computers. Personal computer-based systems may be stand alone systems or may utilize a communication link to a central or regional system. Alternatively, the navigation system may be centrally or regionally located and accessible to multiple users on an "as needed" basis, or alternatively, on line via a communications link. Navigation systems may also be used by operators of vehicle fleets such as trucking companies, package delivery services, and so on. Navigation systems may also be used by entities concerned with traffic control and traffic monitoring. In-vehicle navigation systems may use a wireless communication connection. Also, users may access a central navigation system over an on-line service such as the Internet, or over private dial-up services, such as CompuServe, Prodigy, and America Online.

Computer-based navigation systems hold the promise of providing high levels of navigation assistance to users. Navigation systems can provide detailed instructions for travelling to desired destinations, thereby reducing travel times and expenses. Navigation systems also can provide enhanced navigation features such as helping travellers avoid construction delays and finding the quickest routes to desired destinations. Navigation systems can also be used to incorporate real-time traffic information.

One potential obstacle to providing enhanced features in a navigation system is the need to provide the geographic information on a computer-readable storage medium in an efficient, versatile, economic, and flexible manner. In addition, the geographic information should be saved on the storage medium in a manner that facilitates access and use by the navigation application program portion of the navigation system. Accordingly, it is desired to provide an improved computer-readable storage medium product having geographic data stored thereon for use in navigation systems.

SUMMARY OF THE INVENTION

To achieve the foregoing and other objectives and in accordance with the purposes of the present invention, an improved method and system provides for storage of geographic data on physical storage media. The geographic data are stored in a manner that facilitates and enhances use and access of the data by various navigation application functions in navigation systems that use the data.

According one aspect, there is provided a parcelization method for dividing the geographic data into separate parcels. The parcelization method provides for parcels with data contents less than a specified maximum data content but having a desired fill percentage. The parcelization method also provides for a division arrangement that facilitates addressing and identification of the parcels.

In a further aspect of the parcelization process, a common set of boundaries is used to define all spatial parcels (including types such as data sets parcelized independently), such that for any two spatial parcels of any types, one parcel is completely contained in the other. This reduces the amount of data needed to represent spatial parcel boundaries in a global kd-tree index.

According to another aspect, the geographic data stored on a physical storage medium include special nodal entities. Each of special nodal entity represents a selected plurality of regular node entities in the geographic data. The selected plurality of regular node entities have been identified as related to complex intersections of multiple road segments, such as roundabouts, cloverleaves, and intersections of divided highways. In the geographic data, road segment data entities are associated with the special nodal entities instead of with the regular node entities represented by the special nodal entities. Then, in a route calculation program, the special nodal entities are used instead of the regular node entities. The special nodal entities collapse complex intersections of multiple road segments and regular node entities into simpler data representations thereby facilitating route calculation.

According to a still further aspect, a physical storage medium has stored thereon geographic data that includes at least one normalized attribute array. The normalized attribute array is provided as a separate table on the storage medium. The normalized attribute array includes reoccurring combinations of certain selected attributes within the geographic data. Within entity records in the geographic data, indices are included in place of data corresponding to the selected attributes. The indices refer to entries in the normalized attribute array. When a navigation application program accesses a data entity, the entry in the normalized attribute table pointed to by the index in the data entity is used to build the entire data record including the particular combination of attributes pointed to by the index. By including combinations of geographic data attributes in a normalized attribute array, storage space on the medium can be conserved and access to the data can be improved.

According to yet another aspect, there is provided a compilation method for providing data in a format that facilitates access to the data on a physical medium. According to the compilation method, data files to be stored on the medium are organized into parcels. The data records within the data files are identified by the parcel in which they are located. An arrangement of all the data files on the medium is determined and a parcel identification related to the medium is assigned to each parcel. Cross references between data records are updated to include the assigned parcel identifications. The data files are concatenated while maintaining the parcels and the concatenation is stored on the medium.

In another aspect, aggregated segment data are included in some layers of certain types of geographic data, such as data used for routing. These aggregated segments are used to represent a plurality of road segments and include sufficient information about intersections internal of the end points of the aggregated segments to allow a route calculation program to access an aggregated segment internally of its end points.

According to a still further aspect, shape points are generated for data entities that represent segments of roads. In collecting geographic data for use in navigation systems, shape points are determined for segments of roads that bend or curve so that the position of points along the road segment can be accurately determined. When road segments are straight, shape points are generally not included. When used in a navigation system, this lack of shape points for long, straight portions of a road segment may result in difficulty associating the road segment with a particular locality during map display or spatial searches. In this aspect of the disclosed system, shape point data are generated at intervals along straight road segments and associated with the respective road segment thereby providing a means to locate the road segment within the localities along its straight portions.

BRIEF DESCRIPTION OF THE DRAWINGS

FIG. 8E is a diagram illustrating the relation of the aggregated segment in FIG. 8D to other data to which it is associated.

FIGS. 9A, 9B, and 9C are flow diagrams showing the components of an embodiment of a geographic dataset compiler for producing a geographic database for storage on a storage medium used in the navigation system of FIG. 1.

FIGS. 11A, 11B, and 11C are illustrations showing subdivision of cartographic data in a process in the compiler illustrated in FIGS. 9A–9C.

DETAILED DESCRIPTION OF THE
PREFERRED EMBODIMENTS

I. Overview

Figure 1:
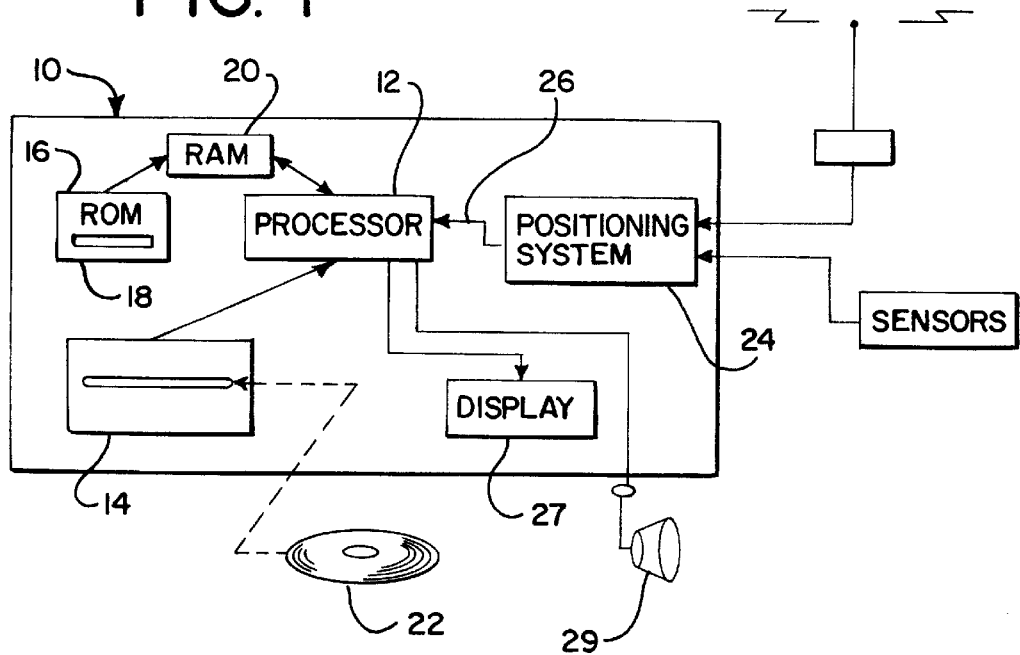
FIG. 1 is a diagram illustrating a navigation system including a storage medium upon which geographic data, and optionally other data, are stored.

Referring to FIG. 1, there is a diagram illustrating an exemplary configuration of a navigation system 10. The navigation system 10 is a combination of hardware and software components. In one embodiment, the navigation system 10 includes a processor 12, a drive 14 connected to the processor 12, and a memory storage device 16, such as a ROM, for storing a navigation application program 18. The navigation application program 18 is loaded from the ROM 16 into a memory 20 associated with the processor 12 in order to operate the navigation system. A storage medium 22 is installed in the drive 14. In one present embodiment, the storage medium 22 is a CD-ROM. In another alternative present embodiment, the storage medium 22 is a PC Card (PCMCIA card) in which case the drive 14 would be substituted with a PCMCIA slot. Various other storage media may be used, including fixed disks, hard disks, DVD's, as well as storage media that may be developed in the future. The storage medium 22 includes geographic data, as described more fully below.

The navigation system 10 may also include a positioning system 24. The positioning system 24 may utilize GPS technology, a dead reckoning-type system, or combinations of these, or other systems, all of which are known in the art. The positioning system 24 outputs a signal 26 to the processor 12. The signal 26 may be used by the navigation application program 18 that is run on the processor 12 to determine the location, direction, speed, etc., of the navigation system 10. The navigation system 10 uses the geographic data stored on the storage medium 22, possibly in conjunction with the output 26 from the positioning system 24, to provide various navigation application features. These navigation application features may include, for example, route calculation, map display, vehicle positioning (e.g. map matching), and maneuver generation (wherein detailed directions are provided for reaching a desired destination). These navigation application features are provided by navigation application programs (i.e. subprograms or functions) that are part of the navigation application 18. The navigation features are provided to the user (e.g., the vehicle driver) by means of a display 27, speakers 29, or other means.

Figure 2:
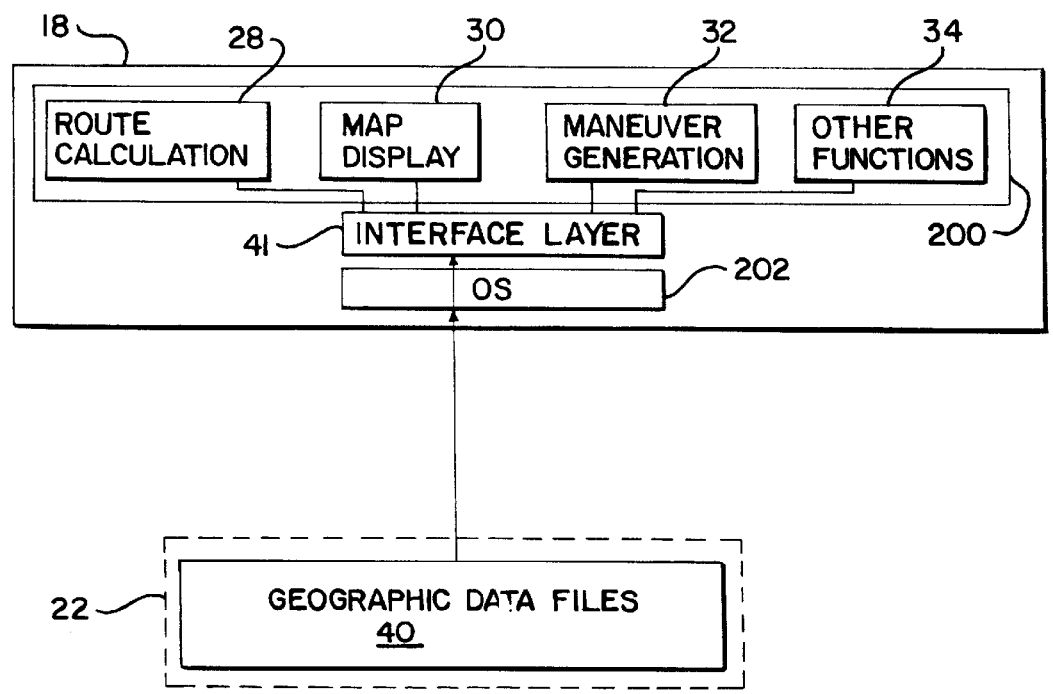
FIG. 2 is diagram illustrating the software components in the navigation system of FIG. 1.

Referring to FIG. 2, the navigation application program 18 typically is a software program that includes separate functions (or subprograms) including, for example, a route calculation function 28, a map display function 30, and a maneuver generation function 32. The navigation application program 18 may include other functions or subprograms 34 in addition or alternatively to these. Although these navigation application subprograms are represented as separate functions or applications within the navigation application program 18, these functions may be combined or otherwise provided.

In FIG. 2, the storage medium 22 is shown to have geographic data 40 stored on it. The geographic data 40 are in the form of one or more computer-readable data files or databases. The geographic data 40 may include information about the positions of roads and intersections in or related to a specific geographical regional area, and may also include information about the attributes of the roads and intersections, such as one-way streets and turn restrictions, as well as other information, such as street addresses, alternative routes, hotels, restaurants, museums, stadiums, offices, automobile dealerships, auto repair shops, etc. The regional area may include a metropolitan area, such as Chicago and its suburbs, New York and its suburbs, Los Angeles and its suburbs, or alternatively, the regional area may include an entire state, such as California, an entire country, such as the United States, or combinations of these. More than one region may be stored on a storage medium.

The various functions 28, 30, 32, and 34, of the navigation application program 18 use portions of the geographic data 40 from the medium 22 in order to provide useful navigation features to the user of the navigation system 10. Though not necessary for the present embodiments, it is preferred that the navigation system include an interface layer 41 located between the various application functions 28, 30, 32, and 34 and the geographic data files 40. The interface layer 41 facilitates the application programs in accessing and reading the geographic data 40. In one embodiment, the interface layer 41 is a collection of software library functions that isolate the navigation application functions from the details of the geographic data 40. The interface layer 41 is described in more detail in the copending application entitled "INTERFACE LAYER FOR NAVIGATION SYSTEM", filed on even date herewith, the entire disclosure of which is incorporated herein by reference.

II. Types of Geographic Data

As mentioned above, the geographic data 40 includes detailed information about roads, intersections, speed limits, street names, location names, turn restrictions, street addresses, alternative routes, hotels, restaurants, museums, stadiums, offices, automobile dealerships, auto repair shops, etc. These data may be represented in various different ways. Some ways may be proprietary whereas other ways may be in the form of industry or defacto standards.

One format used for geographic data is the GDF (Geographic Data File) format. Other formats are available and are understood to be encompassed within the present embodiment. The GDF 3.0 format is described in a document issued by the CEN (Europe a n Committee for Standardization) on Oct. 12, 1995, the entire disclosure of which is incorporated herein by reference. The GDF format also is being considered for adoption outside of Europe by the ISO (International Standards Organization). The GDF format is an interchange format for geographic databases. The GDF format is especially suitable for transferring geographic data sets from another format or to another format. In order to use a geographic data set in a navigation system, the geographic data set may need to be converted from the GDF format into a more specialized format. This conversion process is discussed in more detail below.

For purposes of the discussion of the embodiments herein, the following terminology is used. It is understood that other terminology may be used without departing from the scope of the present disclosure.

For purposes of this embodiment, the terms "feature", "attribute", and "relationship" with respect to a geographic data set may have the definitions set forth in the CEN GDF standard, mentioned above. Specifically, the term "feature" may refer to a database representation of a real world object, the term "attribute" may refer to a property of a feature which is independent of other features, and the term "relationship" may refer to a property of a feature involving other features. In other data models, different terms may be used, but the similar concepts would be applied in a similar manner.

In the geographic data set, nodes and segments are features.

A node is a point representing the intersection of two or more roads, the end of a road, or a point along a road where the road attributes change.

A segment is a representation of a section of a navigable road. A segment has a node at each end and may have one or more shape points along its length.

The following attributes are associated with a segment:

(1) A shape point is a point along a segment where the segment bends, or where the segments cross each other at a different grades.

(2) A landmark is the intersection of a segment with a cartographic feature that is considered significant for explication purposes such as a river or railroad.

(3) A rank specifies the highest routing data layer in which the segment appears and may also correspond to a functional class of the segment.

(4) The speed category classifies the segment based upon average speed.

(5) The lane category classifies the segment based upon the number of lanes available for travel in a single direction.

(6) The route type specifies the type of route, for example, European, Autobahn, Bundesstrassen, Landesstrassen, or Kreisstrassen in Germany, or Federal, Interstate, State, or County in the USA.

(7) The access characteristics specify restrictions on the types of traffic that are permitted to travel on the segment.

A POI (point-of-interest) is a feature such as a hotel, a restaurant, museum, etc. A facility type is an attribute of a POI and identifies the functional category of a POI, such as a hotel, restaurant, museum, etc.

A cartographic point is a representation of any point feature, such as a landmark.

A polygon is the border of some two dimensional area or cartographic feature, such as a lake.

A polyline is a representation of a linear cartographic feature, either non-navigable or navigable.

An administrative area is the region of a governmental entity, such as a city or county.

A zone is the region of a non-governmental name for an area, such as a neighborhood or an unincorporated village.

A Place can be an administrative area or zone.

Third party data (TPD) is information about additional points-of-interest. These additional points-of-interest data may be provided by a third party data vendor or may be otherwise provided in a manner such that they are not fully integrated with the rest of the geographic data.

In addition to the types of information described above, there may be additional types of data included on the storage medium. For example, soundex-type data may be included. This type of data provides for the identification of entities by words or phrases that sound like, or have a similar pattern to, a requested item. The data may be returned to the end-user in the form of a list of possible matches for a requested item.

III. Organization of geographic data

Referring again to FIG. 2, the geographic data 40 are organized and arranged in a manner that facilitates and/or enhances the performance of the various navigation application functions 28, 30, 32, and 34. Some of the aspects of the organization and arrangement of the geographic data 40 are specific to the particular physical medium used, but other aspects facilitate and enhance the performance of the navigation functions independent and regardless of the particular storage medium. The aspects of the organization of the geographic data that facilitate the navigation functions include parcelization and parcel identification of the geographic data, and the inclusion of normalized attributes, supernodes, and segment aggregation in the geographic data. Each of these aspects is described in more detail below.

Each navigation function application or subprogram 28, 30, 32, and 34, typically uses only a specific subset of the entire geographic data 40. Where the subsets overlap, the different applications making use of the same data may access them by different paths, in different orders, or may have different performance requirements.

Figure 3:
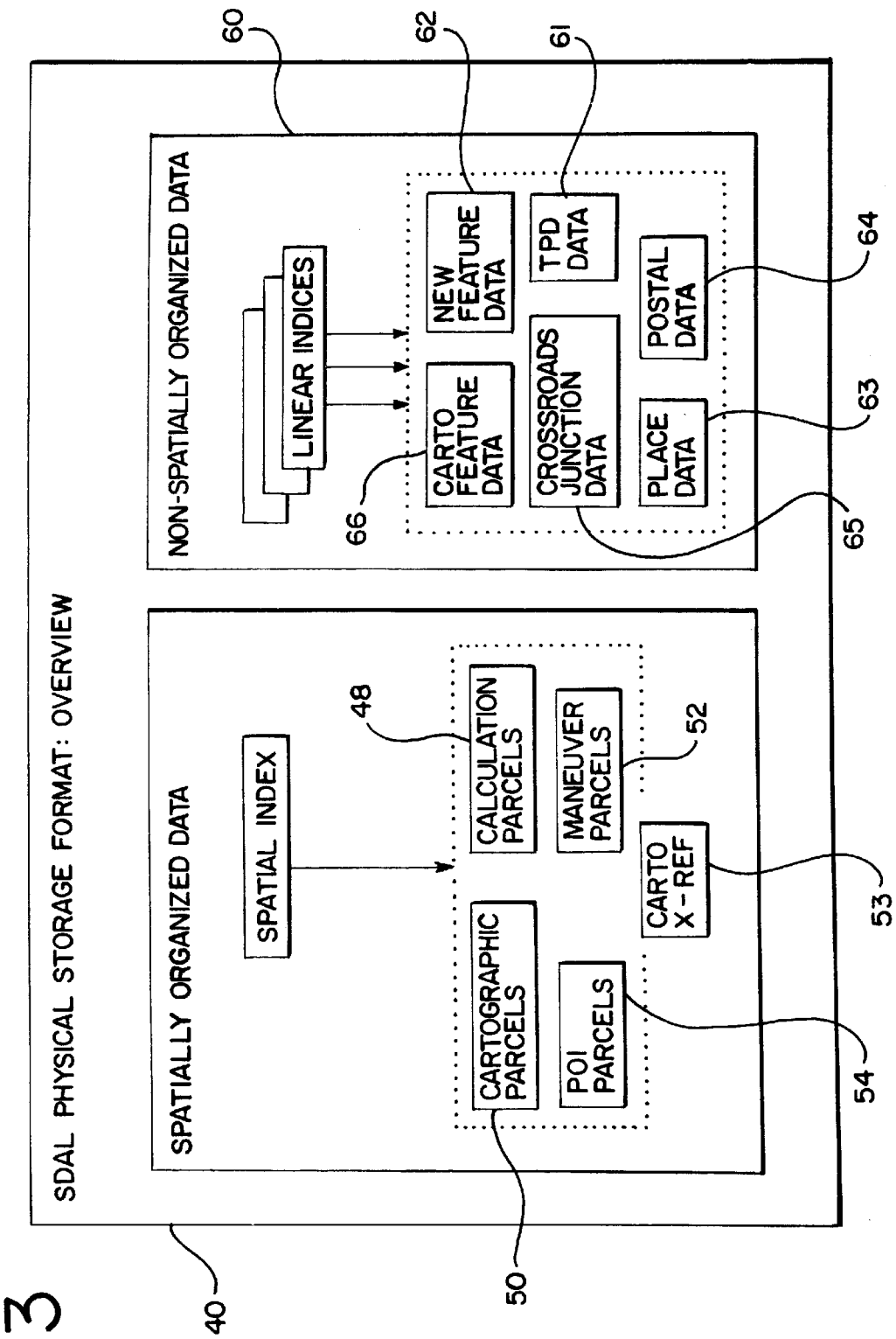
FIG. 3 is a diagram illustrating the types of navigation data files stored on the storage device of FIG. 1.

Referring to FIG. 3, in a preferred embodiment, the geographic data 40 are organized as separate groups or subsets of the geographic data. Each of the groups includes different portions or collections of the data. The portion of the data included in each of the groups of the geographic data is related to the navigation application function that utilizes the specific collection of the data. In general, each of the functions 28, 30, 32, and 34 has its own subset or collection of the entire geographic dataset. Arrangement of the data in this manner may result in some duplication of portions of the entire collection of geographic data. However, the navigation application functions will generally run faster if each navigation application function accesses only a subset of the entire geographic data and if that subset includes only that portion of the entire geographic data set that the particular application needs. In general, the portion of the data used and associated with one function is grouped separately from the portions of the data associated with and used by the other functions. Further, in general, the data used by each one of the functions are collected together into physical proximity. At the same time, the subsets of data may share overall parcelization boundaries and other organizational structure, which structural similarities further enhance the efficiency and performance of the application programs.

Each of the groups of geographic data used by each of the functions is organized into parcels, as explained more fully below. Parcels are collections or groupings of data into similar or regularly-sized (though not necessarily equal) amounts. When stored on a storage medium, parcels may correspond to physically distinct locations existing on the storage medium. In one present embodiment, a parcel also represents the smallest quantity of data that is retrieved from the storage medium.

The size of parcels (i.e. the maximum amount of data to be included in a parcel) is predetermined taking into account several factors. One factor used to determine the parcel size includes the access characteristics of the storage medium upon which the data will be stored. These access characteristics include transfer speed and latencies. For indexed data, there is a balance between the average number of index parcel retrievals required to search for a specified record of data and the average size of the index parcels. To minimize average search time for a specified record of data, single-speed CD-ROM characteristics may determine an optimal parcel size of 4–16 sectors (8–32 KBytes), and furthermore that an index parcel should contain an amount of data equal to the average of the data contents of the parcels that it indexes. Indexes can include kd-trees for spatial data and B-trees for ordered (e.g. alphanumeric) data.

Another factor used to determine the size of parcels relates to spatial types of geometric data (such as routing and cartographic). For these types of data, special considerations, such as special types of data, may be needed to account for parcel boundaries. Therefore, smaller parcel data content implies larger total special parcel boundary data, thereby resulting in larger total database data content and potentially less efficient access.

Another factor used to determine parcel size includes the memory constraints of the navigation system that will use the data. Many navigation systems have limited memory, or memory that is optimized for use with certain-sized blocks of data. Accordingly, to the extent possible, these types of hardware requirements are also considered in determining the size of a data parcel.

The geographic data 40 includes one separate group 48 of parcels of data used by the route calculation function 28, another separate group 50 of parcels of data for the cartographic function (i.e. map display) 30, still another separate group 52 of parcels of data for the maneuver function 32, another group 53 of data for cartographic cross-references, yet another separate group 54 of parcels of data for points-of-interest geographic data. In one present embodiment, all of these groups of parcels are in one file, although there may be more than one file.

The subsets of geographic data for each of the functions are cross-referenced (and may include pointers) to provide interoperability among the functions. The physical organization represented in FIG. 3 is independent of the type of media used, and it is recognized that the implementation of the organization represented in FIG. 3 will take into account the specific features associated with various different types of physical media, such as CD-ROM disc, PC card, etc.

Some of the subsets of geographic data are organized spatially. Spatially-organized data are arranged so that the data that represent geographically proximate features are located physically proximate in the data set 40 and on the medium 22. For some of the navigation application functions, spatial organization of their respective data provides for reading closely related geographic data from the medium more quickly and loading related geographic data into memory where it can be used. This kind of organization minimizes accessing of the storage medium 22 and speeds up operation of certain of the navigation functions.

The subsets of the geographic data that are organized spatially include the route calculation data 48, the cartographic data (map display) 50, the maneuver data 52, the cartographic cross-reference data 53, the points-of-interest data 54. Other of the data are organized and accessed non-spatially. The non-spatially organized data 60 include navigable features 62 (e.g., street names), places 63 (e.g. administrative areas and zones), postal codes 64, crossroads/junctions 65 and cartographic features 66. Third-party data 61 are not organized spatially. Each record of the third-party data 61 is associated with a record in the points-of-interest (POI) data 54. Since points-of-interest data 54 are organized spatially, spatial access to third-party data 61 can be achieved via their associated points-of-interest data 54.

In a preferred embodiment, both the route calculation portion 48 of the data and the cartographic portion 50 of the data are layered. Each layer within each data type extends to cover the same geographic region. However, higher layers of a data type contain less detail than lower layers. For example, layer 0 of the route calculation portion of the data generally will be the most detailed and will include all the streets and intersections in the geographical region to which the geographic data set 40 corresponds. Layer I of the route calculation data generally will omit the slower or less important streets in the geographical region, layer 2 generally will omit the next most slower or less important streets, and so on. (The inclusion of streets in given layers can be defined by the rank attribute. For example, assuming the street segments are given ranks of I to IV depending on the street type (e.g. alley or interstate), Layer 0 can be defined to include all ranks I–IV, Layer I can be defined to include only ranks II–IV (omitting rank I streets), and so on.) The route calculation function may be performed by using combinations of the layers, using the higher layers to the extent possible.

The map display function 30 also benefits from having its subset 50 of the geographic data organized to facilitate rapid panning and zooming. For example, zooming may be done more efficiently if the subset 50 of geographic data is organized into layers, with greater detail at the lower layers and less detail at the higher layers. Furthermore, in the subset 50 of geographic data used by the map display function 30, if each of the data parcels contains an index of its neighboring parcels at the same layer, as well as at layers above and below it, then panning and zooming can be done more efficiently by the map display function 30 without further looking up in a separate index file. The internal index of the parcel's neighbors at the same and other layers can be generated efficiently if parcel boundaries are established using the parcelization method described below.

The route calculation function 28 benefits from having its portion 48 of the geographic data 40 organized to facilitate searches for an optimal route between two points. Also, the route calculation function 28 can run more rapidly where as much of the geographic search data as possible is kept in memory 20, especially if access to the storage medium 22 is relatively slow, such as with a CD-ROM. Accordingly, the subset 48 of the geographic data 40 used by the route calculation function 28 is preferably organized so that each parcel covers a maximum possible physical geographic area (within the constraints of a fixed buffer size or a limited number of buffer sizes). This objective can be met by limiting the data or information in route calculation data parcels to only that information specifically relevant to route calculation, and including as little irrelevant information as possible. For example, in the subset 48 of the geographic data used for route calculation, the names of streets may be omitted.

Information such as street names is used instead by the maneuver function in order to generate directions to an end-user for route guidance. Thus, street names and additional information used for the maneuver function 32 are include in separate spatial and non-spatial data parcels 52. However, street name information is not included in the route calculation subset 48 or cartographic subset 50.

The points-of-interest geographic data 54 are parcelized spatially and may be interleaved with the cartographic data 50 to facilitate both the display of points-of-interest on the screen, and point-and-click selection of points-of-interests by users mostly to obtain points-of-interest "nearby" the vehicle or the route.

As mentioned above, to facilitate access to all types of map data in all contexts, the different types of spatially organized parcels (route calculation, cartographic, maneuver, points-of-interest and cartographic cross reference) each contain pointers to the other types of parcels covering the same geographic area. For example, a route calculation parcel contains pointers to cartographic parcels with data pertaining to coextensive or overlapping coverage areas. In addition, a number of indices or cross-references on important keys or attributes allows access to map data by various paths. For instance, a point-of-interest could be located by its "name", by its "facility type" (type of points-of-interest), or by its chain ID (e.g. "McDonald's" restaurants). This location could be further qualified to be within a city, or within a specified distance of the current location. A destination could be specified as a crossroads, a street address, or by point-of-interest name, possibly being qualified as being within a particular city or town or other geographical indicator.

IV. Physical Storage Format

A. Parcelization

1. Overview

As mentioned above, the data 40 on the storage medium 22 are parcelized, that is, most or all of the data are organized into smaller portions with each parcel including a plurality of data records and other information. Parcels also correlate to physical subdivisions for storage of the data on the storage medium. In general, the full collection of data pertaining to an entire geographic region is too large to be loaded into memory at one time. Therefore, the data is organized into smaller groupings or parcels. For some map data, the parcels are spatially-organized, i.e. each parcel represents geographic data encompassed with a geographic rectangular area (including square areas) of the physical region.

The groupings of data into parcels are made for several purposes. First, data are organized into parcels in an attempt to group into one parcel, or as few parcels as possible, most or all of the data that any one of the navigation functions may require in order to perform an operation for the user. If the user wants to display a map of his location, it would be preferable that the data relating to the geographic area immediately around the user are organized so that all the necessary data could be accessed and loaded into memory quickly. The parcels including all the data needed to display a map of the user's area should therefore be grouped together into one or as few parcels as possible. In general, the larger the parcel the better. Each parcel should ideally cover as much geographical area as possible so as many operations pertaining to that geographical area can be handled. Another reason that data are parcelized is so that data are grouped into parcels with each parcel having a size that can be readily used by the navigation system applications. These sizes relate to hardware and memory constraints and may be regular multiples of 2 Kbytes, 4 Kbytes, 8 Kbytes, or 16 Kbytes, for example.

In a preferred embodiment, parcels for all types of data are constructed using the same method. As mentioned above, it is desired that each parcel contain as much data as possible. If, for example, a rectangle encompassing the entire geographic area were merely bisected again and again until all the smaller rectangles formed therefrom contained no greater than a desired maximum amount of data, it is likely that many parcels formed from such rectangles would be considerably less than full. This results from the fact that a geographic area typically does not have a uniform density of geographic data. Having a considerable portion of parcels that are substantially less than full results in waste of space and poorer performance. The parcelization method described below provides for maximizing the number of parcels that are relatively full. The method described below also provides for a parcelization arrangement that expedites identification and retrieval of the parcels.

As mentioned above, each of the navigation functions is provided with a subset of the entire geographic data set suitable for that function. Accordingly, starting with a version of the entire geographic data set, separate subsets of the entire geographic data set are generated for each of the separate functions. For example, from the entire geographic data set including all the geographic data for a particular geographic region, separate subsets of the geographic data are generated including a route calculation data subset, a cartographic data subset, a maneuver data subset, a points-of-interest data subset, a cartographic feature data subset, a navigable feature data subset, a crossroad/junction data subset, a third party data subset, a place data subset, a postal zone data subset, and so on. After, or as part of, the generation of the separate subsets, parcelization of each of the subsets is performed. The subsets can be parcelized in any order, but in a preferred embodiment, for the spatially organized data (i.e., routing, cartographic, maneuver, and so on), the type of data that is expected, in general, to be the densest set, i.e., the subset of data expected to be divided into the largest number of parcels, is parcelized first to generate a global kd-tree. For example, the route calculation data may be the densest, and accordingly, parcelization is performed on that subset of the geographic data first.

2. Determination of Initial Parcel Boundaries

Figure 4A:
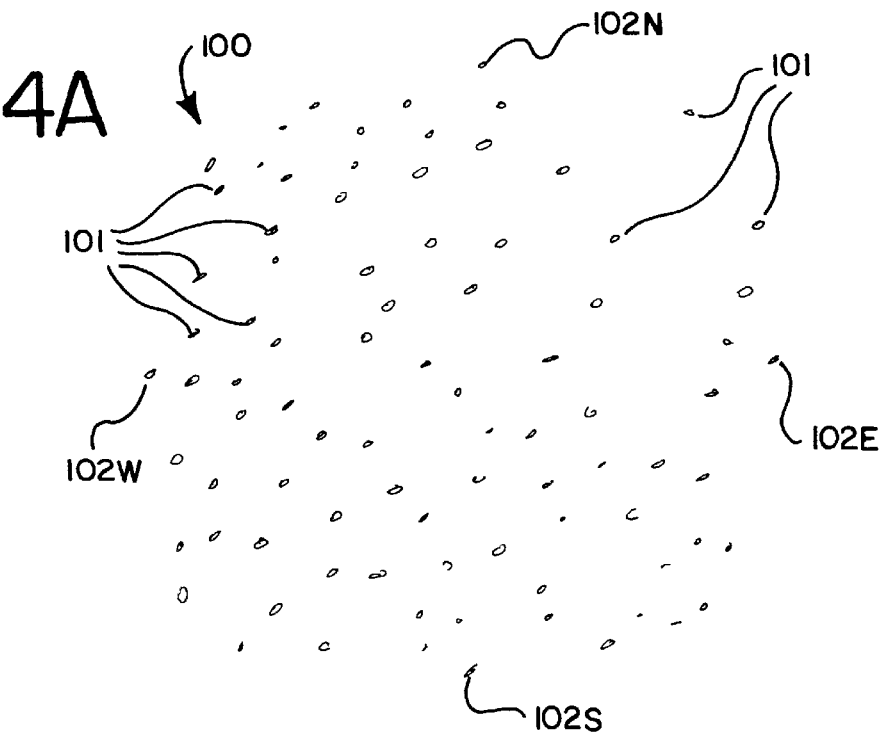
FIGS. 4A–4D are illustrations depicting the parcelization process for organizing the navigation data on the storage device of FIG. 1.

Although it is possible to establish an initial parcel boundary at any location, in a preferred embodiment, initial placement of parcels boundaries is chosen as follows. First, the geographic data are examined to determine their outer geographic boundaries. Referring to FIG. 4A, there is an illustration of a map of a geographic area 100. The geographic data 40 to be stored on the storage medium 22 relates to the geographic area 100. Shown on the map of the geographic area 100 are a plurality of points 101. As mentioned above, parcelization is first performed on one of the subsets of data, for example the route calculation subset. Included in the route calculation subset of data are individual data records that identify nodes. The node records correspond to specific physical locations in the geographic area 100. Each of the nodes has a specific latitude, longitude, and relative elevation ("Z-level"). The route calculation subset of data also includes data records that identify segments. The segment records correspond to physical features that have a length, such as portions of roadways in the geographic area. Each of the segment records refers to and can be identified by nodes located at the end points of the segment. In addition, a segment may include one or more shape points between its end points that are used to identify a bend (or physical position) in the segment. Accordingly, all of the spatially-related geographic data may be identified by nodes that have a unique latitude and longitude in the geographic area 100. The points 101 shown in FIG. 4A correspond to the nodes in the geographic dataset. Each of the points 101 is shown on the map of the geographic area 100 at the location corresponding to the latitude and longitude of the node to which it corresponds in the route calculation subset of the geographic data set. FIG. 4A is used for illustration purposes only, and in a preferred embodiment, the parcelization procedures described herein are performed by a computer program operating on the appropriate subset of the data.

Referring again to FIG. 4A, the outermost nodes are identified. For example, node 102W is the node in the route calculation portion of the geographic data set that has the maximum longitude, node 102E is the node in the route calculation portion of the geographic data set that has the minimum longitude, node 102S is the node in the route calculation portion of the geographic data set that has the minimum latitude, and node 102N is the node in the route calculation portion of the geographic data set that has the maximum latitude. The nodes 102N, 102S, 102E, and 102W define a minimum bounding rectangle ("MBR") 106, as represented by dashed lines in FIG. 4B. A minimum bounding rectangle is the smallest rectangle that contains all of the geographic data.

In a preferred embodiment, dimensions of latitude and longitude are expressed in navigation dimensional units equal to 1/100,000 of a degree. Like degrees, navigation units may be absolute or may refer to a coordinate position on the surface of the earth. Furthermore, in a preferred embodiment, the dimensional units are integers. Thus, the smallest unit of measurement is "1" which represents 1/100,000 of a degree. In alternative embodiments, other-than-degree values can be chosen as units to represent dimensions, and measurement units can be chosen that include fractions.

In a preferred embodiment, the minimum bounding rectangle is adjusted outwardly at its eastern and northern edges by one additional dimensional unit from those defined by nodes 102N and 102E. For example, if 102N had a latitude of 282, then the northern side of the minimum bounding rectangle would be at the latitude 283, i.e. 282+1. Likewise, if 102E had a longitude of 90,000, then the eastern side of the minimum bounding rectangle would be at the longitude 90,001. This is illustrated in FIG. 4C.

The data set defined by such an adjusted minimum bounding rectangle can be regarded to include all data encompassed within the minimum bounding rectangle, as well as any data that intersects the western and southern edges (but not the northern and eastern edges) of the minimum bounding rectangle. The advantage of using such an adjusted minimum bounding rectangle is that each minimum bounding rectangle will consequently encompass a unique data set. In other words, a node will be found in only one minimum bounding rectangle. This holds true even where the longitude of the eastern edge of a given minimum bounding rectangle (equal to longitude+1 of 102E) is the same as the longitude of the western edge of the minimum bounding rectangle to the immediate east.

The former minimum bounding rectangle only includes data encompassed by such shared edge (but not data intersecting the shared edge), whereas the latter minimum bounding rectangle may include data intersecting the shared edge.

In a preferred embodiment, a minimum enclosing dividable-tile (or "di-tile") 107 is determined that encompasses the minimum bounding rectangle 106. A dividable tile ("di-tile") refers to an area of dimensions $2^I \times 2^J$ that includes all map data between latitudes M×$2^I$ navigation units and (M+1)×$2^I$ navigation units and between longitudes N×$2^J$ navigation units and (N+1)×$2^J$ navigation units, where M and N are integers, and I and J are positive integers).

One way of determining a minimum enclosing di-tile is to define acceptable intervals and to require that the minimum enclosing di-tile have as its sides only acceptable intervals. Acceptable intervals are defined in both directions of latitude and longitude. (Any arbitrary starting location may be chosen, but in a preferred embodiment, acceptable intervals conform to conventional latitude and longitude starting locations, i.e. the equator and Greenwich). Acceptable intervals may be defined to include only powers of 2, for example: 0–1, 2–3, 4–5, 6–7, . . . , 0–3, 4–7, 8–11, 12–15, . . . , 0–7, 8–15, 16–23, 24–31, . . . , 0–15, 16–31, 32–47, 48–63, . . . , and so on (in navigation units).

Figure 4B:
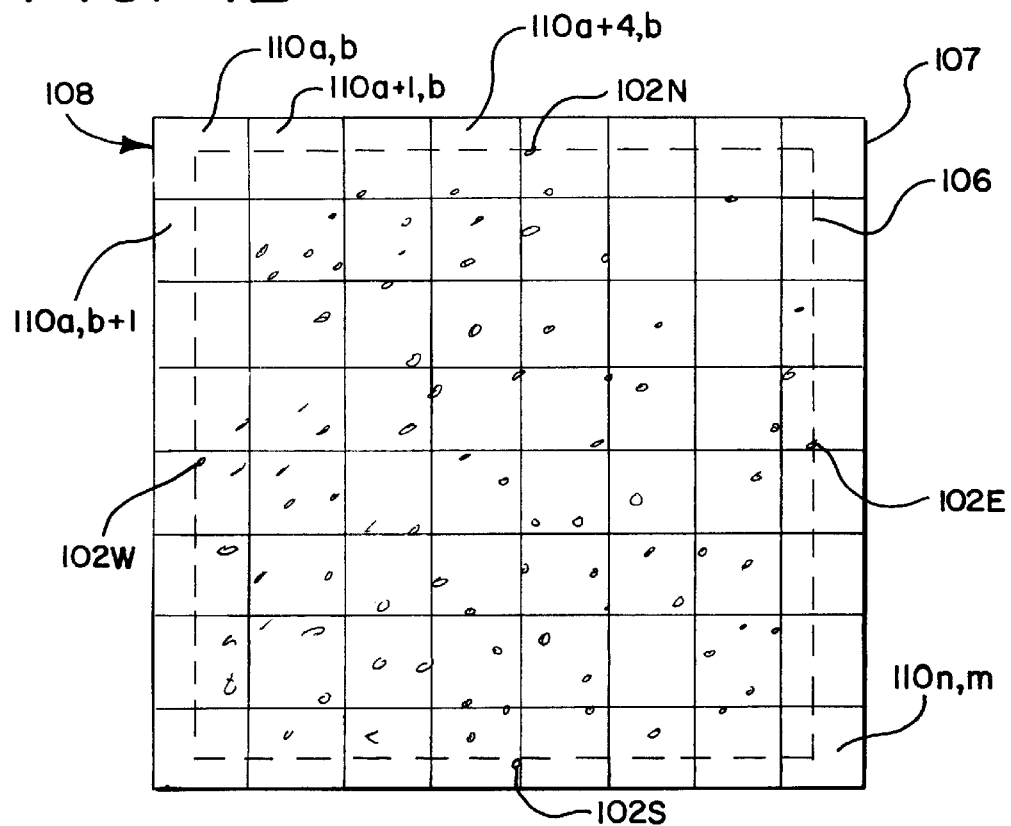
Figure 4C:
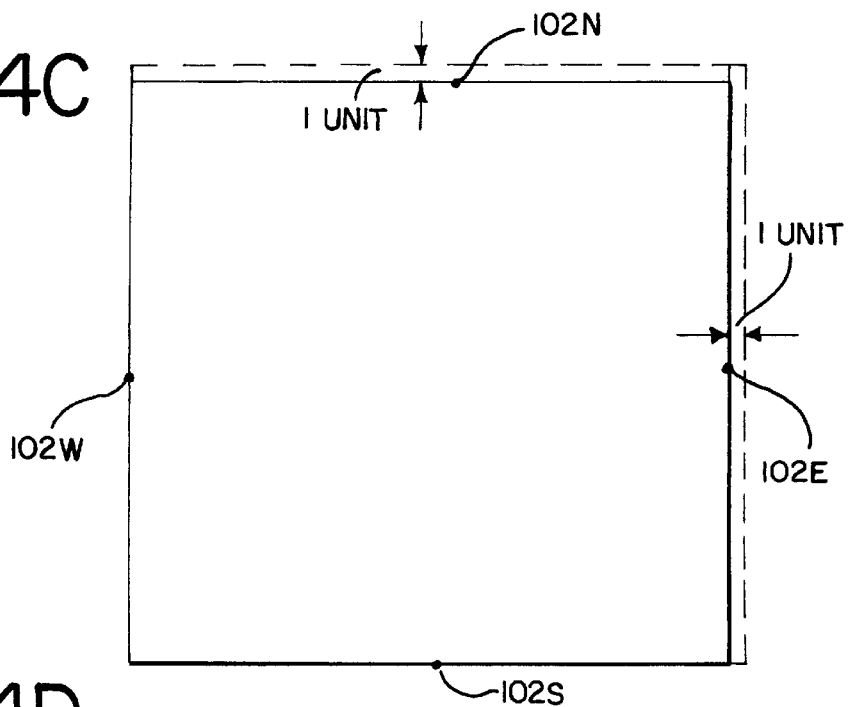
Figure 4D:
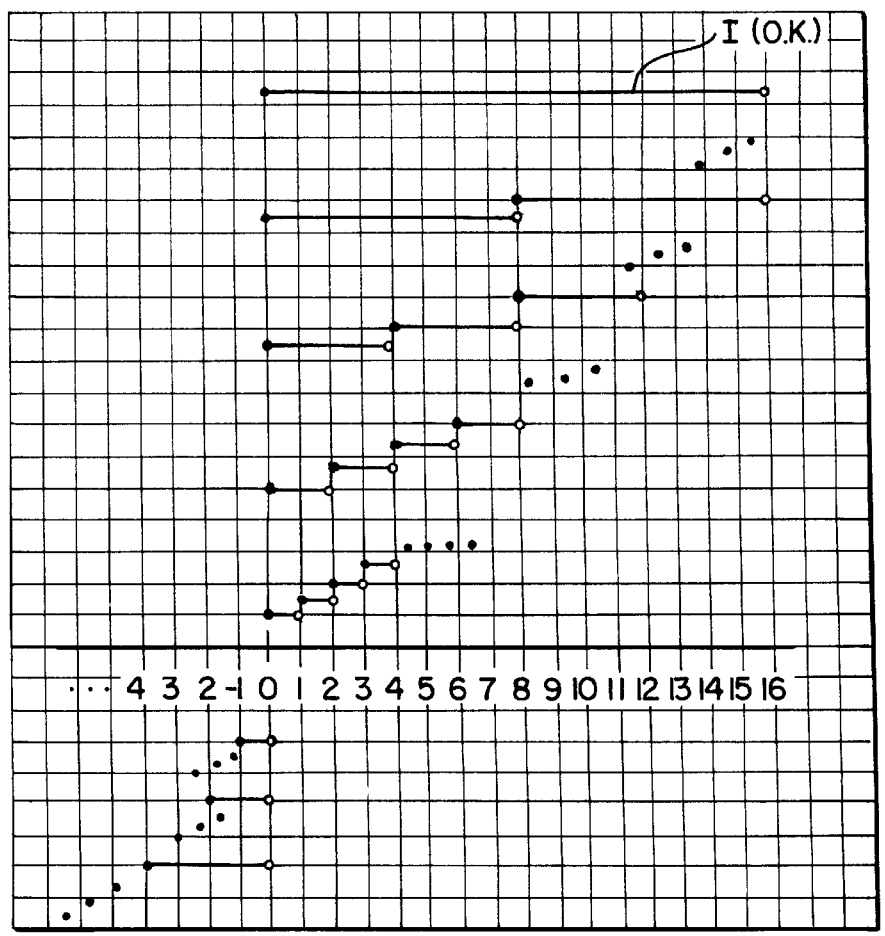

Referring to FIG. 4D, examples of acceptable intervals are represented. In FIG. 4D, "0" may represent either Greenwich or equator. The units 1, 2, S . . . an so on, may represent navigation units equal to 1/100,000th of a degree. Accordingly, starting from Greenwich (longitude 0), acceptable intervals include any of those represented by lines in the figure. For example, if the minimum bounding rectangle has a west coordinate of 5 and an east coordinate of 12, the acceptable interval would be the interval I(0,16). A similar set of acceptable intervals relative to the equator are defined for north-south coordinates.

As mentioned above, in a present preferred embodiment, the sides of the minimum enclosing di-tile for the minimum enclosing rectangle are required to be acceptable intervals. Therefore, in a present embodiment, the east-west coordinates of the initial di-tile are multiples of $2^I$ units, and the north-south coordinates of the initial di-tile are multiples of $2^J$ units. (I and J are integers so that the east-west length of the initial di-tile may have a dimension in unit's of 1, 2, 4, 8, 16, 32, 64, 128, 256, 512, or 1024, and so on, and the north-south length of the initial di-tile may have a dimension in units of 1, 2, 4, 8, 16, 32, 64, 128, 256, 512, or 1024 and so on, for example).

One advantage of forming the minimum enclosing di-tile in this manner is that di-tiles for different map coverage areas can be merged together more easily, since the boundaries for different map coverage areas are established using the same approach.

It is appreciated that in map coverage areas including both negative and positive navigation units (i.e. coverage areas in which the minimum bounding rectangle includes either the equator or Greenwich), additional acceptable intervals are required and accordingly, intervals of length $2^{18}$ starting at coordinates which are multiples of $2^{17}$, intervals of length $2^{19}$ starting at coordinates which are multiples of $2^{18}$, etc. are acceptable; some of these intervals overlap 0° longitude (Greenwich) and 0° latitude (the equator).

3. Establishing Initial Parcel Sizes

Once the minimum enclosing di-tile is established, the data can be parcelized. In one alternative, the parcelization process can begin by applying the regular division procedure, described below, to the minimum enclosing di-tile 107. However, in a preferred embodiment, the data in the coverage area are first examined based upon an organization of the data into a regular grid of rectangles formed from the minimum enclosing di-tile. This is equivalent to bisecting the minimum enclosing di-tile and then the rectangular (or squares) formed therefrom a number of times until a regular grid of rectangles results. Each of the rectangles in this grid may be referred to as an "initial tile." The initial tile size is determined to be the largest geographic area allowed to be represented by one parcel at any layer of any of the types of data in the geographic data set. In one embodiment, one fixed initial tile size is defined for all regions throughout the country so that regions can be more easily merged. In one present preferred embodiment, each of the initial tiles is of a fixed, predetermined size of $2^{17}$ navigation units by $2^{17}$ navigation units.

Such initial tiles are shown as the grid 108 in FIG. 4B. The initial tiles may alternatively be defined by simply overlaying the geographic area 100 with a regular grid having the same pattern as grid 108. In either event, the grid 108 is made up of initial rectangular tiles (e.g. tiles 110$_{a,b}$, tile 110$_{a+1,b}$, . . . tile 110$_{m,n}$).

The placement of the boundaries of the grid 108 is determined in order to enclose the minimum bounding rectangle 106, (that is, the minimum longitude (corresponding to node 102E), the minimum latitude (corresponding to node 102S), the maximum latitude (corresponding to node 102N), and the maximum longitude (corresponding to node 102W)). The grid boundaries are defined so that when the grid is overlaid on the region 100, as shown in FIG. 4B, all the spatial data are encompassed and the initial tiles have a size as described above. In a preferred embodiment, the placement of the grid boundaries also conforms to the acceptable intervals, described above.

EXAMPLE

An example for implementing the above procedure for determining the grid boundaries is as follows:

1. Start by setting MinLat, MaxLat, MinLong and MaxLong to the minimum and maximum latitudes and longitudes of the minimum bounding rectangle 106. These values are in units of 1/100,000 of a degree, so that they are in the range −18000000 to 18000000 for the longitudes and −9000000 to 9000000 for the latitudes.

2. For K=1 to 25 in increments of 1:
   (a) Divide MaxLat by $2^K$.
   (b) Multiply MaxLat by $2^K$. Since MaxLat is an integer, these two operations have the effect of truncating the K low-order binary digits of MaxLat. Actually, this is done by right-shifting and left-shifting MaxLat, which is more efficient than division and multiplication.
   (c) If the minimum bounding rectangle's maximum latitude is greater than MaxLat, add $2^K$ to MaxLat.
   (d) Divide MinLat by $2^K$.
   (e) Multiply MinLat by $2^K$.
   (f) If the minimum bounding rectangle's minimum latitude is less than MinLat, subtract $2^K$ from MinLat.

(g) If MinLat+$2^K$ is equal to MaxLat, stop. Otherwise repeat at step (a) for the next higher value of K.

3. Perform the operations of Step 2 on MinLong and MaxLong.

At this point MinLat, MaxLat, MinLong and MaxLong define the boundaries of grid 108, i.e., the di-tile, enclosing the minimum bounding rectangle 106.

4. Establishing Parcels

As mentioned above, a purpose of parcelizing the data is to include in each parcel an amount of data that is close as possible to, but not in excess of, a predetermined maximum parcel amount. For example, the predetermined maximum amount may be 16 Kilobytes.

Each one of the initial tiles in the grid 108 of FIG. 4B is examined as a "trial parcel" to see if the amount of data in it fits into a single parcel. If the data within the "trial parcel", including any parcel overhead (such as index information and headers), would (accounting for data compression, if used) be less than or equal to the maximum parcel amount, then a parcel is constructed with that initial tile and no division of that initial tile for that particular data type is performed. On the other hand, any "trial parcel" that includes an amount of data that exceeds the predetermined maximum parcel amount is divided using one of the two following procedures as a function of the amount by which the data in the "trial parcel" exceeds the desired maximum amount. (In a preferred embodiment, an estimation technique, described below, is used in determining trial parcels. The estimation technique takes into account parcel overhead and compression without actually performing all the steps necessary to form a parcel.)

Regular dividing procedure. If the amount of data in a "trial parcel" exceeds the maximum parcel amount by a predetermined multiple, the "trial parcel" is divided into two rectangles. In a preferred embodiment, the division of the "trial parcel" into two rectangles is carried out by first determining the minimum enclosing di-tile for the trial parcel (in the manner described above with the initial tile), bisecting the enclosing di-tile, and then dividing the "trial parcel" where the line of bisection of the di-tile intersects the trial parcel. Alternatively the "trial parcel" may itself simply be bisected. (It is noted that a bisection of the enclosing di-tile will not always bisect the trial parcel, but instead may divide the trial parcel at an off-center location. For case of reference herein, such division of the trial parcel will nonetheless be referred to as "bisection"). In either event, the line of bisection of the di-tile will be in either the longitudinal or latitudinal direction. In a present preferred embodiment, the di-tile is bisected in whichever of the longitudinal or latitudinal divisions minimizes the maximum aspect ratio ($\geq 1$) of the two resulting rectangles of the trial parcel. Each of these resulting rectangles is then examined as a "trial parcel", as described above, and bisected if the data contained in it exceeds the predetermined multiple of the maximum parcel amount. Each of these sub-rectangles is also then examined as a "trial parcel", as described above, and the process continues until the amount of data in a rectangle or sub-rectangle is less than the predetermined multiple of the maximum parcel amount. In a present embodiment, the maximum parcel amount is predetermined to be 16 Kilobytes of data, and therefore the predetermined multiple is 3.2. (In alternative embodiments, the maximum amount may be predetermined to be another amount greater than or less than 16K, such as 8K or 32K, or even amounts greater or less than these). Thus, "trial parcels" are bisected according to the current procedure where their data content exceeds 51.2 kilobytes. The predetermined multiple is chosen based upon a desired minimum fill percentage for each parcel. In the present embodiment, the desired minimum fill percentage is 80%. When the amount of data in any trial parcel is less than the predetermined amount, further subdivisions of the trial parcel follow the "Custom division procedure", described below.

Custom division procedure. If the amount of data in any "trial parcel" exceeds the maximum parcel amount, but is less than the predetermined multiple of the maximum parcel amount (e.g., 16Kb<x≤51.2Kb), the following custom division procedure is used: Further divisions of the "trial parcel" are not necessarily bisections, but rather are made in a manner that tends to minimize the number of parcels created. This has the effect of minimizing both the space needed to store the parcels and wasted space within the parcels.

For example, given a trial parcel that contains data equal to 3.6 times the maximum parcel size or amount, it should be possible to fit this data into four parcels. However, bisection of the trial parcel may divide it into two rectangles of 1.2 times the maximum parcel size and 2.4 times the maximum parcel size, respectively, which would then end up in a minimum of five parcels if bisection were used to divide each of the rectangles. Therefore, subdivisions of the rectangle at this stage are made with the goal of minimizing the number of parcels created, but with the restriction that the division line not be arbitrary. More particularly, where a "trial parcel" has a data content that is greater than the maximum parcel size, but not in excess of the predetermined multiple thereof, the "trial parcel" is divided at a division of $2^{-x}$ along one of its dimensions. In a present preferred embodiment, X={1,2,3,4,5}. Thus, the trial parcel is divided at 1/2 or 1/4 or 1/3 or 1/16 or 1/32 divisions of its width. For example, a trial parcel may be divided into two rectangles with widths equal to 5/8 and 3/8, respectively, of the width of the trial parcel. This custom division may be applied directly to the dimensions of the trial parcel, or, in a present preferred embodiment, it may be applied to the dimensions of, a minimum enclosing di-tile of the trial parcel. In the latter case, the trial parcel is divided where the division line of the di-tile intersects the trial parcel. In either event, the division line will be in either the longitudinal or latitudinal direction.

Candidate division lines are examined as follows: First, divisions are made at each of the specified $2^{-x}$ divisions along both the longitudinal and latitudinal widths of the trial parcel. For each such division, the aspect ratios (defined as the ratio of the larger dimension to the smaller dimension) of each of the two resulting rectangles are determined, and the greater of the two is identified. The greatest aspect ratios identified for each of the candidate division lines are then compared, and the candidate division lines are ordered from smallest to greatest of such aspect ratios. The rectangles resulting from the candidate division lines are then examined, beginning with the first candidate line in the ordered list. The candidate division line chosen for dividing the trial parcel is the first one in the list encountered where the data content in one of its two resulting rectangles is greater than the maximum parcel size but less than or equal to a multiple (such as two times) of a minimum fill percentage times the maximum parcel amount and the maximum parcel amount. For example, the division line is chosen to include in one of the resultant rectangles an amount between 1.6 and 2.0 times the maximum parcel amount. This should enable making one more division of the rectangle to form two further sub-rectangles each with a fill percentage greater than 80% (0.8) of the maximum parcel amount. Each of these resultant sub-rectangles with a fill percentage between 80% and 100% of the maximum parcel amount is formed into parcels. If no candidate division line meets this criterion, then the first candidate division line (i.e. the one with the smallest maximum aspect ratio) is used to divide the given rectangle.

EXAMPLE

The following describes how, during parcelization, a determination is made of when to stop bisecting trial parcels, and to start the custom procedure of evaluating candidate divisions of 1/32, 1/16, 3/32, 1/8, 5/32, 3/16, 7/32, 1/4, 9/32, 5/16, 11/32, 3/8, 13/32, 7/16, 15/32, 17/32, 9/16, 19/32, 5/8, 21/32, 11/16, 23/32, 3/4, 25/32, 13/16, 27/32, 7/8, 29/32, 15/16, and 31/32 along both the longitudinal and latitudinal widths of the trial parcel.

A target parcel fill percentage F is chosen. For the sake of example, let F be 0.8 (80 percent). As mentioned above, a maximum parcel size P is also determined. P is expressed in bytes and is the maximum amount of data that can be put into a parcel. Optimally, therefore, it is desired to create parcels in the range of F×P bytes and P bytes in size.

If a trial parcel having a data size D is in the range P<D<1.6×P, then it is not possible for parcels to be created therefrom whose data sizes fall in the target range. If the trial parcel is divided such that one resulting rectangle has a data size greater than or equal to 0.8×P, then the other one has a data size less than 0.8×P.

This process can be extended to give the following list of non-acceptable data sizes:

Unacceptable Data Sizes D:

0<D<0.8×P

P<D<1.6×P

2×P<D<2.4×P

3×P<D<3.2×P

The list stops at this point, because the next entry would be

4×P<D<4×P.

From the above list a complementary list of acceptable data sizes can be generated:

Acceptable Data Sizes D:

0.8×P≦D≦P 1.6×P<D<2×P 2.4×P<D<3×P 3.2×P<D

The above list corresponds to a fill percentage F equal to 0.8. Other fill percentages generate different lists of acceptable or unacceptable data sizes. In general, the list of unacceptable data sizes is in the following form:

Unacceptable Data Sizes D:

0<D<F×P

P<D<2×F×P

. . .

n×P<D (n+1)×F×P continuing until an empty range is reached.

The above is used as follows in the custom procedure for forming the parcels: The data sizes of each of the two rectangles resulting from a trial parcel division should fall within one of the acceptable ranges (whenever possible). In practice, this means that as long as the data size in a rectangle is somewhat larger than the high end of the highest unacceptable range (3.2×P, in the example), the rectangle can be divided according to the above-described bisection procedure. Once the high end of the highest unacceptable range is approached, custom divisions (i.e., divisions of 1/32, 1/16, 3/32, 1/8, etc. in this example) are considered.

Candidate division lines are examined and compared in the manner described above, and the one selected for division is where the following criterion is met: The amount of data falling into each of the two subrectangles of the trial parcel is of a size such that it is theoretically capable of, in turn, being subdivided into rectangles that, on the average, achieve a specified minimum parcel data fill percentage. Some cases may occur in which the above criterion cannot be met.

The data are divided at the division line chosen in the custom division procedure, and, for each of the two subrectangles created, the custom division process is repeated as necessary. As mentioned above, the bisection and custom division procedure can be applied either directly to the trial parcel or to the minimum enclosing di-tile of the trial parcel, although the latter is preferred. It is noted that in some cases the minimum enclosing di-tiles are exactly equal to trial parcel boundaries. This most notably may occur with respect to the initial tiles 108. The utility of defining the divisions in terms of the minimum enclosing tiles is that a tile can be repeatedly divided in half evenly, whereas a trial parcel rectangle of arbitrary dimensions cannot. Another advantage is that this procedure facilitates processing at boundaries between different databases. The custom division of a trial parcel at a $2^{-x}$ division of the tile's side is equivalent to a sequence of from 1 to X bisections. Consequently, the division lines, and therefore the resulting subrectangles, can be represented in a minimal number of bits (5 bits for 1/32 divisions, as opposed to up to eight or sixteen bytes to define an arbitrary rectangle).

(In examining amounts of data included in rectangles, a convention is established that any data entity that is located exactly on a dividing line is included with the data in the rectangle "to the right" ("east") of the line, if the dividing line is a north-south line, and with the data "above" ("north of") the line, if the dividing line is an east-west line.)

The above procedure is performed on all the initial tiles 110 (and, where necessary, all resulting rectangles) in the grid 108.

5. Subsequent Parcelizations

As mentioned above, each subset or type of geographic data is maintained separately from subsets of other types. For example, route calculation data are located separately from cartographic data. Further, within a single subset of data, the data may be further separated into layers.

After the parcelization procedure described above is performed on one layer of one type of geographic data (i.e., the layer and type estimated to be the densest, such as layer 0 of the route calculation data), parcelization of the other layers of the same data type and other data types are performed. These other parcelizations (i.e. parcelizations of other layers of the same data type and of other data types) begin with exactly the same initial tiling grid 108 as was used in the initial parcelization. At each recursive level in each subsequent parcelization of different data types, when subdivision of a rectangle is necessary it is required to be performed at exactly the same division line (whether accomplished through bisection or custom division) that was used during the parcelization of the initial data type (or any previous parcelization).

Since higher layers are less dense, it may not be necessary to divide the data into as many parcels in order that each parcel be within the maximum parcel size. Accordingly, at higher levels of a particular data type, there may be fewer parcels and some of the parcels may represent a larger geographic area than at the lower layers. However, as mentioned above, the divisions of the data of the higher levels are made along the same dividing lines that were made in the lower levels and divisions at the higher levels proceed as far as needed until an amount of data not greater than the maximum parcel size is reached.

During a subsequent parcelization, it may be necessary for the division process to proceed further than in a prior parcelization. This occurs if the data of the subsequent data type located in any of the initial tiles or rectangles formed therefrom is more dense than the data type used during a prior parcelization. In this case, the original parcelization may not have divided the initial tile into small enough sub-rectangles so that each contains less than the maximum parcel amount of the subsequent data type. In this case, a division line is determined as it would have been in the initial parcelization procedure. This requirement means that, for parcels A and B of different layers or types, it is always the case either that the geographic area covered by parcel A is contained in that covered by parcel B, or the geographic area covered by parcel B is contained in that covered by parcel A.

In other words, after the type of data with the greatest expected data density (e.g., layer 0 of the route calculation data) has been parcelized, other layers of the same data type (e.g. layer 1 of the route calculation data) or other data types (e.g., layer 0 of the cartographic data) are parcelized in parallel to the initial parcelization, as follows:

1. The subdivision of data into initial rectangles begins with exactly the same set of tiles.
2. Whenever data in a particular rectangle exceed the maximum parcel size, and therefore has to be subdivided, one of two procedures is used (1) If that rectangle was subdivided in the initial parcelization, or in any previous parcelization, then exactly the same division line is used as was used in the previous parcelization. (2) If that rectangle was not previously divided, then its division line is determined in the manner described above for the initial parcelization.

Advantages

The parcelization method and organization described above has several advantages, including the minimizing the creation of parcels that are less than optimally-filled, and thereby maximizing storage efficiency on the storage medium. This allows more data to be kept in memory buffers at one time, given buffers of one or a few fixed sizes. In addition, the parcelization method and organization make it easy to navigate between neighboring parcels of the same type and layer, without having to include the bounding rectangles of these neighbor parcels in each parcel, or having to read a separate spatial index. Because of the regularity in the method of defining parcel boundaries, a minimally-sized spatial index of nearby parcels can be carried within each parcel. Further, because different layers and different parcel types are parcelized in parallel, this method makes it easy to navigate between parcels of different types or at different layers that cover the same or overlapping geographic areas. Furthermore, the use of di-tiles for dividing panels makes it easy to navigate between bordering but separately stored, geographic database regions.

6. Ordering of Parcels

Once all the parcels for all the data types are established, the parcels are placed in order to facilitate the eventual writing of the parcels to disk. To minimize seek time in reading data from a storage device, such as a CD-ROM disc, each spatial set of parcels is organized in depth-first order with respect to the global kd-tree index (i.e., so that for each division line, all parcels contained in the sub-rectangle with coordinates less than the coordinate of division precede all parcels contained in the sub-rectangle with coordinates greater than the coordinate of division) so that geographically neighboring parcels are likelier to be close together on a disc. The linear or spatial indices likeliest to be used to access a particular type of data are placed next to and preceding that data. Since the "global kd-tree" indexes all spatial parcels types, it may be redundantly replicated at various locations on the medium (i.e., near to and preceding each data set of spatial parcels).

Parcels are stored on disk approximately in Peano key order. The actual ordering of the parcels is based on the two-dimensional kd-tree (representing the entire database region) that is generated during parcelization, as the initial di-tile is recursively split into sub-rectangles and finally into parcels. The ordering of the parcels is generated by a depth-first traversal of this kd-tree. Due to the method (described above) by which the region's initial enclosing di-tile is chosen, and by which each division line is chosen during parcelization, this ordering would be identical to Peano key ordering were each rectangle's division line exactly to bisect that rectangle, but differs slightly from Peano key ordering at the lowest level of the kd-tree whenever division lines are not bisections. This ordering, like an exact Peano key ordering, makes geographically neighboring parcels likelier to be stored near each other on disk. An advantage of this ordering over exact Peano key ordering is that it is generated automatically by the parcelization process, so that an additional sort is not required. An index consisting of a two-dimensional kd-tree (explained in more detail below) can be used to access route calculation parcels spatially (the two dimensions are the latitudes and longitudes of the division lines used during parcel generation). This type of indexing is useful for initial location of an arbitrary position, such as when a route guidance application initially locates the map data corresponding to a vehicle's current position. Once a starting position is known, however, all information about nearby map data can be found in indices internal to a parcel.

7. Index Tree Parcelization and the Physical Storage Format

Various index trees are used in the physical storage format. These include the 2d "neighboring parcel kd-tree" that is stored in each route calculation, cartographic and points-of-interest parcel. Route calculation and cartographic data parcels also include a 2d "internal kd-tree."

Also used are various global index trees (per database region). In general, each of these trees may not fit into a single index parcel. An index parcel may contain a complete or partial tree (a global tree or subtree), or it may store more than one complete tree (subtrees of a global tree). Theoretical considerations imply that index parcels should have a size equal to the (average) size of the record parcels they index in order to minimize search times.

Parcelization of the global tree proceeds as follows. Nodes are stored in breadth first order (to balance search times). If a parcel has been filled so that another node cannot be stored in it, then a new parcel is created and an unstored node is selected as a root for the new parcel and it is recursively stored in breadth first order. An index parcel may contain more than one root only if the complete subtrees at these roots fit into the parcel; that is, if a complete subtree has been parcelized in an index parcel then another highest level unstored node may be stored as another root in that index parcel only if its complete subtree fits into the parcel; this prevents unnecessary cross-parcel index searching.

The roots are numbered (by tree identifier) in sequence starting with 0 within each index parcel. Thus, an inter-parcel reference to a node is by parcel ID (minus region specifier) plus tree ID. Intra-parcel reference to a node is by byte offset (as with the "neighboring parcel kd-tree" and the "internal kd-tree"). Index trees are stored decompressed in the index parcels.

The index parcel has the following structure. The first data in the parcel is the IdxPclHdr_t header (byte packed). Following the header is the offset array to the roots in the parcel, indexed by tree ID:

Ushort 16 root_offset[]; /*root offset array*/

Following the offset array are the trees.

8. Global Spatial Parcelization Tree

For each region there is a 2D kd-global spatial parcelization index tree. The structure of this tree corresponds to the parcelization that is a refinement of all parcelizations for all spatially parcelized data types (which is defined since parcelization proceeds in parallel with previous parcelizations for other data types). This tree is used for at least two different kinds of searches. First, the tree is used to determine in which parcel would contain a point given the point's latitude and longitude coordinates. Another type of search is used to determine the one or more parcels that would intersect with a rectangle given the rectangle's boundary coordinates. Both these types of searches may be used in various functions, including queries, map display, route calculation, and so on. A node in this kd-tree refers via its right (resp. left) descriptor identifier pair list to a data parcel if the rectangle corresponding to the node's right (resp. left) child is the bounding rectangle for that data parcel; it may refer to a data parcel of some type (e.g. layer 1 route calculation) and also have descendant nodes which refer to data parcels of another type (e.g. layer 0 cartographic).

Each "neighboring parcel kd-tree" represents a subtree of the global tree (except for the nodes representing external-to-region parcels); note that a node in the global tree may have a child stored in a different index parcel while the corresponding node in a "neighboring kd-tree" and the corresponding child are stored in the same parcel. The data structure for the global tree is similar to that of the "neighboring parcel kd-tree", with the following differences. First, value 01 for control bits 8–9 or control bits 10–11 mean that the pruned child appears as a root in a different index parcel; in this case the child offset is 4 bytes, and the first 2 bytes of the offset (between the index parcels storing the root and the child: all index parcels in the global tree have identical size and redundancy information, which allows the child parcel's ID to be constructed at runtime from this parcel ID offset), and the second 2 bytes of the offset give the tree ID. Furthermore, both left and right child offsets are required to have the same size (a 4 byte offset for a non-pruned child uses the rightmost, i.e. least significant bytes). Second, the descriptor list does not store table indices for parcel ID's but instead stores parcel ID's directly since there is no further reference to the parcel ID in the index parcel; however, these parcel ID's are not necessarily aligned in storage. Finally, the entire descriptor, identifier pair list is rounded up to a 2-byte-multiple total length because child offsets are in units of 2-bytes.

9. Route Calculation Parcel Internal Structure

The information in data records can be carried in a compressed form. After decompression, the data are still in a packed form in which there are no padding bytes and generally no unused fields. Each decompressed data record is therefore in the form of a variable-length character array. This decompressed but packed data is the source from which logical records passed to the navigation application program software by the interface layer 41 (of FIG. 2) are constructed.

For most records (notably excluding nodes and segments above the bottom layer), a table of offsets is used to locate the beginning of each block of $2^2K$ records. This reduces the number of variable-length records that have to be examined (compared with a sequential search for the desired record).

Data in the parcel header is used by the navigation application program (specifically, the interface layer 41) to navigate within the parcel. These data are therefore in a form that is immediately useable. For example, data in the parcel headers are stored in fields defined as two- or four-byte signed or unsigned integers, where applicable, instead of in character array fields like the data records.

Within a parcel at the bottom layer, node records are stored in Peano key order based on latitude and longitude, and segment records are stored in Peano key order based on the latitude and longitude of the segment's "left" node. This Peano ordering is followed down to the level of a grid of predetermined size, and within the grid a latitude-longitude ordering is followed. Entity ID's within a bottom layer parcel are then assigned consecutively within a parcel. At higher layers, segment and node records are simply stored in entity identifier order within the parcel.

Condition records are used to store information about restrictions or additional attributes associated with a segment, e.g. "no truck access." Date-time records include information associated with a condition that indicates when conditions are in effect, e.g. "no left turn 4:00 PM–6:00 PM." Condition and Date-time records are stored in Peano key order based on the Peano key of the primary segment's left node. Storage of records in Peano key order reduces the time spent searching for records within a parcel, since entities in spatial proximity are often represented by records near each other within a parcel.

10. Cartographic, Points-of-Interest, and Maneuver Parcels Internal Structure Except as noted below, the cartographic, points-of-interest, and maneuver parcels may have the same or a similar internal structure as the routing parcels. The cartographic and points-of-interest data may be interleaved within each layer. This is based on the expectation that cartographic data and associated points-of-interest data are frequently accessed together. Interleaving becomes more useful at higher CD-ROM rotational speeds because the rotational delay before the desired data are reached becomes proportionally less at higher speeds in comparison with the time required to move the read head to reach the data in the non-interleaved case. This is particularly true as the volume of data increases, since the distance the head would have to move (and the time it would take) to reach the non-interleaved data would increase as some function of the data volume.

The route calculation and maneuver data need not be interleaved, even though the data is parcelized in the same way and are used together for some functions. The reason for this is to make it possible to increase the speed of the route calculation process. Interleaving the maneuver data and the route calculation data would to some extent defeat this purpose, since it could slow down access to route calculation data.

B. Redundant Data—Neighboring Parcel Information

Within each parcel is stored information about certain other parcels of interest, either those that geographically neighbor the parcel (parcels of the same type and at the same layer), or those that overlap the same geographic area (parcels of different types or at different layers). Within a particular type of parcel, some but not all parcels of other types are of interest. For example, within a route calculation parcel, overlapping maneuver parcels are referenced, but overlapping points-of-interest parcels are not. All parcels of interest are stored together in a single kd-tree structure. This structure contains implicit bounding rectangle information for each parcel-implicit because the parcelization scheme above creates parcel boundaries that can be encoded with a few bits (5 bits per division). Each entry (that is, each internal node or leaf node in the kd-tree) also contains the parcel identifiers of any parcels that correspond to the sub-rectangle defined by the division line at the entry.

Figure 5A:
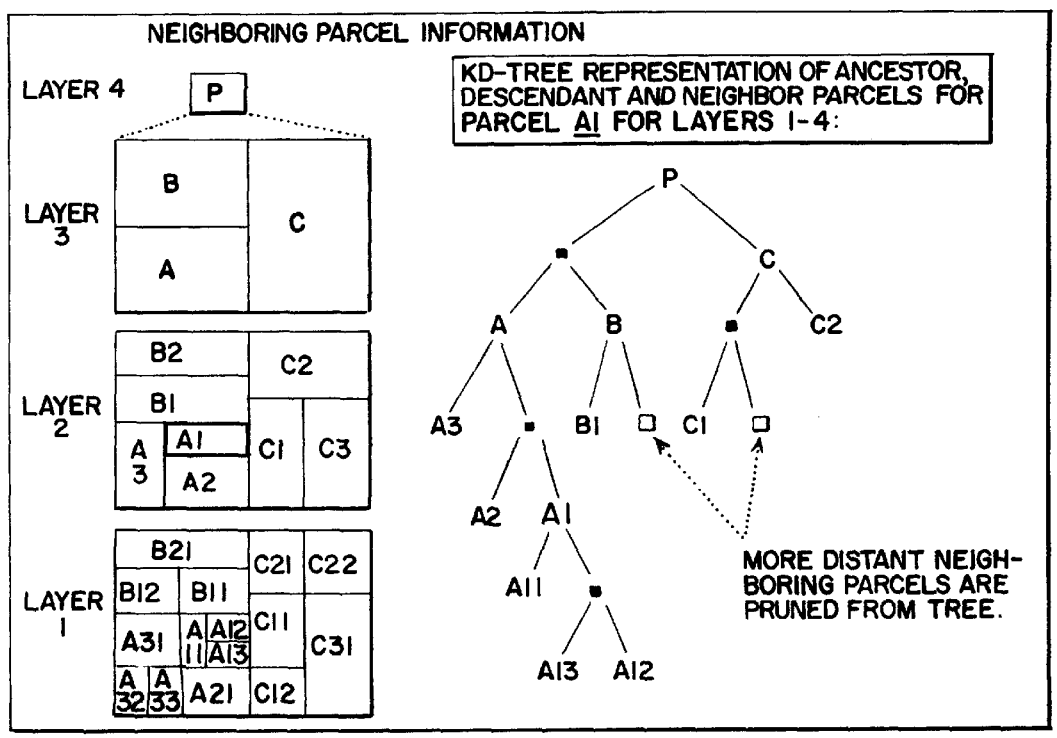
FIGS. 5A–5E are illustrations depicting the process for including references to related data in parcels that comprise some of the navigation data on the storage device of FIG. 1.

The example shown in FIG. 5A includes just one type of parcel (route calculation parcels, for example), and just four layers, so that the drawing can be simplified. The example of FIG. 5A shows the parent, neighbor, and child parcel information for parcel A1.

Figure 5B:
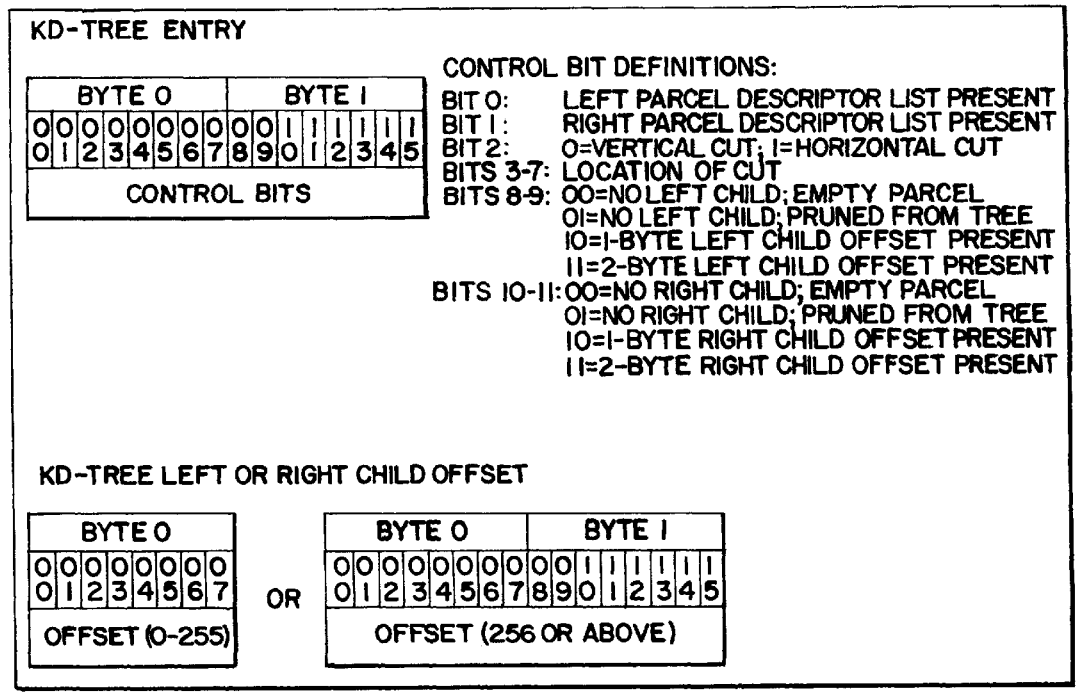
Figure 5C:
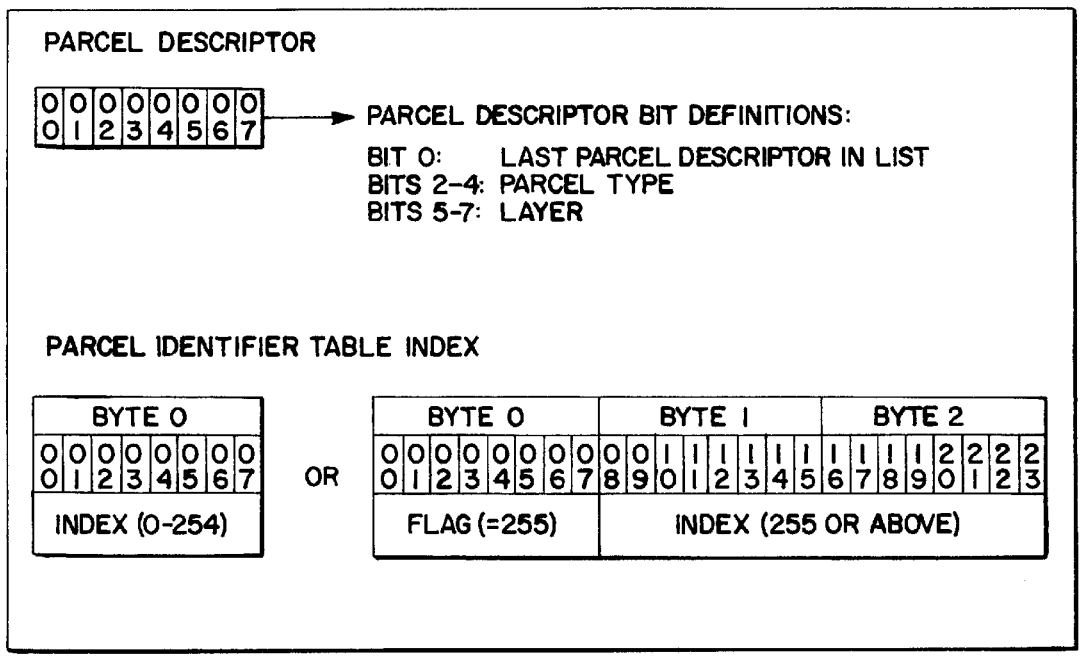

FIGS. 5B and 5C show the structure of an entry in the kd-tree describing the geographical area surrounding a parcel. In general, each division in a rectangle is described with a kd-tree entry of two or more bytes: two bytes of control information, and 0–4 bytes to represent offsets to the left and right children (8 or 16 bits per offset). The cut can be at any 1/32 division of a rectangle's minimum enclosing tile, and therefore 5 bits of the control information is dedicated to the location of the line that cuts the parent rectangle into left and right subrectangles. Whenever a kd-tree (internal or leaf) node corresponds to a parcel, a parcel descriptor (one byte) is present in the kd-tree, containing the parcel's type and layer, and other information. A parcel descriptor is followed by either a one-byte or three-byte index into the parcel identifier table; it is expected that in most cases one byte is sufficient, but when there are more than 254 parcel ID's in the table, the index is expanded. The parcel identifier table contains four-byte entries; the one byte region specifier is not included. When the region specifier is different from that of the parcel containing the parcel identifier table, then the most significant bit of the four-byte parcel identifier in the table is set to 1 to indicate that the full parcel identifier is to be looked up in a separate table of external parcel identifiers.

EXAMPLE

Figure 5D:
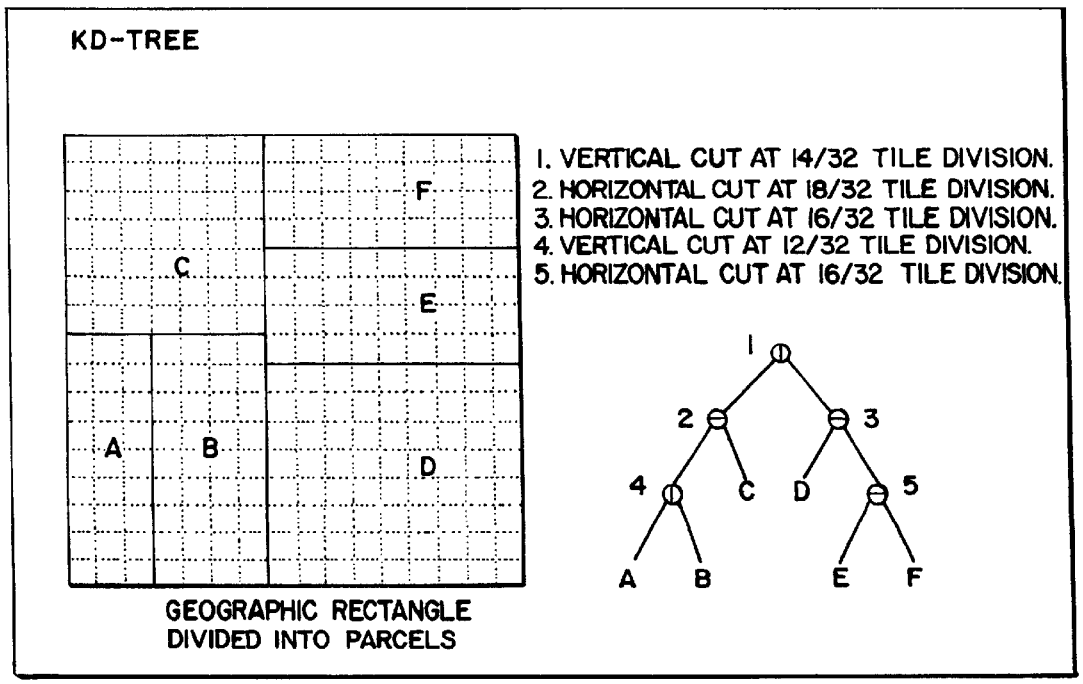
Figure 5E:
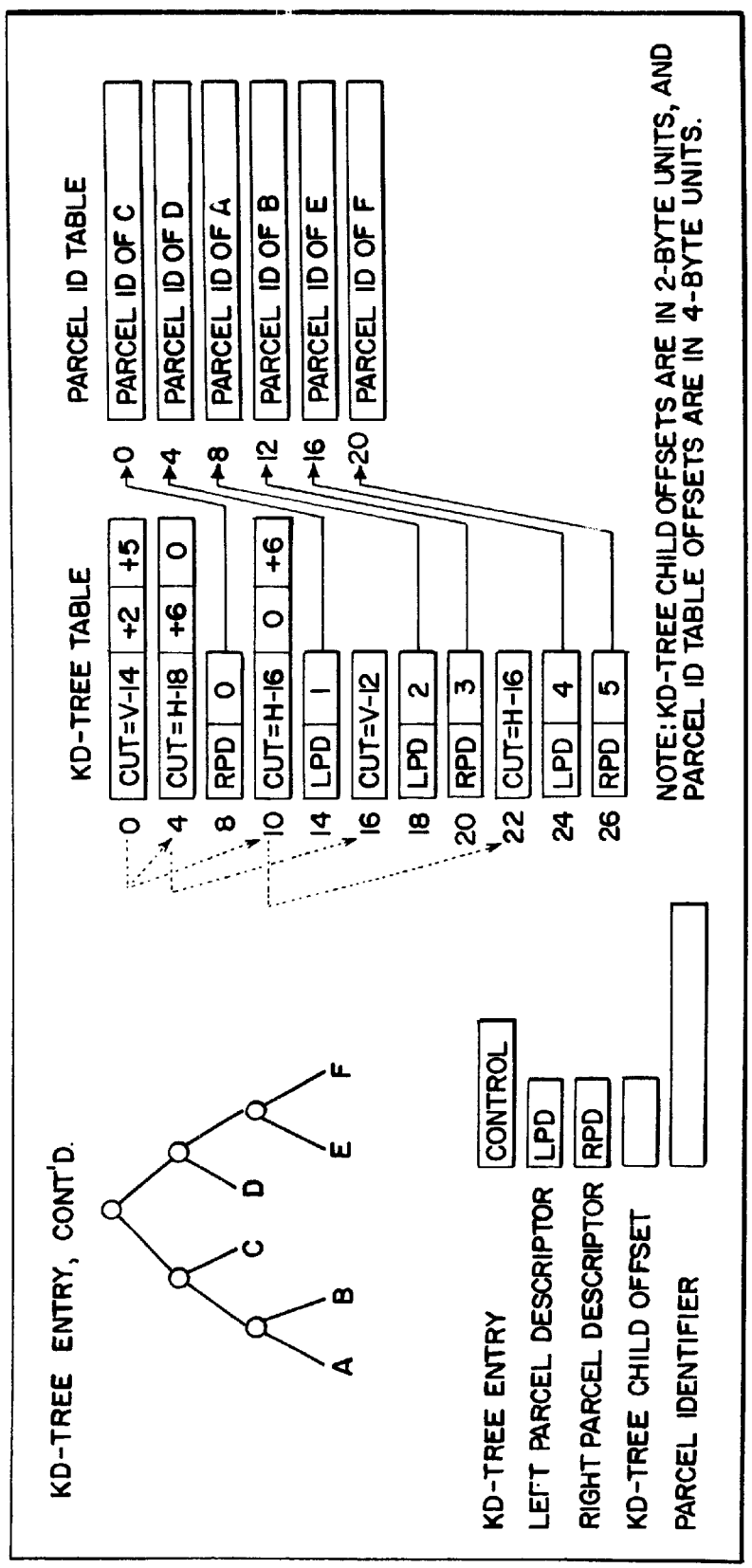

Referring to FIGS. 5D and 5E, there is illustrated an example of the structure of a kd-tree table and parcel identifier table. For simplicity, this example includes only a single parcel type and single layer. If multiple parcel types and layers were included in this kd-tree, then any (internal or leaf) node in the kd-tree could correspond to multiple parcel identifiers. This would mean that a given kd-tree entry could be followed by more than a single left parcel descriptor and right parcel descriptor. In this example, both the kd-tree and the parcel ID table are small enough so that all offsets and indices can be contained in one byte.

C. Compression

Referring again to FIGS. 1 and 2, in a present embodiment, parcels are maintained in their compressed form in memory 20 after they are read from disk 22, and entities within a parcel are decompressed as they are requested by the navigation application functions 28, 30, 32, and 34. In a present embodiment, the parcels are maintained in their compressed form in the interface layer 41 mentioned in connection with FIG. 2. This provides for reduced memory usage. If fully decompressed parcels were kept in a memory cache, then more cache memory would be required, especially since decompressed parcel records vary in length. For example the route calculation function 28 often accesses only a small fraction of records within a parcel each time the parcel is read from disk. Using this approach therefore reduces processing time for decompression. Since compressed records normally are variable in length, even when the decompressed records are of fixed length, the following approach can be used to locate a given record within the compressed data.

Alignment Considerations

Compressed data records, as well as the intermediate (packed) form in which data records exist immediately after decompression, are in the form of character arrays (that is, binary byte arrays, not ASCII character arrays). Therefore, no alignment considerations apply. Data in the header portion of each parcel, used to describe the parcel and navigate within it, contains data that is often most conveniently stored in the form of C-language long integers, short integers, structures or unions. Length and alignment for these data types can vary on different platforms. Since the geographic data 40 is designed to be used on a variety of platforms, it is appropriate to define conventions for alignment and length. These convention s apply to data on the medium containing the map data (e.g. the CD-ROM disc); logical record formats default to alignment and length rules for the hardware platform on which the interface layer software 41 executes. Note that the intermediate (packed) form referred to above should be the same in all physical storage formats, since it is accessible to generic independent components of navigation applications.

The following conventions are used for data types in the map data parcel headers:

| Data Type | Alignment | Length |
| --- | --- | --- |
| short integer | 2-byte boundary | 2 bytes |
| long integer | 4-byte boundary | 4 bytes |
| structure/union | 4-byte boundary | 4 byte multiple |

Bytes in map data are in Big Endian form (most significant bit first), and both short integers and long integers in map data are in Big Endian form (most significant byte first).

D. Intra-parcel Record Access Via Entity Identifier

Within a parcel, when each record of a particular type has a unique entity identifier, one of the two methods described below of locating such a record can be used. The first method is used to locate records when entity identifiers are assigned to records of a given type consecutively within the parcel. For example,the first record within the parcel has entity identifier 0. the second 1, etc., with no gaps. The second method is used to locate records in which gaps do exist, but in which the records are still stored in order by entity identifier. The second method is used to access segment records and node records in route calculation parcels above the bottom layer, while the first method is used to access most other record types in all parcels.

Method 1

This method of record access may be used to locate records for which entity identifiers are assigned consecutively within the parcel.

(1). The parcel header contains the following information about an entity type within the parcel:

Offset: Offset to the data from the beginning of the parcel

Count: Record count

Numblks: Number of blocks of compressed records.

Blkcnt: Number of compressed records per block (carried in exponent form, where k implies $2^k$ records).

For those entity types whose identifiers are consecutive within the parcel but do not begin at zero, the first entity identifier in the parcel is carried. This applies to bottom layer node and segment records in the route calculation parcels.

(2). Offset points to a table of Numblks+1 table entries (each of 16 bits), where table entry N points to a block of Blkcnt records, the first of which is the record with entity ID equal to (N−1)*Blkcnt.

(3). The first byte of each record block is the beginning of a Type 1 Variable Length Unsigned Value th at is an offset to the first data record within that block. Following this field are $2^k$ more Type 1 Variable Length Unsigned Value fields, each of which is the length of a compressed record in the block. The use of these length fields allows rapid navigation through the records within a block, as in the following example:

Example

Blocks are composed of 32 records each, and the length of each record in the block is small enough to be represented by one byte. Then, the first byte of the block contains a one byte field that contains the value 33, which is the offset from the beginning of the block to the beginning of the first compressed data record in the block. The second byte in the block contains the length of the first compressed record in the block. The third byte contains the length of the second compressed record in the block, etc. The thirty-third byte in the block contains the length of the thirty-second compressed record in the block. To find the beginning of the seventh record in the block, the following are added together: the address of the beginning of the block, the offset from the beginning of the block to the first compressed record in the block, and the lengths of the first six records. In this example, the first seven bytes of the block are added to the address of the block.

For example, if there are 1500 records of a given entity type in a parcel, and Blkcnt is 32, then a table of 47 16-bit offsets is generated (i.e. Numblks=46), the first of which points to a block of compressed records with ID's 0–31, the second of which points to a block containing records with ID's 32–63, etc. Then, to find the record with ID 100, 100 is divided by 32 (or right-shift 100 by 5). This results in 3, which is the (0-based) index of the block containing record 100. For different entity types, the best value of Numblks might be influenced by record size, record count, percent of space saved by compression, or other factors, and does not need to be the same in every parcel.

Method 2

This method of record access is used to locate records that are stored in order by their unique entity identifiers, but for which entity identifiers generally do not start at 0 and are not assigned consecutively (without gaps) within the parcel.

(1). The parcel header contains the following information about an entity type within the parcel:

Offset: Offset to the data from the beginning of the parcel

Count: Record count.

(2). Offset points to a table of Count+1 table entries (each of 16 bits plus 24 bits). Twenty-four bits of each entry is a record's entity identifier, and the remaining 16 bits of the entry is the offset from the beginning of the parcel to the compressed record corresponding to that table entry's entity identifier. The last table entry does not point to a record; it points to the first byte following the last record.

(3). The length of a compressed record is equal to the difference between the offset in its table entry and the offset in the next consecutive table entry whose offset's high order bit is not equal to 1. A table entry with an offset whose high order bit is equal to 1 is a special entry that does not point to a record.

The decompressed records are variable-length and in packed form. The size of this packed record can be minimized as follows: (1) there can be no padding bytes in this format, since it will be in the form of a byte array rather than a C structure; (2) some fields that take up a limited number of bits can be combined together into one byte; (3) finally, character string data such as street names can be compressed at the data field level using a conventional text-oriented compression method.

The logical format of a record (the format returned to application software programs 28, 30, 32, and 34 from the interface layer 41) is constructed from the above decompressed, packed record.

E. Supernodes

In a present embodiment, the following procedure is used with the route calculation subset 48 (of FIG. 3) of the geographic data.

The route calculation subset of geographic data includes feature entities for nodes, conditions and segments. The node features are in the form of node entities. Some node entities are used to store positional information (i.e., latitude and longitude) about the end points of a segment. (There may also be node entities that relate to positional information other than the end points of segments.) The positional information related to each node is stored in terms of a longitude, latitude, and a relative elevation. This node entity may also contain attributes which provide additional information about the node.

As mentioned above, the parcelization method used for the route calculation subset of the data provides for maximizing the amount of relevant route calculation information that can be kept in memory at once thereby minimizing time-consuming memory operations during route calculations. According to this aspect of the present embodiment, the route calculation function 28 (in FIG. 2) may be sped up by including single collapsed nodes (referred to as "supernodes") in the route calculation data set. Each of these collapsed nodes or supernodes represents a plurality of closely-spaced or related regular nodes and segments. Wherever a supernode is used to represent a plurality of regular nodes, the segments associated with any of the plurality of regular nodes represented by the supernode are associated with the supernode instead of with the regular nodes. Then, when the route calculation application program accesses any of the segments to calculate a route, the supernode is used instead of the plurality of regular nodes. Including the supernodes has the effect of replacing certain complex intersections in the route calculation subset of the geographic data set with simplified intersections. Replacing certain complex intersections with simplified intersections reduces the time and data required for a route calculation application program to navigate through these intersections.

Figure 6A:
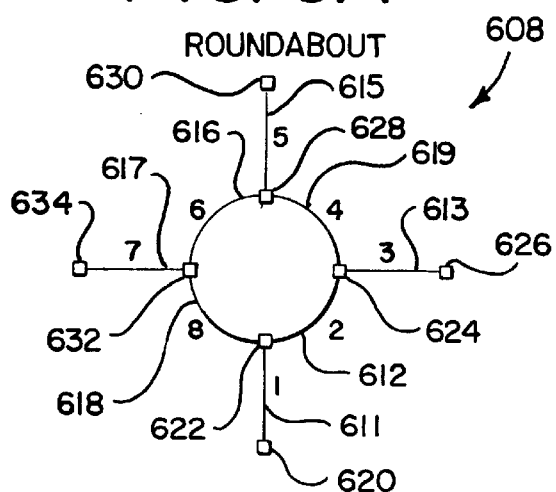
FIGS. 6A–6F are illustrations depicting the process for substituting references to supernodes in place of pluralities of regular nodes in a route calculation geographic data set as shown in FIG. 3.

For example, referring to FIG. 6A, there is a map illustrating a roundabout 608. In the route calculation dataset, the roundabout 608 is formed of segments 612, 614, 616, and 618, and nodes 622, 624, 628, and 632. According to the present embodiment, the nodes and segments forming the roundabout 608 are collapsed into a single supernode entity represented by supernode 640 in FIG. 6B. The supernode data entity 640 is generated automatically during compiling of the route calculation data set. The segment records for the segments 611, 613, 615, and 617 indicate that they connect to the supernode 640 instead of to the actual nodes 622, 624,

628, and 632, respectively. Although the geometry of the segments 611, 613, 615, and 617 appears different in the supernode representation of FIG. 6B, all the segments' attributes, including the segment length, remain the same as they would for the full representation of the intersection.

The purpose of the supernode is to provide a simplified representation of the road network which can help to speed up route calculation. For example, without the supernode representation, if the route calculation program 28 is attempting to calculate a route through the roundabout 608 from node 626 to 630, it would have to process traveling from node 626 to node 624, node 624 to node 628, and node 628 to node 630. With the supernode representation, the route calculation program only has to process traversal from node 626 to node 640 and node 640 to node 630.

In a preferred embodiment, even if supernodes are used in a given level of the route calculation data set, the data set at that level also includes the plurality of regular nodes that are represented by a supernode. This allows any information associated with the regular nodes to still be accessible to the navigation application program, if needed. For example, in order to display a map of a calculated route, it would be necessary to obtain the regular nodes represented by the supernode so that all the road segments can be shown. This can be determined because each of the supernodes provides a reference back to its constituent nodes.

For simple intersections of two or few segments or dead ends, supernodes would not be used and instead, the route calculation data set includes regular nodes since there would be little advantage to using supernodes to represent these relatively simple types of nodes.

Because an exact location is unnecessary, a supernode is given a geographic location approximately at the center of the group of nodes it represents. A supernode and the nodes it represents are treated as a unit when parcelizing, so that regular nodes represented by a supernode are placed together in the same parcel.

Note also that when the data are organized in layers as in the route calculation subset of data or the cartographic subset of data, any bottom layer regular nodes that make up a supernode are omitted in layers above the bottom layer (i.e. supernodes are included at least in the layer immediately above the bottom layer, but not the regular nodes subordinate to them). Also, supernodes can be defined in any layer.

A function call in the route calculation program of the navigation application can be used to translate a supernode back into the regular nodes and segments that it represents. Another function call can be used to retrieve an ordered list of the segments inside the supernode to be traversed in order to get from one segment connected to the supernode to another. In a present embodiment, the above function calls may be included in the interface layer 41 of FIG. 2 instead of in the route calculation function 28 of the navigation application.

Figure 6B:
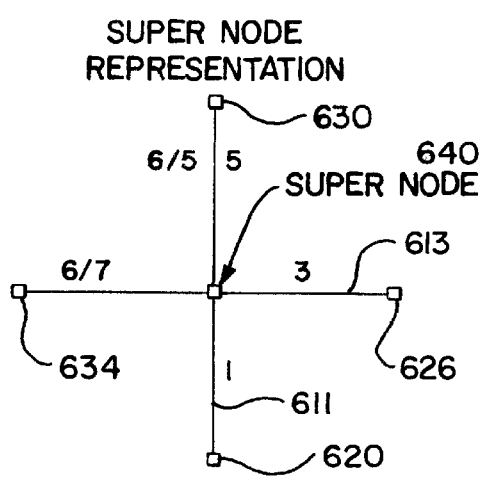

A function call can be used to obtain the relative travel cost (or "impedance") of the supernode. The relative cost of a supernode (or of a regular node) is an indication of how much time is required to travel across the node. The relative travel cost of a supernode may be included as an attribute of the supernode entity, or preferably the travel cost of a supernode may be based on the length and/or speed of travel of the segments inside the supernode to be traversed to get from one segment connected to the supernode to another of the segments. In the example of FIGS. 6A and 6B, the relative travel cost to get from the segment 611 to the segment 615 is based on the lengths of the segments 612 and 614 as well as the two right turns required to travel from segment 611 to segment 615. In a present embodiment, the above function call may be included in the interface layer 41 of FIG. 2 or in the route calculation function 28 of the navigation application.

Figure 6C:
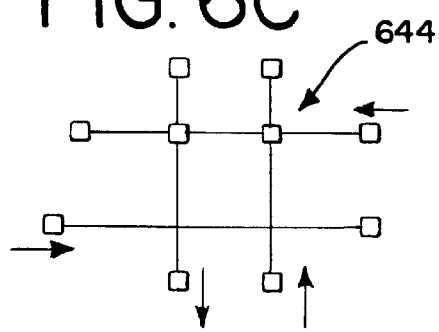
Figure 6D:
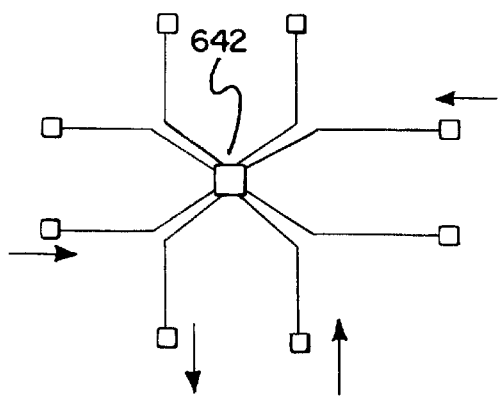
Figure 6E:
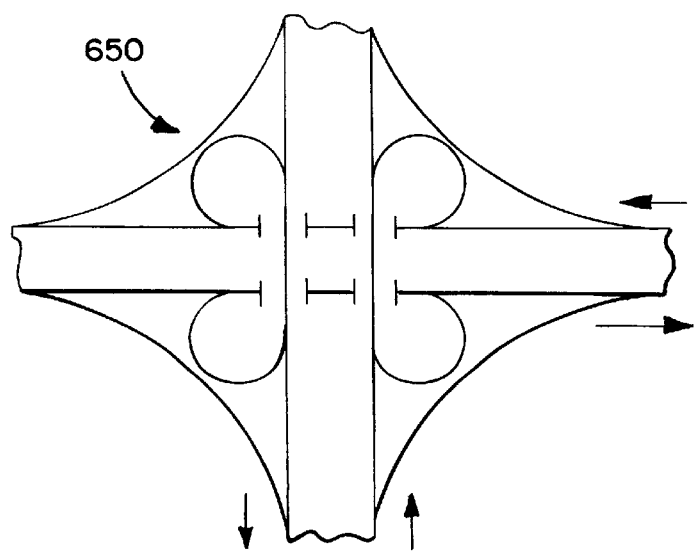
Figure 6F:
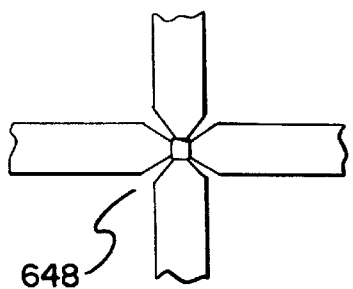

Supernodes may be used to represent any intersection and are particularly useful when representing complex intersections that include more than two roads. For example, a supernode representation 642 may be used for divided highways, 644 (as shown in FIGS. 6C and 6D) and a supernode representation 648 may be used for cloverleaves 650 (as shown in FIGS. 6E and 6F).

In a present embodiment, the determination of when to include a supernode as a representation of several regular nodes is done at compile time, as discussed below. In one embodiment, supernodes are automatically generated in the compiler based upon a predetermined set of rules. For example, a candidate supernode is established and examined to determine whether it meets the predetermined set of conditions. For example, for forming supernodes for divided highways, the routing data are examined to find all occurrences wherein two multiply-digitized roads intersect. (Multiply-digitized roads are roads in which separate segments are used to represent traffic in each direction.) The intersections of these multiply-digitized roads are examined to determine whether there are exactly four internal nodes at the intersection, whether there are exactly four segments internal of the intersection, and whether each of the internal segments connects to two, and only two, other internal segments by means of internal nodes. If all these conditions are met, a supernode entity is formed and stored in the layer of routing data.

Similarly, supernodes may be automatically generated for roundabouts. The rules for forming a roundabout include no limitation on how many internal nodes and segments are included within the roundabout. As with the multiply-digitized roads, a candidate supernode is formed of a grouping of nodes and segments. The nodes and segments used to form the candidate supernode include those having display characteristic indicating that they are part of a roundabout. (The GDF data may include this type of information with segments and nodes.) Once the candidate supernode is formed, the supernode is generated using the segments and nodes identified as being associated with a roundabout.

F. Normalized Attributes

One way to speed up operation of some of the navigation applications that use the geographic data stored on the storage medium is to reduce the amount of data stored on the storage medium thereby enabling the information to be accessed faster. Another way to speed up operation of some of the navigation applications is to store frequently used data in memory. Both these ways of speeding up applications can be employed by storing certain of the geographic data on the storage medium with normalized attribute arrays (explained below) and by reading some or all of the normalized attribute arrays into memory.

For example, the segment data entities in the geographic data set include information that identifies each segment of all roads in a geographical region. Each of these segment data entities includes attribute information about the characteristics of the segment. For example, in the geographic data set, each segment entity has a segment ID field, and attributes identifying the location of the segment, rank of the segment, route type, lane category (i.e. number of lanes), speed category, speed limit, access characteristics, and so on.

In the present embodiment, instead of including separate entries for each of these attribute fields in the data record for each segment, for certain of the attributes, the segment record includes a single index reference to a table of records. This table of records is referred to as a global normalized attribute array. This allows a single index to be carried in the segment record, instead of all the associated attribute values. The use of this normalized attribute array is based on the recognition that attribute values for a specific group of attributes are not completely independent of each other. For example, if the route type attribute of a segment indicated that the segment were an inter-metropolitan highway, then the speed category attribute for the segment would normally indicate the segment to be a high speed category. It has been determined that the number of actual different combinations of certain groups of these attributes found in the geographic data set is small enough that disk storage space is saved by storing these combinations in one table (referred to as a "normalized attribute array") and storing an index into that table in the segment entity record instead of the actual separate individual attribute entries.

In a preferred embodiment, the normalized attribute array includes the most common combinations of attributes for a particular entity in a particular set of data. In a present embodiment, the global normalized array includes the 256 most common attribute combinations. These combinations of attributes may be different in different geographic regions.

Figure 7A:
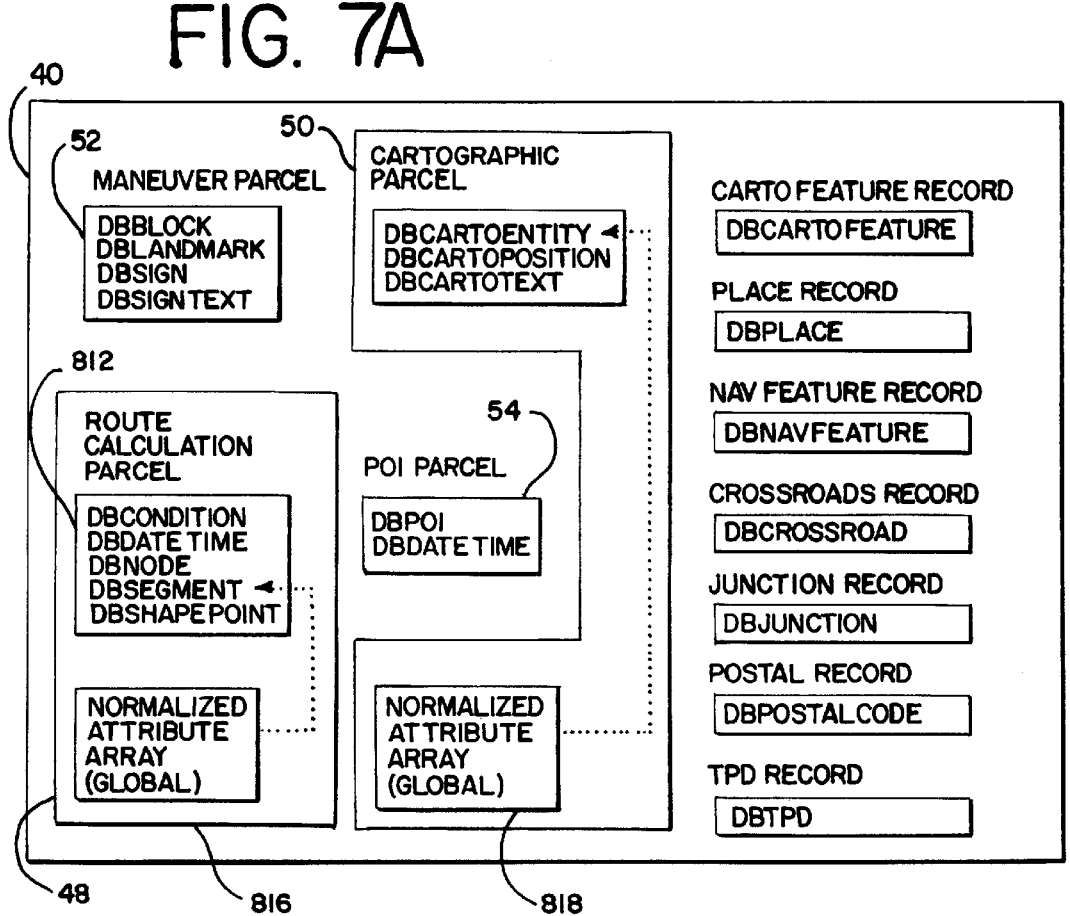
FIGS. 7A and 7B are diagrams illustrating the use of normalized attribute arrays to represent certain data attributes in certain data entries in the geographic data set shown in FIG. 3.

Referring to FIG. 7A, there is a representation of the geographic data 40 stored on the storage medium, including the different types or subsets of data represented in FIG. 3. These types or subsets of data include the route calculation data 48, the cartographic data 50, the maneuver data 52, and the points-of-interest data 54. Each of these different subsets of the geographic data 40 is organized into parcels, and each of these subsets includes records having predefined structures.

In the embodiment shown, the route calculation data 48 includes a segment structure 812 and the cartographic data 806 includes a polyline structure 814. These data structures are partially derived from normalized arrays of attributes. Specifically, the routing data segment structure 812 is partially derived from the route calculation normalized attribute array 816. Similarly, the cartographic data polyline structure 814 is partially derived from the cartographic normalized attribute array 818. The segment structure 812 includes data attribute fields for the following types of data: speed category, lane category, rank, among others. These data are related. Roads with more lanes tend to have higher speed limits, and so on. Accordingly, it is possible to remove these separate data fields—and the data included in them—from each of the routing data segment records and place them in the normalized array 816. A similar relationship is found in the cartographic data polyline structure. In each structure, an index replaces the combination of attributes that are removed. The index points to an entry in the normalized attribute array that includes the particular combination of attributes that had been replaced.

In a geographic data set in which certain of the attributes are replaced by indexes to a global normalized attribute array, it is possible that some of the records cannot be indexed to the array. These records would include those in which the combination of attributes is uncommon, and therefore would not be represented by the most common (e.g. the 256 most common) occurrences of the particular combinations of attributes included in the global normalized attribute array. Since the attributes for these records are not included in the global normalized array, these records would not include an index to the global normalized attribute array. For records having less common attribute combinations, a separate array is included. This separate array is included as a local normalized attribute array. The local normalized attribute array is included within the parcel in which the unusual record is located. The local array may be organized like the global array. If multiple records in the parcel have the same unusual combination of attributes not found in the global normalized attribute array, the index in each of the records that has this particular unusual combination of attributes refers to the same combination of attributes in the local array. In a present embodiment, all the records in the parcel include an index to either the global normalized attribute array or to the local normalized attribute array. This feature recognizes that some unusual combinations of attributes are very localized and therefore it is not efficient to load such unusual combinations into memory unless needed by the navigation application when using the particular parcel that includes them.

Figure 7B:
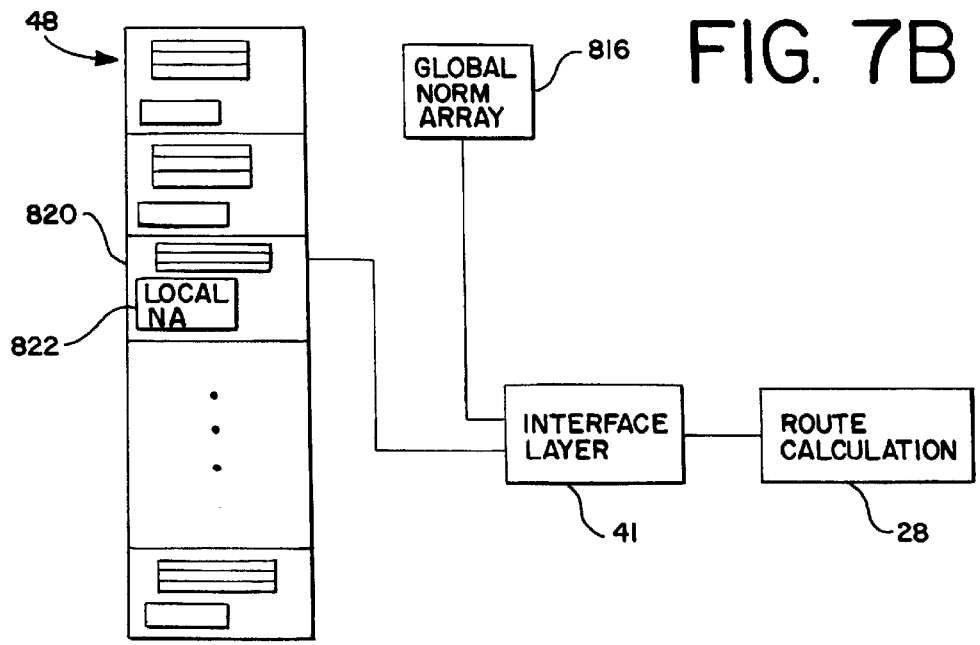

For example, referring to FIG. 7B, the route calculation function 28 is shown to have accessed one of the parcels 820 of route calculation data 48. The segment entities are built up from the segment record data in the route calculation data stored in the parcel 820 using an index in each of the segment entries to either an entry in the global normalized attribute array 816 or a local normalized attribute array 822. In a preferred embodiment, the substitution of the normalized attribute array data from either the global array 816 or the local array 822 into the appropriate data fields of the appropriate data records is performed by the interface layer 41, mentioned above. In order to speed up processing, the global normalized attribute array 816 may be kept in memory. This global normalized attribute array may be (fully or partially) read into memory from the storage medium and kept in memory during operation of the navigation application.

G. Segment Aggregation

1. Overview

As mentioned above, a navigable segment include a rank attribute that specifies the highest routing data layer in which the segment appears. The lowest layer of route calculation data 48 includes all navigable segments (i.e. segments of all ranks). In each succeeding higher layer, the segments of the lowest-ranked remaining class of segments are dropped. This generally results in the creation of a number of bivalent nodes, i.e. intersection nodes between exactly two segments. If all attributes for these two segments that are relevant to navigation are equal, it is possible, as well as beneficial, to drop the bivalent node. This reduces the size of the data, reduces the number of segments that need to be explored during route calculation, and reduces the number of segments making up the final calculated route. Segments formed in this way are called aggregated segments. In a preferred embodiment, aggregated segments are included in layers above the lowest layer.

The following describes aggregation of segments at higher layers. First, the physical representation of the aggregated segment is described. Second, the criteria for aggregating segments are given. Third, the process for forming aggregated segments is described.

2. Physical Storage of Aggregated Segments

When aggregation occurs, segment records and node records internal to the aggregated segment are maintained in the given layer in an abbreviated form. Each abbreviated segment contains the segment identifier, length, transit time and bearing. Each abbreviated node contains the node identifier and position. These abbreviated records are accessible through the aggregated segment record, which contains the attributes common to the abbreviated segments. The aggregated segment record contains both a left segment identifier and a right segment identifier, since this segment could be entered from either end during route calculation processing.

Figure 8A:
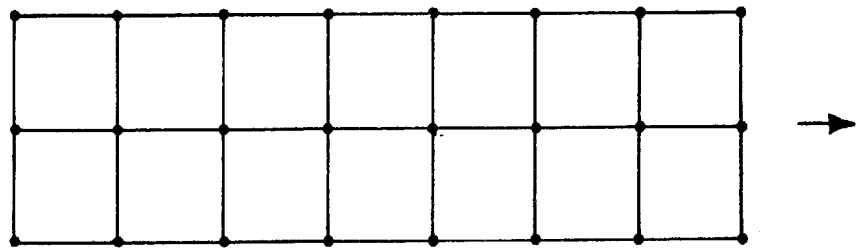
FIGS. 8A–8D are diagrams illustrating a segment aggregation procedure for use in a route calculation geographic data set as shown in FIG. 3.
Figure 8B:
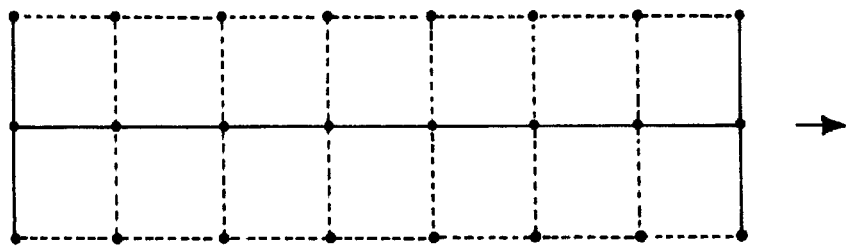
Figure 8C:
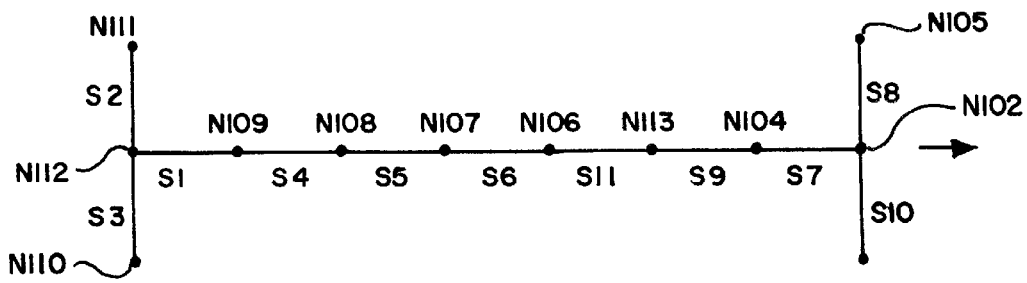
Figure 8D:
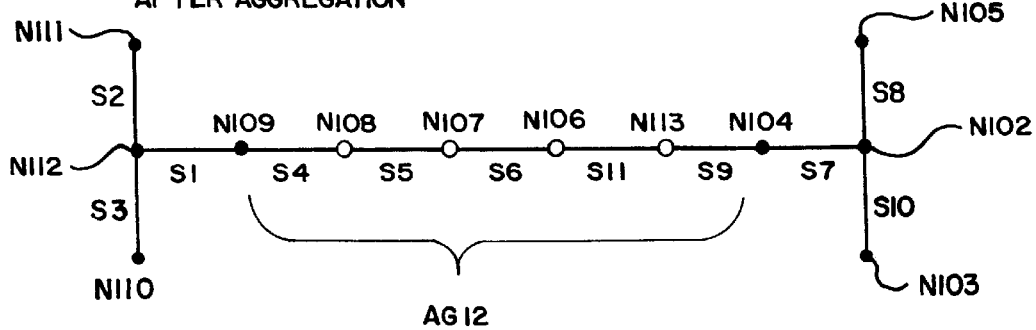

FIG. 8A is an illustration of a plurality of segments in layer 0. A node is associated with the two end points of each of the segments. In layer 0 all the segments of all the ranks are represented. FIG. 8B shows the same plurality of segments and nodes shown in FIG. 8B, except that the segments having the lowest rank in the layer are illustrated in dashed lines. FIG. 8C shows the lowest ranked segments removed. (FIGS. 8B and 8C illustrate intermediate stages and are not representative of a layer). FIG. 8D illustrates the segments and nodes in layer 1. In FIG. 8D, the segments S4, S5, S6, S9, and S11 have been aggregated into an aggregated segment AG12. It is noted that the aggregated segment AG12 includes nodes N109 and N104 that correspond to the end points of the aggregated segment. In addition, the aggregated segment also includes the nodes N106, N107, N108, and N113 that are internal of the aggregated segment AG12. These internal nodes provide an advantage in route searching by allowing a route calculation program to move from one layer to another layer at any node, even if those nodes are internal of the end points of an aggregated segment. This means that the route calculation program can access higher layers more quickly thereby potentially providing for faster route calculations.

FIG. 8E is a representation showing the relationship between the aggregated segment record of FIG. 8D and the other data entities in layer 1.

3. Aggregation Criteria

In a present embodiment, aggregation of any number of consecutive segments is permitted where each consecutive pair of adjoining segments meet the following criteria:

1. Within the layer under consideration, exactly two segments meet at the point (node) of intersection.

2. The two segments are not part of any of the following conditions:
   (i) A restricted driving maneuver that extends across the intersecting node;
   (ii) a vehicle restriction;
   (iii) a direction of travel restriction;
   (iv) a gate;
   (v) a high-occupancy-vehicle restriction;
   (vi) a bifurcated roadway;
   (vii) a toll booth; or
   (viii) signage.

3. The two segments share exactly the same set of navigable feature names (excluding cartographic feature names).

4. The following attributes are the same for the two segments:
   (i) rank,
   (ii) speed category,
   (iii) lane category,
   (iv) access characteristics, and
   (v) the following segment attributes:
      (a) segment divided,
      (b) direction of travel—left,
      (c) direction of travel—right, private,
         ramp,
         controlled access,
         rail ferry,
         boat ferry.

Note that the remainder of the attributes are allowed to differ between two adjoining segments that are aggregated. Generally speaking, these attributes are either combined or dropped in the process of generating a single set of aggregated attributes for the aggregated segment. The criteria set forth above are exemplary only. While they are presently preferred, other criteria or subsets of the above criteria may be used.

4. Process for Forming Aggregated Segments

The first step in forming aggregated segments is to identify possible end nodes for aggregated segments. The segments known as "aggregated-segment-significant" nodes. Every node in th e geographic database at each of the layers is evaluated to determine whether it is "aggregated-segment-significant." The nodes are evaluated one at a time, starting at the highest layer and working down. A node is "aggregated-segment-significant" at a given layer when only one segment, or more than two segments, are connected to it. However, if exactly two segments are connected to a node, the node is not aggregated-segment-significant. If a node is determined to be aggregated-segment-significant at a given layer, it will be aggregated-segment-significant at all lower layers. Each segment in a layer that ha s an aggregated-segment-significant node on one end and a non-significant node on the other end is a potential starting end for an aggregated segment.

In FIG. 8C, Nodes N102 and N112 are aggregated-segment-significant since they connect to more than two segments. Nodes N106, N107, N108, N109, and N113 are non-significant since they connect to two and only two segments. Segment S1 is identified as a potential starting point for an aggregated segment since it has one node, N112, that is aggregated-segment-significant, and the other node, N109 that is non-significant. The non-significant node N109 is chosen as a potential starting point for forming an aggregated segment. The other segment connected to node N109, S4 in FIG. 8C, is evaluated by (1) determining whether its other node, N108, is aggregated-segment-significant, and (2) checking whether the other aggregation criteria (described above) are met. If it is non-significant, the other segment connected to N108 (i.e., S5) is evaluated in the same manner, and so on. This process continues until an aggregated-segment-significant node is reached or until a non-significant node is reached that connects two segments that have differing conditions that disqualify them from being aggregated. These conditions are described above. If a non-significant node connects two segments having differing conditions that disqualify them from being aggregated, the node is denominated as an aggregated-segment-significant node for that rank and lower.

Once a string of segments (between two aggregated-segment-significant nodes) are identified that connect to each other by non-significant nodes, an aggregated segment record is created to represent these segments. The aggregated segment record is provided with a segment ID that identifies it as an aggregated segment. The end nodes of the aggregated segment are the aggregated-segment-significant nodes. The aggregated segment record includes pointers to the abbreviated node and segment records for the node(s) and segments that are represented by the aggregated segment. These abbreviated records are maintained at each layer of the aggregated segment.

The aggregated segment record also stores additional information about the aggregated segment including the length, average speed, and transit time in the "legal direction" of the aggregated segment (which accounts for all travel costs or impedance to travel the aggregated segment, including node costs). By "legal direction" it is meant that for any given aggregated segment, travel may be legal in only one direction. The legal direction of travel is evaluated in one direction first, for example, left-to-right. If acceptable, the transit time is calculated and assumed to be the same for the opposite direction if travel in that direction is also legal. This would not necessarily be true if conditions were not imposed for aggregation. If left-to-right is an unacceptable travel direction, then the transit time is determined from right-to-left.

It is noted that the above method produces an aggregated segment that has aggregated-segment-significant nodes at its ends and at least one non-significant node between the ends. However, not all aggregated-segment-significant nodes within a layer are necessarily located at end points of an aggregated segment.

The above approach can be used to aggregate segments extending between aggregated-segment-significant nodes or, alternatively, extending only between the non-significant nodes of the left-most and right-most segments between the aggregated-segment-significant nodes (as illustrated in FIG. 8C). The advantage in the former case is that a route searching program may undertake fewer steps to determine a route (one step instead of three steps to traverse segments between aggregated-segment-significant nodes). The advantage in the latter case is that, assuming the conditions for qualifying segments for aggregation do not otherwise disqualify segments having certain restrictions (such as no left turn), the route searching program can more quickly determine (i.e., take fewer steps) whether the aggregated segment can form part of the calculated route. In either case, the use of aggregated segments as described herein provides the significant advantage that a route searching program can jump layers at any node, even one that forms part of an aggregated segment.

Another significant advantage provided by the aggregated segments is that the use of conditions to determine whether segments should be aggregated reduces the possibility of creating aggregated segments that cannot legally be traversed.

V. Compiling Process for Forming Physical Storage Format File

A Compiler—Overview

Described above are various aspects of providing a geographic database on a physical medium to facilitate use and access of the geographic database by a navigation application program in a navigation system. As mentioned above, prior to being organized in a format suitable for storage on the storage medium that is used and accessed in an end user's navigation system, the geographic data likely is provided and organized in another, different format. For example, the geographic data may be initially organized in an interchange format, such as the GDF format or another format. An interchange format may facilitate the exchange of the data or may provide for acquisition and updating of the data. In order to store the geographic data on a storage medium in a manner that facilitates use of the data, the data are converted from this original or interchange format. This conversion process may be accomplished by a geographic dataset compiler, as described herein. Source code for the compiler is included in the microfiche appendix included as part of this specification. Additional source code representing alternative preferred embodiments of some of these files of source code are included in Appendix B that is a part of the disclosure of this specification. In a present embodiment, the compiler is written in the C programming language, although in alternative embodiments any suitable programming language may be used.

FIG. 9A shows a flow diagram of a geographic dataset compiler 900. The compiler 900 accepts several different kinds of data 901. For example, the data 901 may include the map coverage data 902, common auxiliary data 903, and associated third-party data (TPD) 904. The map coverage data 902 may be provided in the GDF interchange format, mentioned above, and the other kinds of data may be provided in any suitable format. Third party data may also be provided in the GDF format. Auxiliary data may include explication, voice, or icon types of data. In a present embodiment, the compiler 900 accepts the map coverage data 902 in the specification for GDF 3.0, but in alternative embodiments may accept other database formats as well.

The geographic dataset compiler 900 generates an output 905, including a geographic dataset, which is in a compressed, optimized format suitable for storage on storage media, such as the storage medium 22 in FIG. 1, for use in navigation systems. When the output 905 is stored on the storage medium 22, it includes the database 40 of FIG. 2. In preparing the organized output 905, the geographic dataset compiler 900 takes into account the layout of the database 40 as it is used in the end-user's system, such as an in-vehicle system, including the characteristics of the specific on-board storage medium in the vehicle. The variations in medium characteristics may require correspondingly different layout structures or formats. The output 905, including the database, created by the geographic dataset compiler 900 conforms to the appropriate physical storage format for a given storage medium. This is achieved by isolating media-dependent aspects from the core functionality of the geographic dataset compiler 900.

In a present embodiment, the geographic dataset compiler 900 runs on an IBM Model RS6000 computer with 128 MB of RAM and 1 GB of paging space. The RS6000 runs the AIX 4.1 OS and the development environment is IBM's C Set++ Version 3.1. ANSI C and C++ compilers include xlc and xlC respectively and the debugger is xldb. Other computers, operating systems, and development tools would be suitable.

The geographic dataset compiler 900 includes a sequence of processes that progressively transforms the data 901 from the GDF format (which is primarily an ASCII interchange format) to an optimized and compressed binary format in the database 905. In order to accomplish this transformation, the geographic dataset compiler 900 provides a framework of routines for this process.

The geographic dataset compiler 900 generally includes three layers: a data transformation layer 910, a service layer 912, and a physical format isolation layer 914. These layers collectively provide for compiling the input data 901 into the output 905 in the media-specific format suitable for writing onto the desired physical medium.

B. Compiler Service Layer

The compiler service layer 912 includes a library of routines that are available and used for processes within the geographic dataset compiler 900. The library of routines contains sets of primitives for commonly used functions within the dataset compiler including specialized functions specially developed for handling of the geographical data. For example, the service layer includes functions for handling of I/O, file and table management, error handling, memory management and buffering, debugging, and data manipulation. The service layer 912 may include routines for other functions as well.

In a preferred embodiment, the service layer 912 implements a shared 5 memory model to enhance processing and transformation of the data. Conventional shared memory techniques provide for the sharing of memory between concurrent processes. The service layer 912 implements shared memory across non-concurrent processes. This provides advantages in the various data transformation processes, such as the development of the global kd-tree (described above with respect to data parcelization). The process for developing the global kd-tree uses some of the same data used in other transformation processes, but does not necessarily run concurrently with the other processes. By using a non-concurrent shared memory model, the service layer permits sharing of data between the process that provides for the development of the global kd-tree and the other processes.

C. Compiler Data Transformation Layer

1. Overview

Figure 9B:
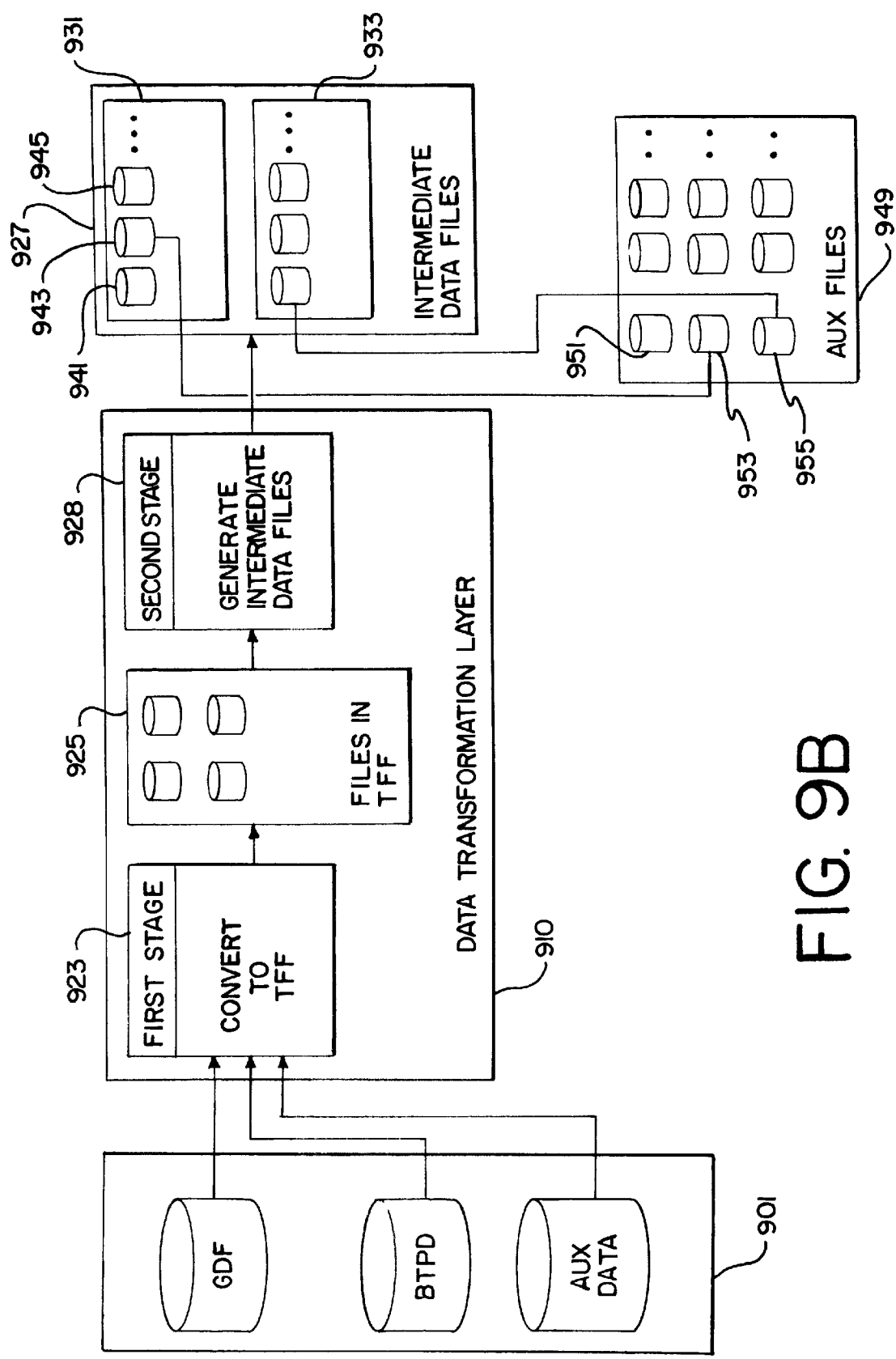

Referring to FIG. 9B, the data transformation layer 910 of the geographic dataset compiler 900 transforms the geographic map coverage data 901 from a generalized interchange format to an intermediate output. The data transformation layer 910 includes two main steps or stages: In a first stage 923, starting with the data in an interchange format, the data transformation layer 910 converts the data 901 into files 925 in a transfer file format. In a usual scenario, the data 901 are provided to the compiler in a generalized interchange format, such as GDF. An interchange format, such as GDF, organizes the data in a manner from which it would be difficult to convert directly into the physical storage format used on the storage medium in a navigation system. For example, one reason that the GDF would be difficult to convert directly into the physical storage format is that it would require a very great amount of memory in the compiler to store the all necessary portions of the GDF file to produce the physical storage format output file. Accordingly, in a preferred embodiment, the geographic data are first converted into the transfer file format, from which further processing of the data is facilitated.

After the data are converted into the transfer file format, a second stage 928 of the data transformation layer 910 process the files 925 in the transfer file format to produce separate intermediate data files 927. In producing these separate intermediate data files 927, this second process 928 generates the separate collections (e.g. sets 931, 933, and so on) of the data that are ultimately used by the various separate navigation application functions. As mentioned above, each navigation application function typically uses only certain portions of the entire geographic database. Accordingly, in order to facilitate operation of each of the navigation application functions, the physical storage format provides each of the navigation functions with its own separate collection of geographic data representing only a subset of the entire geographic database. Each subset preferably excludes the portions of the database that its navigation function does not normally use. At this data transformation stage, the data transformation process creates these separate collections of the geographic data as actual separate files, for example files 941, 943 and 945 (referred to herein as "intermediate data files" or "data file units"). Each of these intermediate data files includes only a portion, or view of the entire database.

As a further aspect of this data transformation layer process, as part of the process for producing these intermediate data files, certain new items of data, such as supernodes, aggregated segments, and generated shape points, are constructed from the data in the transfer file format. Although these new items of data are derived from the data in the transfer file format, they do not have direct counterparts in the GDF input file. Further, as these intermediate data files are produced, the data in each of these intermediate files are grouped into parcels within each intermediate data file. Subsequent to the processes of the data transformation layer, the parcel organization of the data is retained when the separate data files are later recombined into a single larger file in the isolation layer process, described below. If third party data are intended to be included in the physical storage format, they are incorporated into the data transformation process.

The processes in the data transformation layer 910 are described in more detail as follows:

2. Transfer File Format

The compiler 900 may receive the geographic data in numerous different formats. In one present embodiment, the compiler 900 receives the geographic data in an interchange format, specifically, GDF 3.0. As mentioned above, if the data are initially provided in a format such as GDF, it is preferred to first convert the data from the interchange format into a transfer file format prior to further processing of the data. This conversion is performed because the GDF format does not organize the data in a manner that facilitates handling of portions of the data to produce the physical storage format. This conversion process into the transfer file format may be applied to map coverage data, as well as third party data, if any.

Prior to starting the compiler process, a determination is made defining the map coverage area(s) to be represented on the storage medium. The map coverage area to be represented on the storage medium may include a metropolitan area, a state, contiguous states, an entire country, or other regions or combinations of regions. Part of this process may take into account the manner in which the GDF files have been organized. Separate GDF interchange files may exist for different geographical portions of a country. The desired map coverage area to be stored on the storage medium may not necessarily coincide with the boundaries of a single GDF file. Accordingly, the input to the compiler process may include more than one GDF file, i.e. the GDF input may be physically sectioned into multiple files. A GDF file may also be logically sectioned, i.e., different coverage areas may be separately included in a single file. After a selection is made of the map coverage area to be represented on the medium, the one or more GDF files corresponding to the selected map coverage area are used as inputs to the compiler process.

The transfer file generation process provides an output in the form of a collection of several logical transfer files 925. The number and types of particular transfer files may be determined based upon the particular types of information that one desires to include in the physical storage format file. In one embodiment, the following different types of transfer files are created. These transfer files represent different types of geographic entities: Names, Languages, Administrative areas, Postal codes, Linear cartographic features (Polylines), and Polygonal cartographic features (Polygons), Nodes, Segments, Appendages, Points-of-interest, Types of points-of-interest, and Chains of points-of-interest. In addition, several cross-reference transfer files may be created. These cross-reference files facilitate associating some of the various entities in the other files to each other. In a present embodiment, these cross-reference files may include a postal code and administrative area cross reference and a zone and administrative entity cross reference. In addition, a control file may be created that saves information about the generation of these transfer files. These transfer files may be binary type files or ASCII-type files. In one embodiment the Names, Administrative entities, and Languages transfer files are ASCII-type files and the remainder are binary type files. Methods for producing each of these transfer files from the GDF file are presented below. The collection of data into these specific files represents one exemplary embodiment in a part of the process to produce a physical storage format file, and other collections of data and other processes may be used.

The Name transfer file and the Language transfer file are created using the data from the Name and Attribute records, respectively, in the GDF file. The Name transfer file includes the names of physical features (e.g. names of roads, places, etc.) and the Language transfer file includes the language of the names of the features (e g. French, English, etc.).

The Administrative area transfer file is created in the form of a table that represents the hierarchy of political divisions in the map coverage region (e.g., state, counties, cities). The Administrative area transfer file is created from the GDF Relationship, Name, Attribute, Area, and Complex feature records. Using these same GDF records, a Postal code transfer file is created that includes the postal codes in the map coverage area. In addition, a Zone transfer file may be created from these same GDF records. The Zone transfer file includes data that identify neighborhoods in the map coverage area.

A cross reference transfer file is created that relates the entries in the Administrative area transfer file, the Postal code transfer file, and the Zone transfer file (if available). This cross-reference transfer file is created using the GDF Relationship records that reference Administrative areas, Postal codes, and Zones.

The Polygon transfer file is created from the Area, Face, Edge, Name, Attribute, XYZ, and Knot records in the GDF file. Polygon entities represent areas in the map coverage region, such as parks, lakes, etc. This file is in the form of a table.

The Node transfer file is created from the Point Feature, Knot records, XYZ records, and Attribute records in the GDF file.

The Segment transfer file and the Appendage transfer file are created from the GDF Line Feature records, Edge records, XYZ records, Attribute records, Point Feature records, and the previously-created Administrative area transfer file. (Entities in the Appendage transfer file include road signs, conditions, shape points, blocks, address ranges, overpass information, and so on).

The Polyline transfer file is created from the GDF Line records, Feature records, Edge records, XYZ records, Knot records, Attribute records and Name records. Polyline entities include both navigable and non-navigable linear features, such as roads, creeks, and railways. After all the Polyline records are created, the Polygon and Polyline records are merged into a Cartographic data transfer file.

The POI (points-of-interest) transfer file, and Type of points-of-interest transfer files are created from the GDF Relationship records, Point Feature records, Attribute records, Name records, and the previously-created Administrative area transfer file.

Additionally, other transfer files may be created such as the POI Chain transfer file. This transfer file may include names of points-of-interest chains, such as McDonald's restaurants, Marriott hotels, and so on.

In creating each of the transfer files, reference is made to GDF Attribute Definition and Attribute value records to obtain complete information about the attributes of the entities being created. In addition, in creating each of the transfer files, reference is made to GDF External update records to obtain the identification numbers for the transfer file entities.

As part of this process, counts of the different record types can be generated and maintained in the control file.

If it is intended to include third party data in addition to map coverage data in the physical storage format, the third party data may be converted into one or more transfer files at this time. The third party data may include specially generated data relating to special interests, or may relate to additional information in general whether or not the additional data are generated by another party. These third party data may be provided in additional, vendor-specific data formats. The map coverage data file may have pointers to this third party data as additional points-of-interest-type data in addition to the regular points-of-interest data mentioned above. These pointers between the main data file 902 and the third party data 904 continue to be maintained in the transfer files that are produced.

3. Production of Intermediate Data Files and Auxiliary Files

After the geographic data 902 and any third party data 904 are converted to the transfer files 925, the data, now in the transfer file format, are used to produce the various specialized intermediate data files 927 that include the data that are used ultimately by the various navigation application programs. These intermediate data files for the different types of navigation functions generally can be produced in any order except where the production of one type of intermediate data file requires the previous production of another of the types of intermediate data files.

These intermediate files may be named in any suitable, convenient manner. For example, level 0 routing data for a coverage area including the Chicago metropolitan area may be called chicago.rt0, and for layer 1, chicago.rt1. As these intermediate files are produced, they are also organized into parcels. Auxiliary files 949 (for example, files 951, 953, 955) are produced, one auxiliary file for each intermediate data file. The auxiliary file includes offsets identifying the starting locations of each of the parcels in the intermediate data file to which it is associated. These auxiliary files may be given any suitable names, such as chicago.rf0 for the auxiliary file for the routing layer 0 data file, chicago.rt0, and so on. The information in the auxiliary files is used in the isolation layer process, described below.

4. Routing Intermediate Data Files

A data transformation layer process produces a plurality of intermediate routing data files 931. The data in each of these routing intermediate data files are organized spatially for use ultimately by the routing navigation application. As part of this process, separate layers of the routing data are produced. At this stage, each of the separate layers is created and stored as a separate intermediate data file. In addition, as part of this process, supernodes and aggregated segments, as described above, are produced. Further, in each separate intermediate routing data file corresponding to each separate layer of the routing data, the data are organized into parcels, as described above. In any given layer of the routing data, a parcel contains segments, nodes, and associated navigable attributes, such as conditions, access characteristics, date-time modifiers ("DTM"), etc.

The intermediate routing data files 931 are produced from the Segment, Node and Appendage transfer files, described above. The relevant data in these transfer files are loaded into memory and pointers are constructed to represent the relationships between the various entities. For example, a Segment entity record will have a pointer to the Node entity records for the nodes at the Segment's end points.

Generated Shape Points

As part of the data transformation layer process, special shape points (referred to as "generated" or "artificial" shape points) are created and included as attributes of certain Segment entities in the intermediate routing data files. Accordingly, these generated shape points are created and included as attributes of certain Segment entities as part of the process of creating the routing intermediate data files.

Figure 10A:
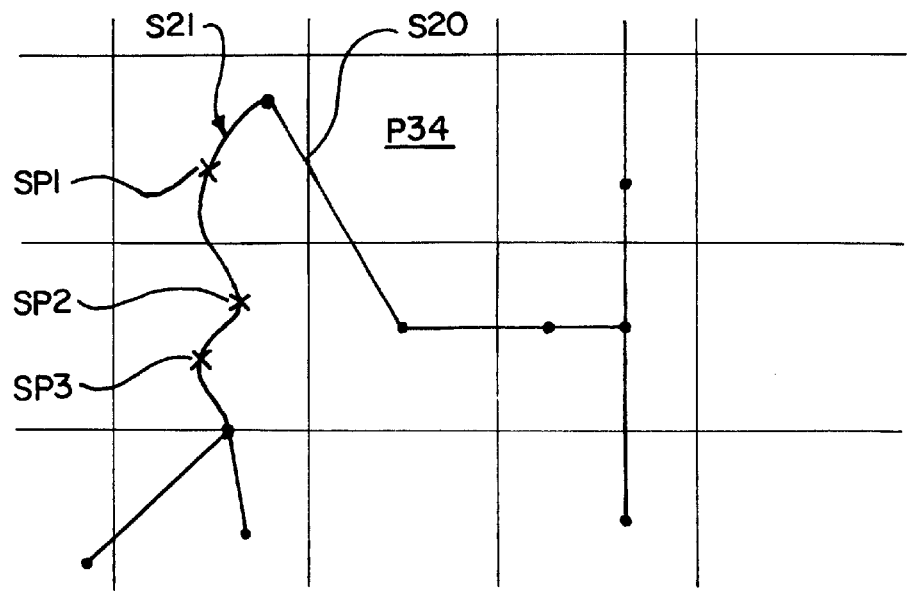
FIGS. 10A and 10B are illustrations showing generated shape points produced in a process in the compiler illustrated in FIGS. 9A–9C.

As described above, a Segment data entity may include one or more Shape point attributes along its length. If the road segment is other than straight, the Shape point attributes provide geographic positions (latitudes, longitudes) along the length of the segment to accurately represent the true physical locations along the segment to assist in vehicle positioning, etc. FIG. 10A illustrates a straight segment S20 and a segment S21 with shape points SP1, SP2, and SP3.

Figure 10B:
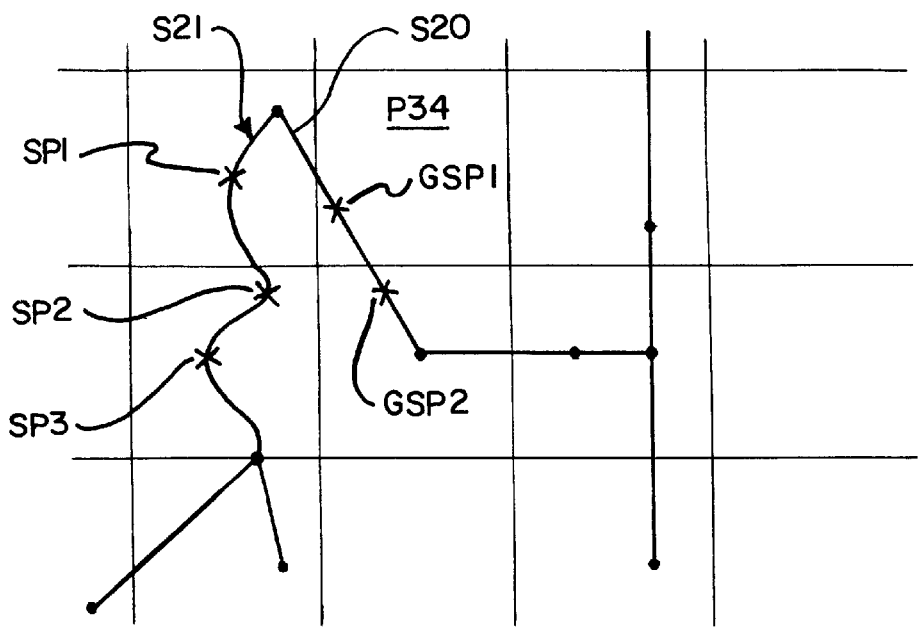

In a preferred embodiment, even if a segment is straight and therefore would otherwise not require any shape points located along it, generated shape points are constructed and associated with the Segment entity as Shape point attributes if any portion of the segment exceeds a predetermined threshold of length. Accordingly, as part of the compiler process for constructing the routing layer intermediate data files, each Segment entity is examined to determine whether it contains any portion exceeding a predetermined threshold of length without a Shape point. If so, a generated shape point is created and associated with the segment wherever there is a length within the segment that exceeds the predetermined threshold without a shape point. In one embodiment, the predetermined threshold is 512 navigation units (512/100,000ths of a degree) in an east-west or north south direction. Like any other shape point, these generated shape points represent true positions (latitude, longitude) along the segment. The positions of these generated shape points can be relatively easily derived since the portion of the segment for which a generated shape point is included is straight. Inclusion of generated shape points ensures that there are no portions of a segment greater than 512 navigation units without a shape point. The inclusion of generated shape points associated with segment S20 is shown in FIG. 10B at GSP1, GSP2.

This feature provides the advantage of increasing the likelihood that a segment will be associated with all the parcels through which it passes even though the segment may not otherwise have its end points or any regular shape points within each of the parcels through which it passes. For example, a straight length of a segment may pass through a corner of a parcel, e.g. parcel P34 in FIG. 10A. Since the end points of segment S20 (and regular shape points, if any) would be located outside of the parcel, there might not otherwise be any data associating the segment S20 with the parcel. This could have the result that the segment might not be represented as being located in the parcel even though a portion of it crosses the parcel. The inclusion of generated shape points at regular intervals along an otherwise straight segment provides a means of locating points of the segment in parcels that would otherwise not be associated with the segment, as illustrated in FIG 10B.

In a preferred embodiment, a generated shape point may also be calculated and included with a segment whenever any portion of a segment crosses a portion of a parcel and the segment does not otherwise have any shape points or end points (nodes) in the parcel, regardless of whether the portion of the segment that crosses the parcel is at least 512 navigation units. A list of all the parcels that a segment crosses can be generated and compared to a list of the parcels associated with the all the segment's nodes and shape points. Based on this comparison, it can be determined whether a generated shape point is required to be added to any portion of the segment to associate the segment with a particular parcel. The location of the generated shape point may be anywhere within the parcel and is not necessarily on the parcel boundary.

Routing Intermediate Data Files (Continued)

The bearing attributes for Segment entities are computed from the shape points of the segment entity. Two bearings are computed for each segment, one for each end of the segment. The bearing attribute represents the direction "going into" the segment. The bearing is calculated as an angle of displace relative to due north. In order to calculate a bearing for each end of a segment, one or more shape points within a segment are used. These shape points include those adjacent to, or within approximately 100 navigation units (or approximately 300 feet) of each of the nodes at the end points of the segment. An imaginary line is generated using the node at the end point and the shape points adjacent to it. The direction of this imaginary line is compared relative to due north in order to calculated a value for the bearing. In a preferred embodiment, the calculated bearing is normalized to a value between 0 and 255 to facilitate storage. The bearings are stored as attributes for each Segment entity.

Ranks of Node entities are defined and aggregated segments and supernodes are constructed in the manner previously described. In connection with the determination of aggregated segments, Node entities in all layers include an attribute that indicates whether the node is "aggregated-segment-significant", that is, if the node is an end node of an aggregated segment for that layer. Also at this stage, Segment entities that include combinations of attributes that correspond to entries in the normalized attribute table are assigned pointers to the normalized attribute table. The positional data for the Nodes and Shape points (including the generated shape points) are used to build a Peano-key array.

The data in each of the layers are parcelized starting with the lowest layer (most dense), in the manner previously described. In a preferred embodiment, in forming the parcels, an estimate is made of the ultimate size of the parcel.

Estimation Technique

In the parcelization process described above, there are numerous instances in which amounts of data are evaluated. For example, during the regular division procedure, described above, amounts of data are evaluated for the purpose of determining whether to continue to divide the data into portions representing smaller rectangular areas. In the custom division procedure, described above, amounts of data are evaluated for the purpose of determining the desired splitting line for forming parcels. In these instances, these evaluations take into account the fact that several factors can affect the ultimate size of a parcel formed from an amount of geographic data. For example, in addition to the geographic data, most, if not all, parcels include overhead, such as a parcel header, and index information, such as kd-trees. Some of these additional kinds of information included in parcels are fixed in size and others may vary with the amount or content of data. These types of overhead occupy space within a parcel so that in evaluating whether a given amount of data can be formed into a parcel, it is required to take these additional items of information into account. On the other hand, compression techniques can be used to reduce the size of certain types of data. It is also required to take these compression techniques into account in evaluating whether a given amount of data can be formed into a parcel with a desired fill percentage.

One way to make these evaluations is to perform all the steps of forming a parcel from an amount of data whenever an evaluation is required. Although this process would provide the necessary information to make the evaluation, it is computationally intensive and relatively inefficient requiring the generation of many trial parcel results (which are ultimately discarded) in order to arrive at a determination of desired parcel boundaries. Instead, in a preferred embodiment, an estimation technique is used.

The estimation technique identifies the variables that exist in a type a geographic data. The variables are identified as the quantities of each of the different types of entities in a type of geographic data. For example, in the routing data, the variables are identified as the quantities of each of the node, segment, condition, and shape entities that exist in a given amount of geographic data. The quantities of supernodes and aggregated segments are also identified separately. The estimation technique applies constants to each of these variables to estimate the approximate size of a parcel formed from a given amount of data. The constants to be applied to each of these variables are derived by a trial process in which each of these variables is caused to vary in a relatively wide range (and relative to each of the other variables) and the resultant parcel sizes are calculated.

Actual parcels are genera ted for a representative data sample. The estimation constants are given initial values and the resulting parcel size estimates are compared with the actual parcel sizes. One constant is selected and its value is perturbed by small amounts in the direction that improves the estimate. When no further improvement is obtained by further changes to the selected constant, the process is repeated for a second selected constant, and subsequently for all remaining estimation constants. This process is then repeated one or more times for all estimation constants, until estimates are within an acceptable range or no further improvements can be obtained.

The estimation process allows the resultant parcel to be estimated to within approximately 2%. The estimation technique is used in conjunction with a target parcel size (such as 95%) that allows the estimation technique to provide an estimate that is almost always within the allowable size.

The estimation technique can be applied to all types of data, including cartographic, maneuver, points-of-interest, and so on. Since each type of data has different entities, each type of data would have its own variables and constants. However, the constants would be derived in a similar fashion.

Routing Intermediate Data Files (Continued)

A two dimensional kd-tree is constructed for each layer using the aggregated-segment-significant nodes (as described above) for that layer. Layer 0, of course, does not have any aggregated-segment-significant nodes, and accordingly, the regular no des are used to build a kd-tree for layer 0.

As each routing parcel is defined in the intermediate routing data file for layer zero, the parcel is further divided into cells containing subsets of the parcel data. These cells are defined to have a predetermined size, such as 512 navigation units (512/100,000th of a degree). The cells are organized in Peano-key order. The positional data within each cell is organized by latitude and longitude in ascending order. These cells can be used later to facilitate spatial searches of the data within the parcel.

As the parcels are generated, temporary parcel identifiers are assigned (referred to as "parcel reference numbers" or "PRN's"). The parcels are stored in each file in depth-first order from the global kd-tree (which is approximately Peano-key order).

It is noted that all entities in the parcelized routing data are assigned new identification numbers relative to those used in the transfer files. It is further noted that at any time when entities are first generated from the transfer files, they are assigned such new identification numbers. In such cases, a cross-reference table is created between the old and new identification numbers. Thus, whenever any subsequent steps make reference to entities that have already been assigned new identification numbers, the entities may be obtained from the transfer files (where they still have their old identification numbers) using these cross-reference tables.

5. Cartographic Intermediate Data Files

After the routing intermediate data files are generated, the cartographic intermediate data files are generated. The cartographic intermediate data files include polylines and polygons. Polylines are data entities in the cartographic portion of the geographic database that represent linear features. Polygons are data entities in the cartographic portion of the geographic database that represent area features. Polylines and polygons are used by the map display function of the navigation system to produce an image on a visual display in the navigation system.

A data transformation layer process creates polylines for both navigable and non-navigable features. Separate polylines are created for each layer of cartographic data. In general, polylines should be represented by the longest possible "strands" of each of the features consistent with certain limitations, such as the boundaries of a parcel or subdivision of a parcel, as mentioned below.

Using the Polyline transfer file, the node entities for each non-navigable polyline are ordered in sequence linearly. The length and minimum bounding rectangle of each Polyline entity are computed. This computed length may be used along with other information to determine whether the Polyline entity should be included in a given cartographic layer of generalization.

The Nodes, Shape points, and Segments from the Segment, Node and Appendage transfer files are used to construct Navigable polyline entities (i.e. roadways). Navigable Polyline entities are constructed by combining several segments to form longer stands of segments. For navigable polyline entities, segments are combined to construct polylines that are as long possible provided that certain attributes remain unchanged along the polyline. For example, segments can be combined to form a polyline provided that the segments have any one or more of the same attributes, such as vehicular access, average speed, number of lanes, direction of travel, rank, or type of roadway (e.g. paved, ramp, tollway). After a polyline is constructed, the length and minimum bounding rectangle of the navigable polyline entity are computed. As with non-navigable polylines, the length value may be used to determine whether the polyline should be included in a given cartographic layer of generalization. The minimum bounding rectangle of a navigable polyline is used to determine if the polyline intersects the boundary of a subdivision of a parcel, as explained further below.

Using the Polygon transfer file, the node entities for each polygon are organized in sequence so that the node entities associated with each polygon are ordered in a counterclockwise fashion. The perimeter, area, and minimum bounding rectangle of each polygon entity are computed and stored. These computed values may be used along with other information to determine priority for overlaying of graphics in a given cartographic layer and to determine whether the entity should be included in a given cartographic layer of generazation.

The ordered polygons and non-navigable polylines, as well as the navigable polylines, are then organized into multiple layers. One polygon file and one polyline file are created for each layer. The number of layers of cartographic data may be chosen to correspond to the number of layers of routing data. For example, if there are five layers of routing data, five layers of cartographic data may also be formed. The lowest (most dense) layer of cartographic data is formed first. (The number of layers of cartographic data may also correspond to the number of different ranks of segments.)

As with the routing data, normalized attribute tables may be constructed that include commonly occurring combinations of selected attributes of the cartographic data. If normalized attribute tables are used, pointers are included in selected cartographic data entities that point to the cartographic normalized attribute table.

As each layer of cartographic data is formed, the cartographic data within the layer are parcelized. As a preliminary matter, the positional data (e.g. latitude, longitude) for each layer are organized by either the longitudes or latitudes of the positions. For example, keys may be generated for each position, with a pointer to the position and a pointer to the entity to which the position corresponds. The keys are organized according to the longitude of the positions to which they point, in ascending order (left to right). Alternatively, this can also be done by latitude. Additionally, pointers to the keys are generated, with the pointers organized by latitude, in ascending order. This positional data is used in the estimation technique for parcelization, as described above.

If the routing data (or other spatially organized data) have not already been parcelized, each layer of the cartographic data may be parcelized in the manner described above. If a global kd-tree has already been generated based upon parcelization of the routing or other spatial data, the same boundaries previously generated are used to parcelize the cartographic data. The cartographic data for a map coverage area should be contained in parcels covering the largest areas consistent with the requirement that the amount of data within any parcel not exceed a maximum parcel amount. Therefore, cartographic data parcels do not necessarily have the same geographic boundaries as the routing data parcels, previously generated. For example if the cartographic data are less dense, the cartographic data may not have to be divided as much as the routing data. However, in dividing the cartographic data to form parcels, the same division lines would be used that were generated in the parcelization of the routing data. This implies that a plurality of routing data parcels may correspond to the same geographic area as one cartographic parcel (and vice-versa in areas where the Cartographic data happens to be denser than the routing data). If the cartographic data in a given layer is more dense than the routing data, further divisions of the cartographic data may need to be made beyond the divisions that had already been defined in the parcelization of the routing data. Such further divisions of the cartographic data may be made in the manner previously described.

Subdivisions of Cartographic Parcels

For cartographic data, as each parcel is defined at a given layer, the parcel is further divided into cells containing subsets of the data in the parcel. The cells may be defined by a regular grid pattern overlaid on the parcel. A header is created in the parcel to identify the parcel cell structure.

The cells represent relatively large non-overlapping geographic rectangles within the parcel's coverage area. This facilitates the extraction of data corresponding to a search rectangle that overlaps the parcel's coverage area. The cells are additionally used for managing zooming and panning of a geographic area represented by the cartographic data in the parcel by a map display navigation application function. Although a preferred embodiment of the navigation system may read data only in whole parcels from the medium, the data are compressed. Therefore, by using a cell structure, only a subset of the data in the parcel, i.e., the cell content, needs to be expanded and returned to the navigation application to display a map location at a given zoom level. Without such subdivision, it would be necessary to expand and examine an entire parcel to locate data within the search rectangle. Neighboring subsets or cells of the data can be used when the map is zoomed out or panned left, right, up or down.

For example, referring to FIG. 11A, the area needed for map display intersects a small part of a cartographic parcel. Because the data within the parcel are organized into cells, only the data contained in the two cells intersecting the map display area need be examined. The cells overlapping a given rectangle can be found by searching a kd-tree internal to the cartographic parcel, each of whose leaf nodes represents a cell. The records of a given type within a cell are stored contiguously, so that each cell comprises a contiguous interval of polyline records, a contiguous interval of polygon records, and a contiguous interval of point records.

FIG. 11B illustrate s an internal kd-tree entry for a cartographic parcel. Cuts for the kd-tree are defined, as described previously, at any 1/32 division of a rectangle's minimum enclosing $2^I \times 2^J$ by tile. Each leaf node in t he kd-tree represents a cell, and corresponds to a set of intervals of cartographic entity records.

Figure 11C:
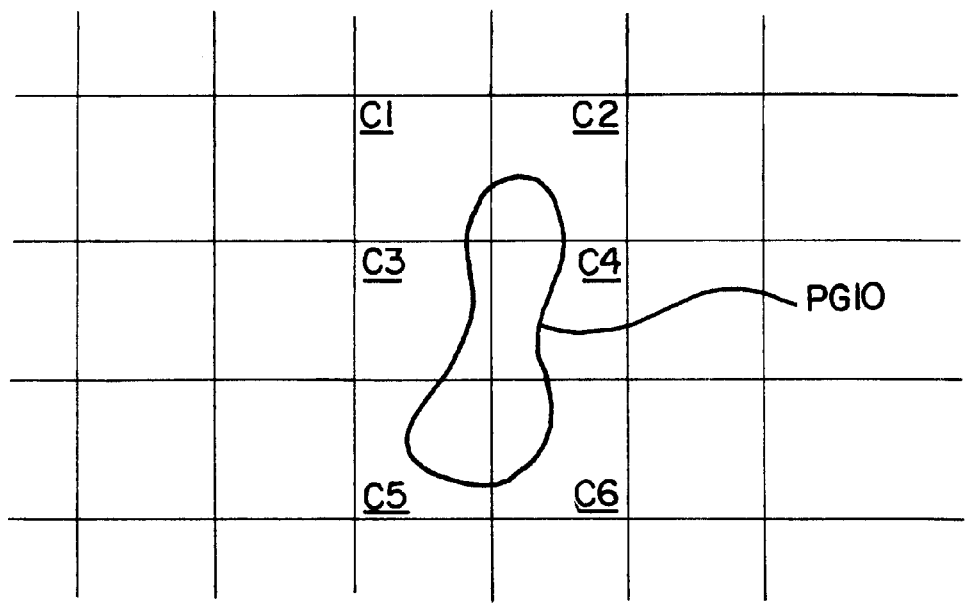
Figure 11C:
Figure 11C:
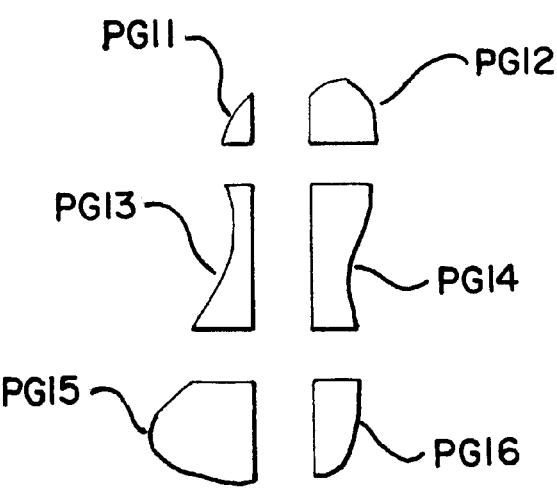

Subdivision of parcels also breaks large polygons and long polylines at cell boundaries. In connection with the defining of the se parcel cells, polygons and polylines that intersect the cell boundaries may be cropped or clipped to conform to the cell boundaries. For example, if a polygon entity PG10 represents a lake that occupies portions of six different cells, C1–C6, as represented in FIG. 11C, the polygon entity representing the lake is replaced by six separate polygon entities (illustrated as PG11-PG16) representing the portions of the lake located in each of the cells C1–C6. Each of these new polygon entities is provided with a new entity identification number within the cells so that the appropriate data can be read for map display. In a present embodiment, the polygon entities do not include information indicating in which cell they are located.

6. Cross-reference Intermediate Data Files

After the routing and cartographic data are parcelized, cross-reference files may be created correlating entities in each of the parcels in each of the layers of cartographic data to the routing entities in the parcels of the routing data. In one embodiment, the cartographic entities are correlated only to the routing data entities in layer zero of the routing data. These cross-reference files may be used, for example, by a navigation application program to find the appropriate cartographic data to display and highlight a route that corresponds to the segment entities in the routing data that form a route calculated by a route calculation application. Conversely, the cross-reference file can be used to find a routing segment entity based on a point-and-click of position on the map display.

7. Place Intermediate Data File and Place Indices

Place data refers to administrative areas and zones, e.g. municipalities, counties, neighborhoods, etc. A data transformation layer process produces a place intermediate data file and indices using the Administrative areas, Segments Nodes, and Appendage transfer files. These transfer files are loaded into memory, and the places are organized in hierarchical order, e.g., country, state, county, city, etc. In general, at each level of hierarchy, places having the same administrative hierarchical parent place are arranged together and ordered alphabetically. However, if the immediate hierarchical administrative parent of a place is determined to be not "address-significant", then the place is arranged together with other places having the same hierarchical administrative parent place and ordered alphabetically based on the next higher level parent in the hierarchy which is determined to be address-significant. A place is determined to be not "address-significant" where it is not normally used to define addresses. For example, address information in the U.S. typically includes a municipality (e.g. a city, town, village) and the immediate administrative hierarchical parent of a municipality is a county. However, counties are not address-significant in the U.S. because counties are not normally used in addresses. Accordingly, the next higher hierarchical administrative parent, i.e. a state, is used because states are used to define addresses and therefore are address-significant. In this case, both cities and counties will be organized by the state in which they are located.

Pointers are generated between related places at different levels of the hierarchy (e.g., a city points to the county in which it is located, and the county points to the state in which it is located, and vice versa). Also, for each place a minimum bounding rectangle may be computed. The minimum bounding rectangle for each place is determined and stored at the lowest level in the hierarchy. The minimum bounding rectangle of a place may be computed based on the segments that form the place. The minimum bounding rectangle for each higher level place in the hierarchy may be computed by combining the minimum bounding rectangles for the lower level places contained within that place, and then generating a minimum bounding rectangle for those combined rectangles. The minimum bounding rectangles associated with places are used to facilitate spatial searches by the navigation application program.

B-tree index files may be created for names of places. These indexes contain the names of places in order of identification numbers for the places. Each entry in the index file has a pointer to the place's record in the associated parcel. Place data may be compressed using Huffman encoding or other well-known methods of compression.

The place data are stored in a place intermediate data file. Like the other intermediate data files, the place data file is parcelized as it created. However, unlike the spatially-organized data, the place data are not parcelized spatially. Instead, the place data are parcelized based only upon size (in the order that the place entities are arranged) so that parcels of the place intermediated data file are close to, but less than a maximum parcel amount.

8. Postal Code Intermediate Data File and Postal Code Indices

A data transformation layer process produces postal code intermediate data files and indices using Postal code data from the Postal code and Segment transfer files. These files are loaded into memory and postal codes are organized in alpha-numerical order. For each postal code, a minimum bounding rectangle is computed based on the segments having the postal code. Minimum bounding rectangles for postal codes may be used by the navigation application programs to facilitate postal code-based spatial searches.

B-tree index files may be created for postal codes containing pointers to each postal code's associated parcel. Postal code data may be compressed using Huffman encoding or other well-known methods of compression.

The postal code data are stored in a postal code intermediate data file. Like the place intermediate data file, the postal code intermediate data file is parcelized based upon amounts of data.

9. Navigable Feature Name Intermediate Data File and Indices

A data transformation layer process produces a navigation feature name intermediate data and indices using the Navigable feature name data from the Name transfer file and the Appendage transfer file. These files are loaded into memory, and the names are organized in alphabetical order. B-tree index files may be created for navigable feature names. These index files contain the name records, each of which contains a pointer to the name's associated parcel. Navigable feature name data may be compressed using Huffman encoding or other well-known methods of compression.

The navigable feature name data are sorted in alphabetical order by the base name of the navigable feature name. The sorted navigable feature name data are parcelized and stored in an intermediate data file.

10. Navigable Features (Ordered by Place) Intermediate Data File

Navigable feature identification numbers are also organized for each place at the lowest level of the place hierarchy. The place or places with which each navigable feature is associated are determined from the segments that comprise the navigable feature. More specifically, for each such segment, the administrative area in which the segment is located can be determined from the Segment transfer file, and the road name for the segment can be determined from the Appendage transfer file. Thus, an administrative area can be correlated with the road name for a navigable feature. The places are organized by their identification numbers. The navigable feature identification numbers for each place are organized in ascending order within those places. In addition, each navigable feature identification number record also contains the identification number(s) of the maneuver parcels in which the navigable feature can be found in the associated place.

This data may be used by the navigation application program to generate lists of roads organized by place, and to identify the segments associated with a road/place combination.

At least two B-tree index files may be created for navigable features ordered-by-place. One index file uses the place identification as a primary key and the navigable feature base name as a secondary key. This index file can be used to locate navigable features that match a base name within a place. The other index file uses the navigable feature ID as a primary key. This index file is used when the navigable feature ID is already known (from a prior search for example) and it is desired to obtain additional information about the navigable feature, such as its place.

11. Maneuver Intermediate Data File

Maneuver data include segments and their address ranges, navigable feature identification numbers, road sign information, and cross-references between entities, such as for example between segments and navigable features, and vice versa A data transformation layer process produces a maneuver intermediate data file and indices using the Segment, Node and Appendage transfer files. Pointers are constructed to establish relationships between the various entities. For example, pointers establish relationships between the segments in the routing data and the names of places in the place data. In another example, a segment will have pointers to the records of the nodes at the segment entity's end points.

Generated shape points may be calculated and stored with the maneuver segments, or alternatively, the generated shape points created during the production of the routing intermediate data file may be used.

The positional data for nodes, shape points, and artificial shape points (now in memory) are used to build a Peano-key array. Alternatively, the Peano-key array generated for the routing intermediate data file may be used.

Some of the data obtained from the transfer files to generate the maneuver data parcels (such as navigable feature names and places) may have already been assigned new identification numbers in connection with the previous production of intermediate files for other types of data. Therefore, the old identification numbers for those entities are converted to the new ones using cross-reference tables that are generated during the production of each intermediate file.

The maneuver data are parcelized using the global kd-tree previously generated. The maneuver data should be parcelized so as to satisfy the minimum desired fill percentage for each parcel. The maneuver data for a given geographic area should be contained in the parcel covering the greatest area where the minimum desired fill percentage is satisfied. If the maneuver data encompassed within a geographic rectangular area corresponding to previously-defined parcel exceeds the maximum parcel amount, further divisions of that data into groupings corresponding to smaller rectangular areas may be made in the manner previously described in order to achieve the desired parcel amount.

For maneuver data, as each parcel is defined, segments may be associated with a cell index internal of the parcel. The cell index may be a combination of latitude and longitude. A parcel is represented as divided into a cells, wherein each cell is defined as a geographical area of a regular size, such as 256/1000,000ths of a degree. A minimum bounding rectangle is calculated for each segment in the parcel, and the cells in which the northeast and southwest corners of the segment's minimum bounding rectangle are located are identified. These cells are then associated with the segment. (It is possible that both the northeast and southwest corners of the minimum bounding rectangle of a segment are located in the same cell and if so, this information is associated with the segment accordingly.) This arrangement of segment data facilitates spatial searches of the data within the parcel by permitting a rapid examination of the cells that a segment spans.

12. Points-of-Interest and Third Party Intermediate Data Files

Using the points-of-interest transfer file 930, another data transformation layer process reads these data and generates a points-of-interest intermediate data file. In producing this intermediate file, this process spatially organizes the points-of-interest data into parcels having the same boundaries as the parcels of cartographic data in the cartographic intermediate data file. At this stage, if third party data are included in the transfer file format, these data are also organized into an intermediate file and associated indices. In the production of the third party intermediate data file, the data are organized into parcels having boundaries that are the same as those of the cartographic and points-of-interest parcels, described above.

13. Neighboring kd-tree Intermediate Data File

After all of the spatial data (routing, cartographic, maneuver, and cartographic cross-reference data) are parcelized, a transformation layer process stores neighboring kd-trees within each parcel for each type of spatial data. A neighboring kd-tree within a parcel identifies the parcel, the parcel's parent(s) (if any), the parcel's children (if any), and the parcel's adjacent parcels (if any). These neighboring kd-trees can be used by the navigation application program for spatial searches and to access one parcel from another.

14. Global kd-tree Intermediate Data File

After the neighboring kd-trees are defined and stored for each of the spatially-organized parcels, the global kd-tree is converted to a compressed form and stored in an intermediate file.

D. Physical Storage Format Isolation Layer

1. Overview

As mentioned above, the geographic data set compiler 900 provides an output 905. The component of the compiler 900 that produces this output 905 is the physical storage format isolation layer 914. The physical storage format isolation layer 914 produces the output 905 from the intermediate data files 927 produced by the data transformation layer 910. The isolation layer 914 forms a media-specific format from the intermediate data files 927 in accordance with the placement schema, described above.

One of the advantages provided by the physical storage format isolation layer 914 is that it isolates the rest of the geographic data set compiler processes, such as the data transformation layer processes, from the details and characteristics of particular different types of media. Different media types may benefit from different placement and redundancy strategies for the various data components. For example, on a CD-ROM, the data expected to be accessed most frequently or requiring fastest access time, are placed closer to the inner track.

Figure 9C:
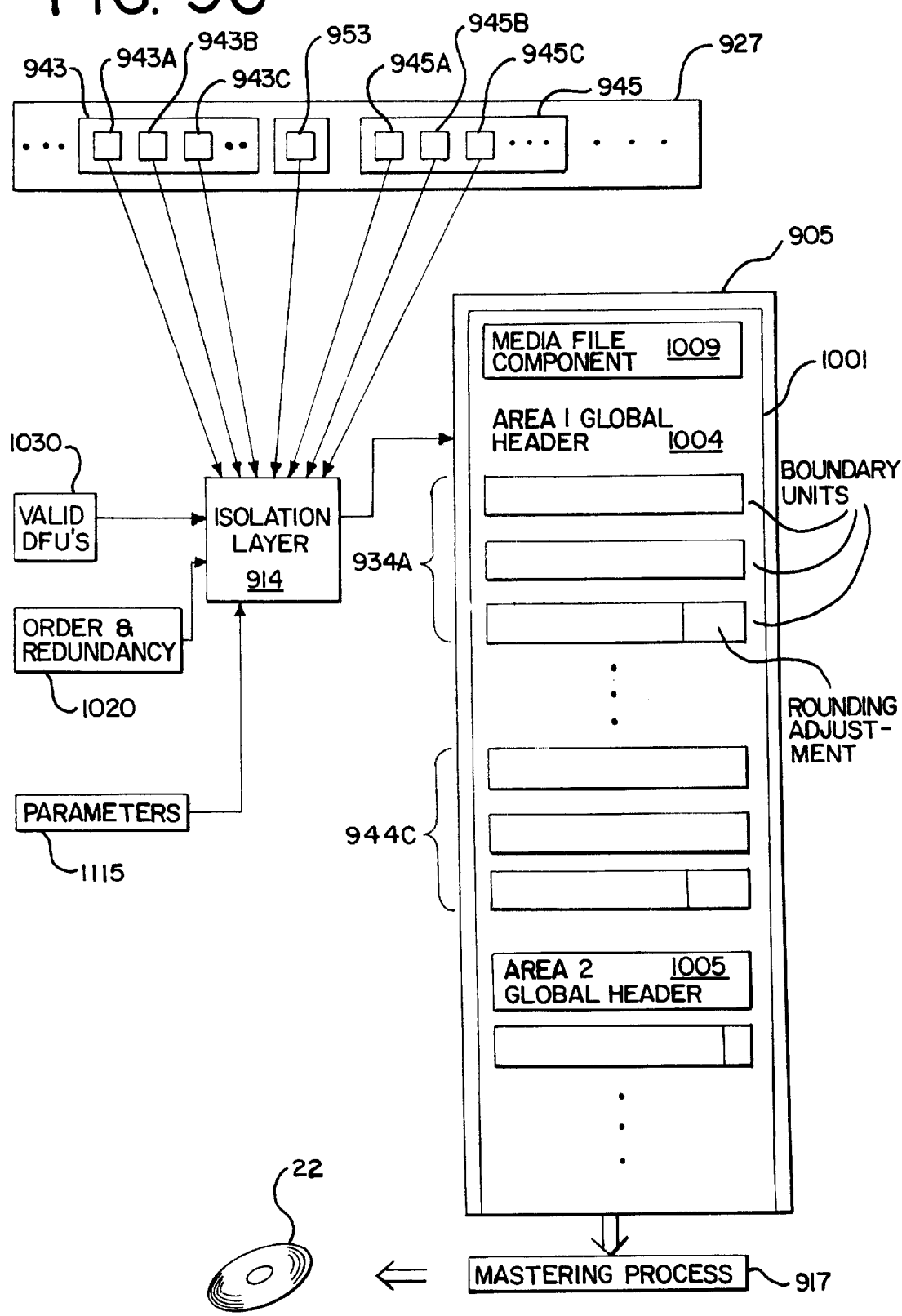

Referring to FIG. 9C, the output 905 produced by the physical format isolation layer 914 includes at least one storage medium geographic data file 1001. The storage medium geographic data file 1001 contains all the individual parcels included in the intermediate files 927 produced by the data transformation layer 910. In the isolation layer 914, these individual parcelized intermediate files 927 are concatenated into a single file to form the storage medium file 1001.

In the isolation layer 914, more than one map data coverage area (DCA) may be combined into a single storage medium geographic data file 1001. Each map data coverage area relates to a specific geographical region, such as the region 100 in FIG. 4A. If multiple map data coverage areas are included in a single geographic data file 1001, each map data coverage area includes its own map data file header. (The map data header file contains global data that is applicable to its particular data coverage area, as explained below.) For example, the file 1001 includes two map data coverage areas, and accordingly, includes two headers 1004 and 1005. A map data file header is placed in the storage medium geographic data file immediately before the parcels of data to which it relates.

Included as part of the output 905 of the isolation layer 914 is a media file or component 1009. The media file/component 1009 may be formed as a separate file or preferably, the media file 1009 may be formed as a parcelized component (i.e., a "media component") of the storage medium geographic data file 1001. The media component 1009 contains global data relating to the storage medium as a whole.

The placement of data within the file 1001 is provided by the concatenation of the various intermediate data files into a single file and creating offsets (referred to as "parcel ID's") for each parcel within each intermediate data file. The parcel ID is a combination of parcel size, redundancy, and offset from the start of the file 1001. Thus, the parcel ID is inherently dependent on the media characteristics. The parcel ID not only allows for the quick location of any particular parcel on the medium but also, by virtue of carrying information identifying the size of the parcel, allows any navigation application program to appropriately allocate sufficient memory to load the parcel. For a CD-ROM, the parcel ID preferably reflects the sector number. For a PCM-CIA card, the parcel ID reflects a byte offset, for example, in units of 256 bytes. One bit of the parcel ID is used to indicate the presence of extra (redundant) copies of the parcel. The locations of the copies, if any, can then be determined from a memory-resident table by the navigation application. For media, such as CD-ROM, the ability to select among various copies stored on the medium reduces data retrieval times, because the redundant copy closest to the CD head can be chosen. In one alternative embodiment, redundant copies of data may be used for index information such as the "global kd-tree."

Since all of the data in the intermediate data files are parcelized (with the possible exception of some global data), the parcels are first visited in a particular sequence before parcel references can be substituted with parcel ID's. Parcel placeholder information is provided for this purpose. This information is in the form of the previously-generated parcel reference number (PRN) or parcel index that can be translated to a byte offset. The parcel index (0-n) is a raw sequential index generated by each of the processes in the data transformation layer 910 that creates intermediate data files. Thus, the isolation layer 914 first loads parcels from the intermediate data files and writes out the parcels in a predetermined sequence rounded to the nearest boundary units. Then, parcel reference numbers are replaced by the newly-generated parcel ID's. This second step involves knowledge of the specific data structures involved. There are two types of parcels this second step handles. Parcel reference numbers that are local to data parcels require that the appropriate parcel header for that parcel type be read in and the parcel tables containing the parcel reference numbers be accessed through the header. The parcel reference numbers that are carried within index parcels require that the particular index file parcel be read in and the index tree be traversed in order to update the parcel reference numbers to corresponding parcel ID's. Since there are spatial and non-spatial indices, this step uses the information developed in creation of the index trees.

One alternative approach to performing this process provides for the setting up of an auxiliary file that contains an offset for each parcel reference number. Updating the index tree parcel reference numbers would involve accessing the particular location as indicated by the offsets and then using the parcel reference number at that location as an index into an existing table containing actual parcel offsets.

Another alternative approach is to have the process in the data transformation layer that produces the intermediate data file also include a function that navigates down to the locations of parcel reference numbers to allow the physical storage format isolation layer 914 to effect the substitution of parcel reference numbers with parcel ID's. The method outlined below is based on this latter approach.

Two useful by-products of the operation of the physical storage format isolation layer 914 are the creation of the parcel redundancy tables and the index root parcel ID's.

Note that for any different type of storage medium, the output files, including the geographic data output file 1001, are created first on a hard disk. Transferring the output files to the actual storage device 22, such as a CD-ROM is the function of a mastering process 917, which is well known in the art.

2. Components of Physical Storage Format Isolation Layer

The isolation layer 914 uses as inputs the intermediate data files 927 produced by the data transformation layer 910 and the auxiliary files 949 produced by the data transformation layer 910 for each of the intermediate data files. The isolation layer process may be configurable (either by manual input prompts or from a configuration file) to accept input identifying one or more data coverage area names, the type of medium being used, and a starting unit (or position unit) on the storage medium. The isolation layer also uses a look up file 1020 (referred to as "data_map file") that contains the preferred data placement order and redundancy information. The redundancy is implied by the repeated occurrence of different data file units.

As mentioned above, an auxiliary file (referred to as "an offset descriptor file") is produced for each intermediate data file. The offset descriptor file contains parcel offsets and parcel sizes for each parcel in each intermediate data file. For example, the intermediate data file 943 includes data parcels 943A, 943B, 943C . . . , and associated with the intermediate data file 943 is an auxiliary file 953 containing the parcel offsets and sizes for the intermediate data file 943. The parcel offset reflects the byte offset of the parcel from the start of the file. In a preferred embodiment, an offset descriptor file exists for each type of intermediate data file for every layer. As an example, the intermediate data files for routing layer 0 through layer 4 files each is associated with it own offset descriptor file that contains a table of byte offsets implicitly indexed by the parcel reference number within the file. In a preferred embodiment, each of the intermediate data files, including the index and the relevant global data files, has a fixed size file header that indicates the total number of parcels that are contained in the file.

The isolation layer also uses a file 1030 (referred to as a "fileinfo descriptor file") that contains information identifying, for each intermediate data file, file extensions and suffixes for both the data file unit as well as for the accompanying offset descriptor files on disk. For each intermediate data file, the fileinfo descriptor file 1030 also includes information indicating whether or not a particular intermediate data file contains any parcel reference numbers.

3. Operation of Physical Storage Format Isolation Layer

In the isolation layer 914, prior to being written out in sequence, each parcel is examined to determine by how much the size of the parcel should be increased so that it conforms evenly with the size of the boundary unit associated with the storage medium onto which the data will be written. Different storage media may have different sizes of boundary units. For example, for a CD-ROM, the boundary unit is 2048 bytes and for a PCMCIA card the boundary unit is 256 bytes. Unless a parcel has a size that exactly corresponds to a multiple of a boundary unit of the medium, the parcel is increased in size by adding an amount of padding (also referred to as a "rounding adjustment") to "round up" the parcel to a size that corresponds to the next largest multiple of a boundary unit. Because each parcel in the intermediate data files may have a different amount of data, the amount of padding is separately calculated for each parcel in each intermediate file.

Padding a parcel so that it conforms in size to the next larger multiple of the boundary unit on the medium requires first determining the size of the parcel in terms of the number of physical boundary units. Depending on the type of media, this involves using one of the two formulae:

For a CD-ROM, where the boundary units are 2*K (where K=1024 bytes), the rounding adjustment is equal to (parcel_ size%2*K) rounded to the next 2K unit, where parcel_size is equal to the size of the parcel as it exists in the intermediate data file.

For a PCMCIA cards, where the boundary units are 256 bytes, the rounding adjustment is equal to (parcel size%256) rounded to the next 256 unit, where parcel_size is equal to the size of the parcel as it exists in the intermediate data file.

If media other than CD-ROM or PCMCIA cards are used, there may be different boundary units of different sizes, and the rounding adjustments are modified accordingly.

The isolation layer 914 is initialized with the appropriate parameters identifying the type of medium, the map coverage area, etc. Also, the look up file 1020 (i.e., the data_map file) indicating the ordering and redundancy is loaded. A first pass through the look up file 1020 is made in memory to determine the total number of intermediate data files and the redundancies. If a specific file does not exist for the data coverage area, the isolation layer process moves to the next file as long as the missing file is not part of the minimal set. The minimal set for example may include the global data, at least one set of indexes, and intermediate data files.

Using the auxiliary file (i.e., the offset descriptor file) that identifies the size and location of each parcel in the first intermediate data file, the parcel is read into memory and written back to the storage format file 1001 on disk after rounding it off to the next largest boundary unit. After the parcel is written, using the auxiliary file, the process moves on to the next parcel in the first intermediate data file. A rounding adjustment is again calculated and the parcel, plus the rounding adjustment, is written to disk. The process continues until all the parcels in the first intermediate data file are padded and written to disk. As the parcels are written to disk, a parcel ID is assigned to each of the parcels. Each parcel is assigned a unique ID and in a preferred embodiment, the parcel ID represents a combination of offset from the beginning of the physical storage format data file 1001 plus the size of the parcel (taking into account the rounding adjustment) plus redundancy information.

After the parcels from the first intermediate data file are padded, assigned parcel ID's, and written to disk, the next intermediate data file (e.g. 945) is loaded into memory and its parcels are padded, assigned parcel ID's, and written to disk in a manner similar to the first intermediate data file. As mentioned above, the sequence in which the intermediate data files are handled is determined by reference to the look up file 1020 (data_map). As the second and subsequent intermediate data files are processed, the parcels in these intermediate data files are written into the same storage format data file 1001. Accordingly, the parcels in the second and subsequent intermediate data files are assigned parcel ID's that are offsets (plus parcel sizes) from the start of the same storage format file 1001 that already includes the parcels written from the first intermediate data file. For the redundant parcels, if any, the same process is used extended to accommodate new sets of parcel ID's. At the end of this process, parcel ID's have been created for all the data types existing in the data_map file and available on the media. In a preferred embodiment, all the parcels from all the different intermediate data files for a database region are included in a single, per-region storage format data file (i.e., all the intermediate data files have been merged in a concatenation-type process).

After all the parcels from the intermediate data files have been concatenated into the storage format data file, an isolation layer process updates all the parcel reference numbers in the data parcels that have been written to disk. Many of the data, including the index files, include references to other data either within the same parcel or in other parcels. To enhance operation of the navigation application functions, these references to other data are updated to include the assigned parcel ID. Since the previous isolation layer process assigned new parcel ID's to all the parcels, all the parcel references internal of the parcels (the previously-assigned parcel reference numbers) have to be updated using the newly-assigned parcel ID's. In a preferred embodiment, the look up file (data_map) includes information that identifies the types of intermediate data files containing parcels having parcel reference numbers that require updating. A process in the isolation layer forms a table that keeps track of, for each parcel written to disk, the parcel ID and the parcel reference number previously associated with that parcel. For those intermediate data files that include parcels that require updating, the isolation layer process uses the look up file to identify offsets to parcel reference numbers in the parcels. All the parcel reference numbers within all the parcels are located and replaced with the appropriate parcel ID.

As mentioned above, more than one map coverage area (i.e., database region) may be included in the physical storage format data file 1001. The above process would be followed for subsequent map coverage areas included within the same physical storage format data file 1001. Alternatively, additional map coverage areas may be included in separate physical storage format data files.

This physical storage format data file 1001 is used in a mastering process 917 that writes the file 1001 onto the storage medium. When the output file is written onto the medium, it retains the organization shown in FIG. 9C. The mastering process may be conventional. When the output file 1001 is stored on the physical medium, such as a CD-ROM, the parcel ID information permits rapid location of the data on the medium since the parcel ID references in the data correspond directly to locations on the medium. That is, in the embodiment described above, the parcel ID represents an offset (plus parcel size) from the start of the single map data file stored on the medium. This information can be used to directly locate the position on the medium where data are stored. This provides the potential for enhancing the speed and operation of navigation application functions that use the geographic data on the storage medium.

VI. Alternative Embodiments

In further alternative embodiments, the navigation system may incorporate wireless communication to obtain some or all of the data it uses from remote or central locations. In such alternative embodiments, the geographic data may be provided from a remote or central location, or alternatively, some or all information may be available via wireless communications. For example, updates or real-time traffic information may be provided via wireless communications to supplement a geographic database installed in an in-vehicle navigation system.

It is intended that the foregoing detailed description be regarded as illustrative rather than limiting and that it is understood that the following claims including all equivalents are intended to define the scope of the invention.

We claim:

1. A method for organizing data for storage on a physical storage medium comprising:
    forming a plurality of data files wherein each of said data files has data therein;
    parcelizing the data in each of said data files into a plurality of parcels;
    concatenating the plurality of data files while retaining said parcelization of said data;

assigning a parcel identification to each of said plurality of parcels; and storing said concatenation on a storage medium.

2. The method of claim 1 wherein said step of forming a plurality of data files further comprises the step of:

forming a data file for route calculation.

3. The method of claim 1 wherein said storage medium is a CD-ROM.

4. The method of claim 1 wherein said storage medium is a PCMCIA card.

5. The method of claim 1 wherein said concatenation is a single data file.

6. The method of claim 1 wherein said parcel identification includes an offset from a start of the concatenation.

7. The method of claim 1 wherein said parcel identification includes an offset from a start of the concatenation and an indication of a size of the parcel identified thereby.

8. The method of claim 1 wherein said data includes cross-references between individual records of said data, and wherein the method further comprises the step of:

after the step of assigning a parcel identification to each of said plurality of parcels, updating said cross-references to include said parcel identifications.

9. A physical storage medium for computer-readable data wherein said medium includes a plurality of similar-sized physical boundaries, comprising:

a plurality of parcels, each of said parcels including a plurality of data entities padding added to individual parcels of said plurality of parcels to cause said parcels to conform to said similar-sized physical boundaries; and wherein each parcel of said plurality of parcels includes a parcel identification, said parcel identification related to an offset from a start of said plurality of similar-sized physical boundaries.

10. The invention of claim 7 wherein said plurality of data entities includes cross reference data, and wherein said cross-reference data includes references to parcel identifications.

11. A geographic database stored on a computer-readable medium formed according to the method of claim 1.

12. A method of forming a database that contains data that represent geographic features located within a geographic region, wherein said database is formed for storage on a physical medium selected from a plurality of available physical media, the method comprising:

transforming geographic data from an initial format into an intermediate transfer format, wherein said geographic data in said intermediate transfer format are included in a plurality of intermediate data files, wherein said intermediate data files include separate files for different types of geographic data, wherein said separate types of geographic data comprise at least routing data that include data entities including attributes relating to navigation;

cartographic data that include data entities including attributes relating to map display;

maneuver data that include data entities including attributes related to route guidance; and name data that include data entities including attributes related to names of represented geographic features;

separating the data of each of said different types of geographic data into a plurality of parcels, wherein each of said plurality of parcels includes a plurality of data entities of said type and wherein the plurality of data entities contained in each of said parcels conforms to a parcel size related to characteristics of said predetermined physical medium; and replacing temporary entity identifiers contained in said geographic data by which said data entities can be referenced with new entity identifiers, wherein said new entity identifiers identify which of said plurality of parcels contains the data entity associated with each of said new entity identifiers.

13. The method of claim 12 wherein said step of separating comprises:

for each of said types of geographic data, estimating a resultant size for a parcel formed of a plurality of data entities of said type of geographic data, wherein said step of estimating uses variables associated with said type of geographic data being separated.

14. The method of claim 13 wherein said variables for said routing intermediate data include quantities of segment entities that exist in a given amount of geographic data.

15. The method of claim 12 wherein said step of separating comprises:

determining parcel boundaries for said routing data;

parcelizing said routing data spatially along said parcel boundaries; and after parcelizing said routing data, parcelizing said cartographic data along the parcel boundaries determined for said routing data.

16. The method of claim 12 wherein said step of separating comprises:

determining parcel boundaries for said routing data;

parcelizing said routing data spatially along said parcel boundaries; and while parcelizing said routing data, forming a kd-tree for said parcels of routing data.

17. The method of claim 12 wherein said step of separating comprises:

determining parcel boundaries for forming parcels for said routing data; and for each parcel of said routing data, using the routing data in said intermediate data files to identify each road that crosses the parcel boundaries of said parcel but which is represented by a data entity defined by geographic coordinates located outside said parcel boundaries;

determining generated shape point data for said data entity, wherein said generated shape point data represent a position along said road represented by said data entity and wherein said position is located within the parcel boundaries of said parcel; and storing said generated shape point data in said parcel.

18. The method of claim 12 wherein said step of separating comprises:

determining parcel boundaries for forming parcels for said cartographic data; and for each parcel of said cartographic data, using the cartographic data in said intermediate data files to identify strands of connected road segments which are located within said parcel boundaries and which have similar attributes;

forming polyline data entities to represent said strands of connected road segments; and storing said polyline data entities in said parcel of cartographic data.

19. The method of claim 12 further comprising:

forming a B-tree index for the name data entities included in said parcels; and storing said B-tree index on the physical medium.

20. A geographic database stored on a computer-readable medium formed according to the method of claim 12.

* * * * *